(12) United States Patent
Pradhan et al.

(10) Patent No.: US 12,542,493 B2
(45) Date of Patent: Feb. 3, 2026

(54) SYSTEMS AND METHODS FOR WIDE VOLTAGE DC-DC POWER CONVERSION

(71) Applicant: McMaster University, Hamilton (CA)

(72) Inventors: Rachit Pradhan, Hamilton (CA);
Shreyas B Shah, Hamilton (CA);
Mohamed Ibrahim Hassan, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 143 days.

(21) Appl. No.: 18/399,187

(22) Filed: Dec. 28, 2023

(65) Prior Publication Data
US 2025/0219547 A1    Jul. 3, 2025

(51) Int. Cl.
*H02M 3/335* (2006.01)
*H02M 1/00* (2006.01)
*H02M 7/487* (2007.01)

(52) U.S. Cl.
CPC ..... *H02M 3/33571* (2021.05); *H02M 1/0048* (2021.05); *H02M 3/33573* (2021.05); *H02M 7/487* (2013.01)

(58) Field of Classification Search
CPC ............. H02M 3/33571; H02M 3/33573
See application file for complete search history.

(56) References Cited

U.S. PATENT DOCUMENTS

| | | | |
|---|---|---|---|
| 8,966,294 B2 * | 2/2015 | Zhan | G06F 1/32 713/300 |
| 9,130,462 B2 | 9/2015 | Hu et al. | |
| 10,250,158 B2 * | 4/2019 | Sterna | H02M 1/4258 |
| 11,777,411 B2 | 10/2023 | Baranwal et al. | |
| 2014/0268903 A1 * | 9/2014 | Reiter | H02M 3/3372 363/21.02 |
| 2014/0376287 A1 * | 12/2014 | Narimani | H02M 3/07 363/60 |
| 2018/0026528 A1 * | 1/2018 | Xiong | H02M 3/07 323/312 |
| 2019/0020280 A1 * | 1/2019 | Fu | H02M 3/33569 |
| 2019/0341855 A1 * | 11/2019 | Kim | H02M 7/219 |

OTHER PUBLICATIONS

Pradhan et al. A 15 kW Wide-Input Reconfigurable Three-Level DAB Converter for On-Board Charging of 1.25 kV Electric Vehicle Powertrains. Author Manuscript. IEEE Transactions on Transportation Electrification, published Jan. 24, 2024, 19 pages.

(Continued)

*Primary Examiner* — Gary A Nash

(57) ABSTRACT

In at least one embodiment, a DC-DC power converter comprises a primary circuit coupled to a DC input voltage, a secondary circuit coupled to a DC output voltage, and a transformer isolating the primary from the secondary circuit. The primary circuit comprises a first and second circuit branch. The first circuit branch comprises a plurality of switches, a diode, and a reconfiguration switch. The second circuit branch comprises a plurality of switches, and a plurality of diodes. The reconfiguration switch is operable to switch the primary circuit between a first mode and a second mode, wherein the primary circuit operates as a full-bridge circuit in the first mode and the primary circuit operates as a half-bridge circuit in the second mode.

32 Claims, 35 Drawing Sheets

(56) References Cited

OTHER PUBLICATIONS

U.S. Department of Transportation, Bureau of Transportation Statistics. 2021 North American Trade Value Reaches $1.3 Trillion, up 8% from Pre-pandemic 2019, up 25% from 2020. Feb. 15, 2022, [Online], [retrieved on Nov. 25, 2023]. Retrieved from <https://www.bts.gov/newsroom/2021-north-american-trade-valuereaches-13-trillion-8-pre-pandemic-2019-25-2020>, 5 pages.
U.S. Environmental Protection Agency. Fast facts on transportation greenhouse gas emissions 1990-2020. May 2022, [Online], [retrieved on Nov. 25, 2023]. Retrieved from <https://www.epa.gov/greenvehicles/fast-facts-transportationgreenhouse-gas-emissions>, 5 pages.
Wang et al. Technology and Fuel Transition: Pathways to Low Greenhouse Gas Futures for Cars and Trucks in the United States. Apr. 17, 2023, [Online], [retrieved on Nov. 25, 2023]. Retrieved from <https://escholarship.org/uc/item/3tb2c3js, 99 pages.
Zhu et al. Grid Impact Analysis of Heavy-Duty Electric Vehicle Charging Stations. 2020 IEEE Power Energy Society Innovative Smart Grid Technologies Conference (ISGT), Feb. 17, 2020, pp. 1-5.
Khaligh and D'Antonio. Global Trends in High-Power On-Board Chargers for Electric Vehicles. IEEE Transactions on Vehicular Technology, vol. 68(4), published Apr. 2019, pp. 3306-3324.
Pradhan et al. On-Board Chargers for High-Voltage Electric Vehicle Powertrains: Future Trends and Challenges. IEEE Open Journal of Power Electronics, vol. 4, published Mar. 3, 2023, pp. 189-207.
Zhang et al. Three-Phase Bidirectional Ultra-Wide Output Voltage Range Current DC-Link AC/DC Buck-Boost Converter. IECON 2020 The 46th Annual Conference of the IEEE Industrial Electronics Society, Oct. 18, 2020, pp. 4709-4716.
Kolar and Friedli. The Essence of Three-Phase PFC Rectifier Systems—Part I. IEEE Transactions on Power Electronics, vol. 28(1), published Jan. 2023, pp. 176-198.
Elezab et al. High Efficiency LLC Resonant Converter With Wide Output Range of 200-1000 V for DC-Connected EVs Ultra-Fast Charging Stations. IEEE Access, vol. 11, published Mar. 31, 2023, pp. 33037-33048.
Lyu et al. Design and Implementation of a Reconfigurable Phase Shift Full-Bridge Converter for Wide Voltage Range EV Charging Application. IEEE Transactions on Transportation Electrification, vol. 9(1), published May 20, 2022, pp. 1200-1214.
Mukherjee et al. A High Power Density Wide Range DC-DC Converter for Universal Electric Vehicle Charging. IEEE Transactions on Power Electronics, vol. 38(2), published Oct. 25, 2022, pp. 1998-2012.
Zayed et al. A Dual-Active Bridge Converter With a Wide Output Voltage Range (200-1000 V) for Ultrafast DC-Connected EV Charging Stations. IEEE Transactions on Transportation Electrification, vol. 9(3), published Dec. 26, 2022, pp. 3731-3741.
Rafi and Bauman. High-Efficiency Variable Turns-Ratio Semi-Dual Active Bridge Converter for a DC Fast Charging Station With Energy Storage. IEEE Transactions on Transportation Electrification, vol. 9(3), published Dec. 23, 2022, pp. 3918-3935.
Park et al. DAB Converter for EV Onboard Chargers Using Bare-Die SiC MOSFETs and Leakage-Integrated Planar Transformer. IEEE Transactions on Transportation Electrification, vol. 8(1), published Oct. 21, 2021, pp. 209-224.
Cao et al. Design and Implementation of an 18-kW 500-KHz 98.8% Efficiency High-Density Battery Charger With Partial Power Processing. IEEE Journal of Emerging and Selected Topics in Power Electronics, vol. 10(6), published Aug. 30, 2021, pp. 7963-7975.
Yang et al. High-Efficiency Bidirectional Three-Level Series-Resonant Converter With Buck-Boost Capacity for High-Output Voltage Applications. IEEE Transactions on Transportation Electrification, vol. 7(3), published Jan. 28, 2021, pp. 969-982.
Li et al. A 300-kHz 6.6-kW SiC Bidirectional LLC Onboard Charger. IEEE Transactions on Industrial Electronics, vol. 67(2), published Apr. 15, 2019, pp. 1435-1445.
Aghabali et al. 800-V Electric Vehicle Powertrains: Review and Analysis of Benefits, Challenges, and Future Trends. IEEE Transactions on Transportation Electrification, vol. 7(3), published Dec. 15, 2020, pp. 927-948.
Moorthy et al. Megawatt Scale Charging System Architecture. 2022 IEEE Energy Conversion Congress and Exposition (ECCE), Oct. 9, 2022, pp. 1-8.
Zhang et al. Three-Phase Bidirectional Buck-Boost Current DC-Link EV Battery Charger Featuring a Wide Output Voltage Range of 200 to 1000 V. 2020 IEEE Energy Conversion Congress and Exposition (ECCE), Oct. 11, 2020, pp. 4555-4562.
Zhao et al. High-Frequency-Link DC Transformer Based on Switched Capacitor for Medium-Voltage DC Power Distribution Application. IEEE Transactions on Power Electronics, vol. 31(7), published Sep. 29, 2015, pp. 4766-4777.
Noroozi et al. Performance Evaluation of Modulation Techniques in Single-Phase Dual Active Bridge Converters. IEEE Open Journal of the Industrial Electronics Society, vol. 2, published Jun. 8, 2021, pp. 410-427.
Sidorov et al. Survey of Topology Morphing Control Techniques for Performance Enhancement of Galvanically Isolated DC-DC Converters. IEEE Open Journal of the Industrial Electronics Society, vol. 3, published Nov. 28, 2022, pp. 751-777.
Karneddi and Ronanki. Reconfigurable Battery Charger With a Wide Voltage Range for Universal Electric Vehicle Charging Applications. IEEE Transactions on Power Electronics, vol. 38(9), published Jun. 28, 2023, pp. 10606-10610.
Filba-Martinez et al. Operating Principle and Performance Optimization of a Three-Level NPC Dual-Active-Bridge DC-DC Converter. IEEE Transactions on Industrial Electronics, vol. 63(2), published Sep. 23, 2015, pp. 678-690.
Moonem et al. Analysis of a Multilevel Dual Active Bridge (ML-DAB) Dc-Dc Converter Using Symmetric Modulation. Electronics, vol. 4(2), published Apr. 20, 2015, pp. 239-260.
Yan et al. Complete ZVS Analysis in Dual Active Bridge. IEEE Transactions on Power Electronics, vol. 36(2), published Jul. 23, 2020, pp. 1247-1252.
Hassan et al. Design Optimization Methodology for Planar Transformers for More Electric Aircraft. IEEE Open Journal of the Industrial Electronics Society, vol. 2, published Nov. 2, 2021, pp. 568-583.
Pei et al. Phase-Shift Full-Bridge (PSFB) Converter Integrated Double-Inductor Rectifier With Separated Resonant Circuits (SRCs) for 800-V High-Power Electric Vehicles. IEEE Journal of Emerging and Selected Topics in Power Electronics, vol. 12(1), published Jul. 18, 2023, pp. 269-282.
Wang et al. An Optional Series/Parallel Resonance-Based LLC Converter for On-Board Charger With Load-Independent Output Characteristics. IEEE Journal of Emerging and Selected Topics in Power Electronics, vol. 12(1), published Aug. 7, 2023, pp. 295-304.
Zhao et al. Analysis and Design of LCCL Resonant Converter Based on Time-Domain Model for Bidirectional Onboard Charger Applications. IEEE Transactions on Power Electronics, vol. 38(8), published Apr. 28, 2023, pp. 9852-9871.
Shah et al. Physical Design Considerations for Three-Level Neutral-Point Clamped DC-DC Converters Using Discrete SiC MOSFETs. 2023 IEEE Transportation Electrification Conference Expo (ITEC), Jun. 21, 2023, pp. 1-6.
Li et al. Optimal Synergetic Operation and Experimental Evaluation of an Ultra-Compact GaN-Based Three-Phase 10 kW EV Charger. Author Manuscript. IEEE Transactions on Transportation Electrification, Jul. 28, 2023, 19 pages.
Kolar and Friedli. The Essence of Three-Phase PFC Rectifier Systems. 2011 IEEE 33rd International Telecommunications Energy Conference (INTELEC), Oct. 9, 2011, pp. 1-27.

\* cited by examiner

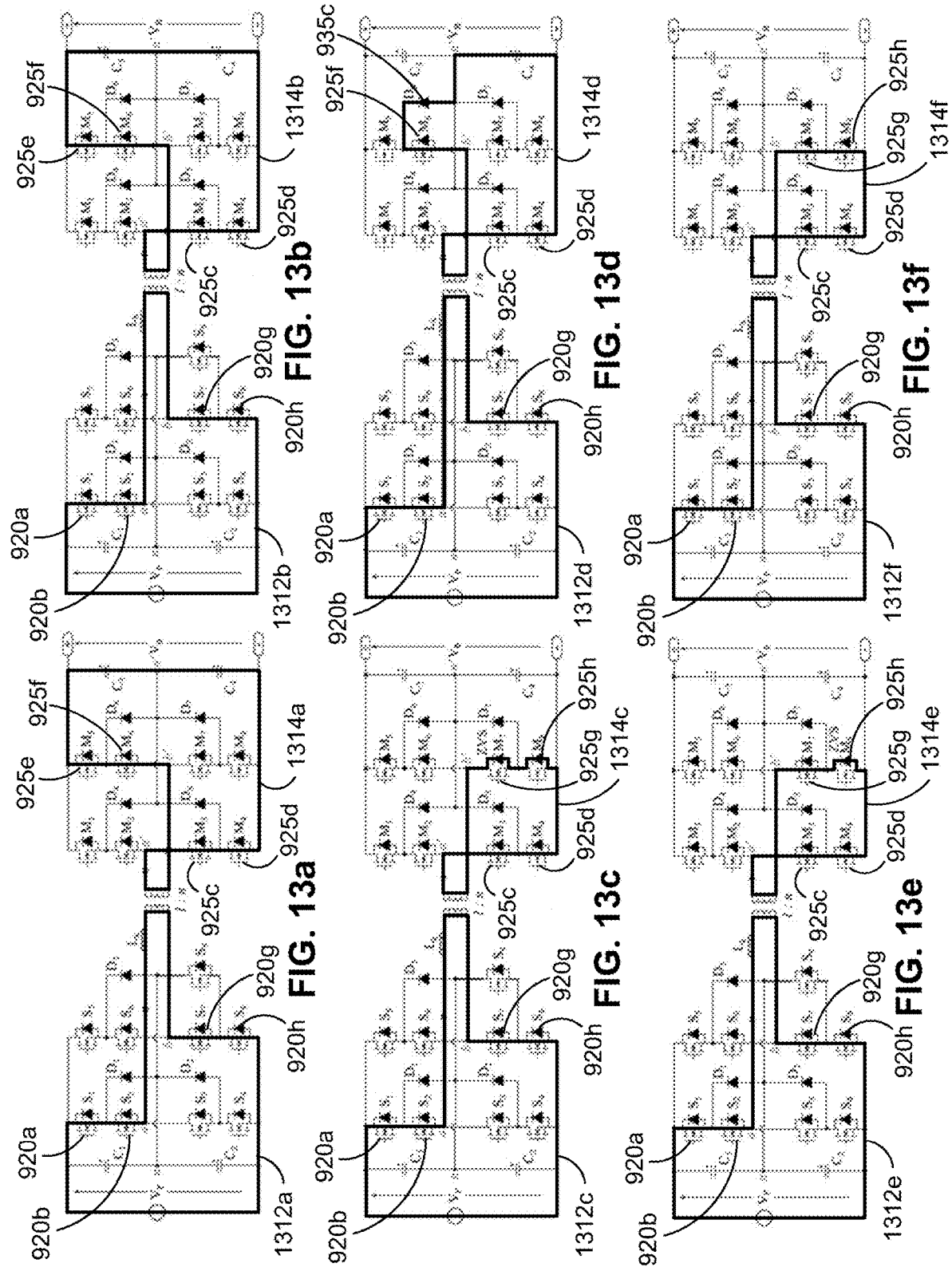

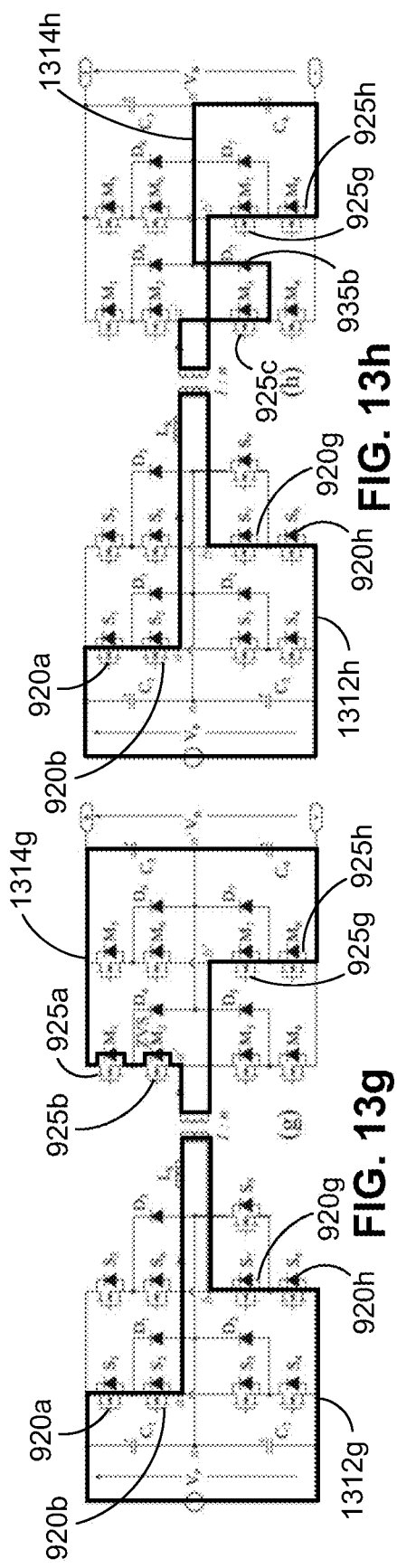
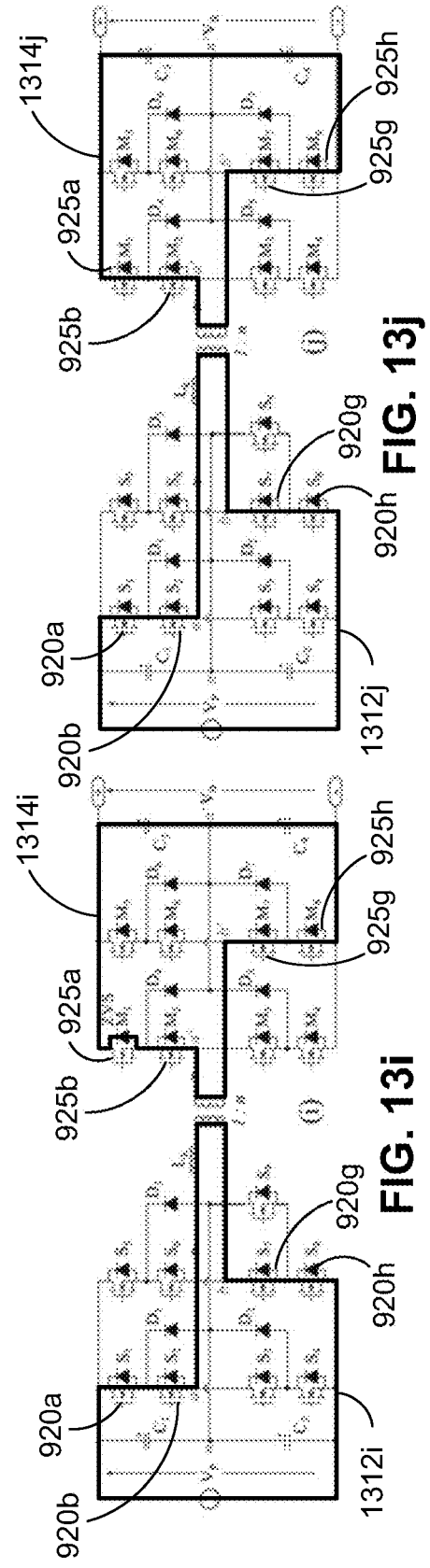
FIG. 13h
FIG. 13j
FIG. 13g
FIG. 13i

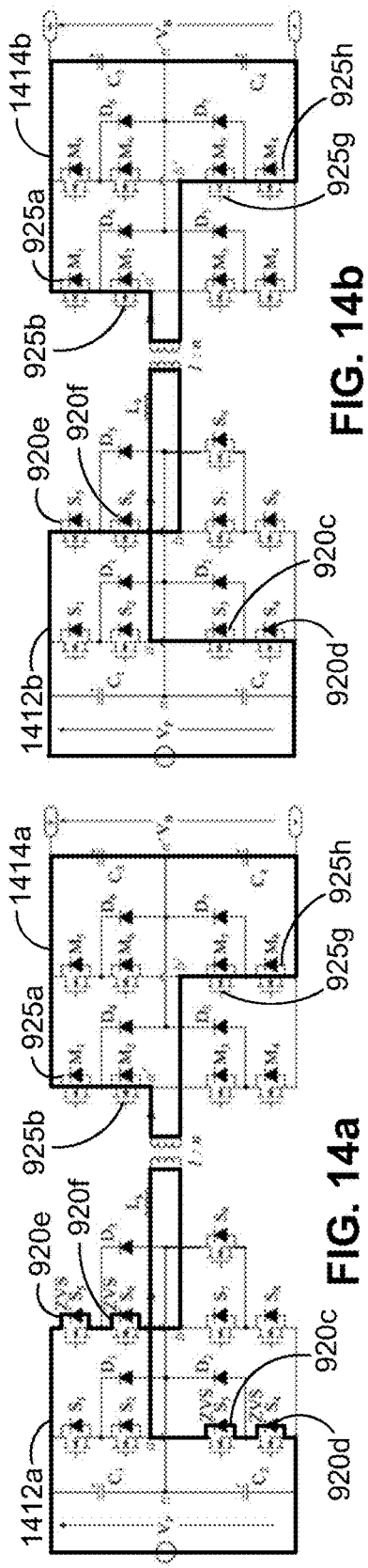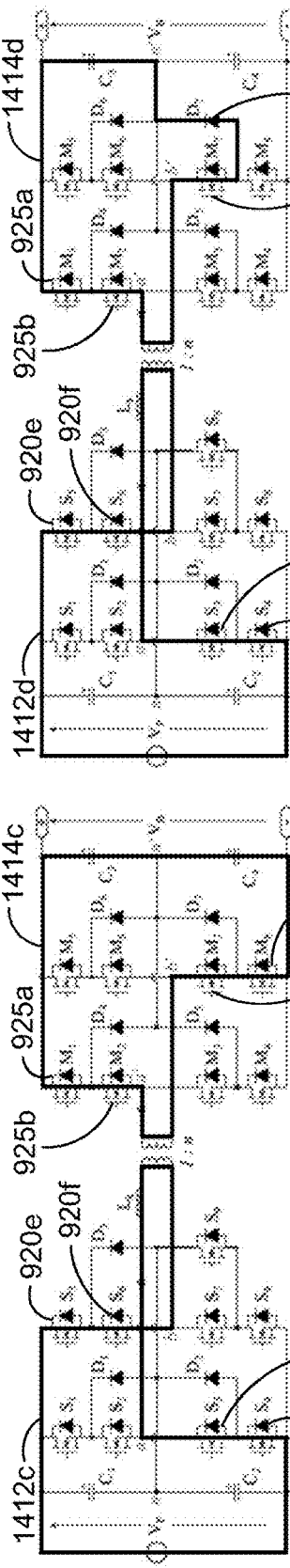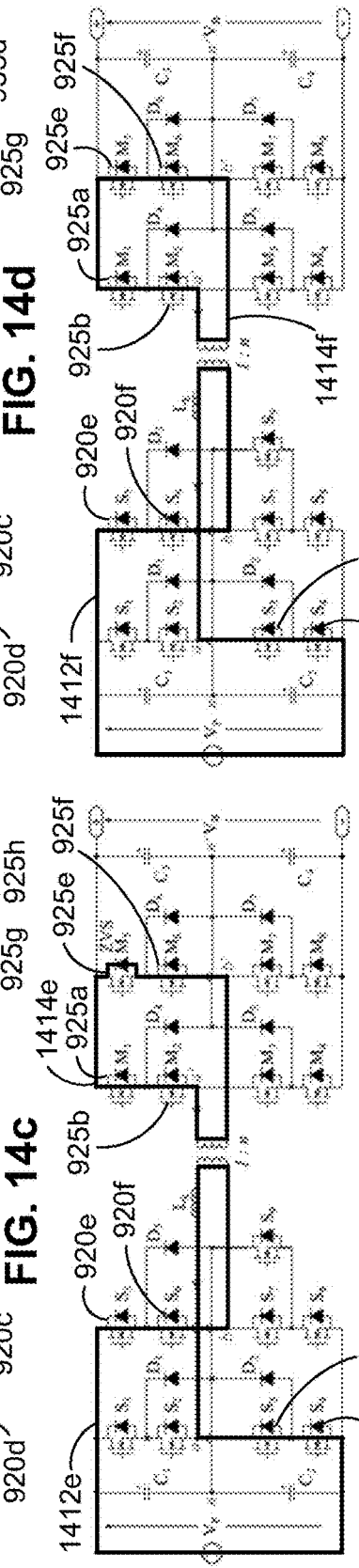
FIG. 14a  FIG. 14b  FIG. 14c  FIG. 14d  FIG. 14e  FIG. 14f

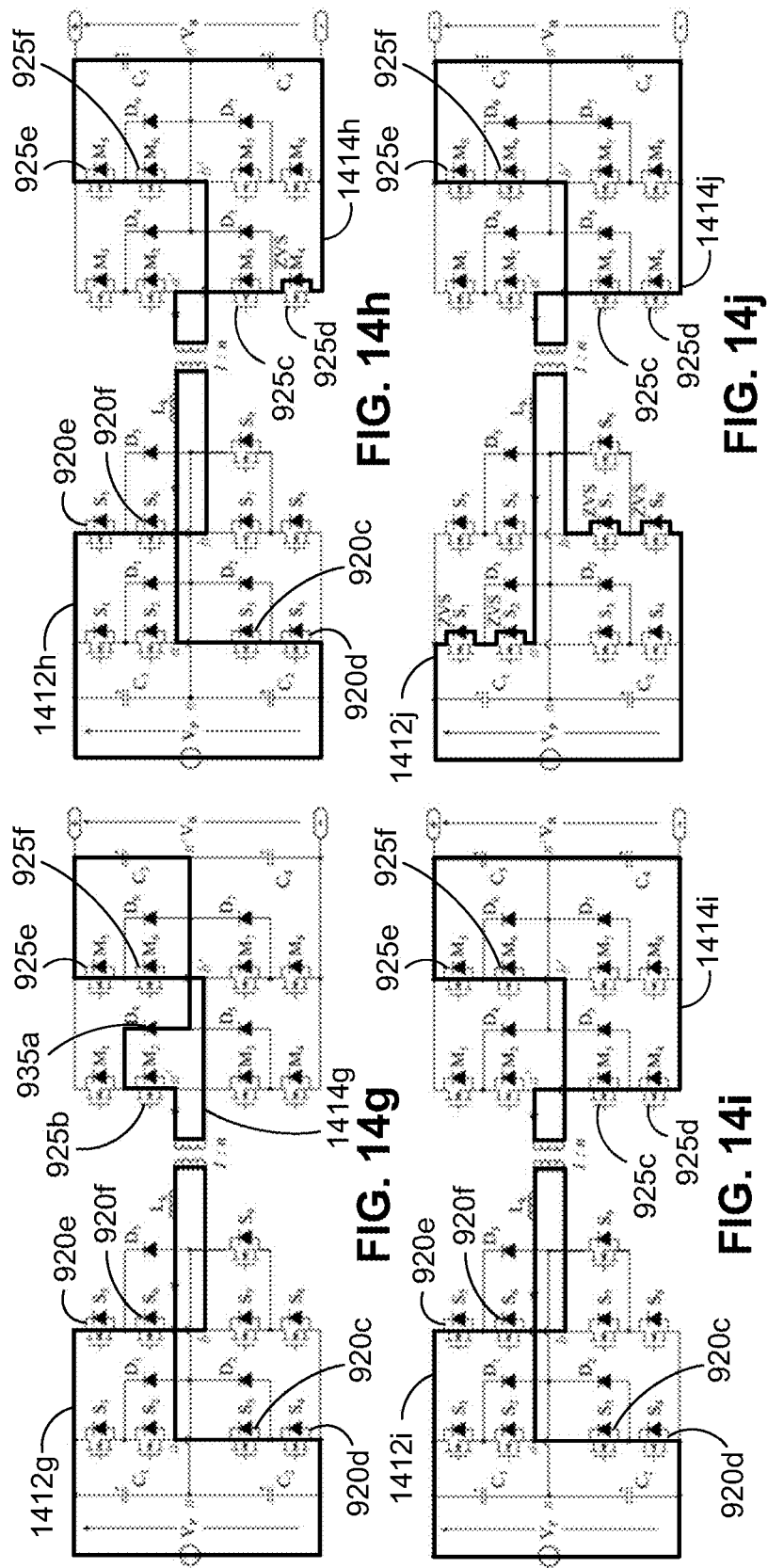

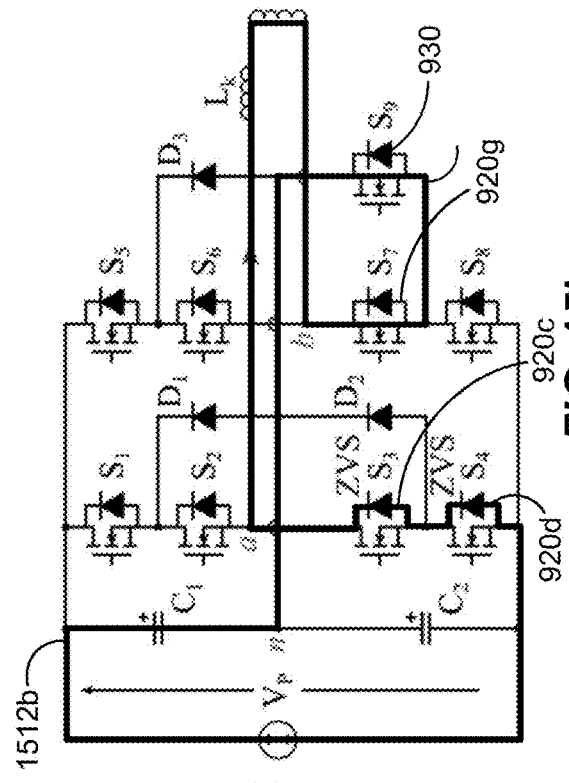
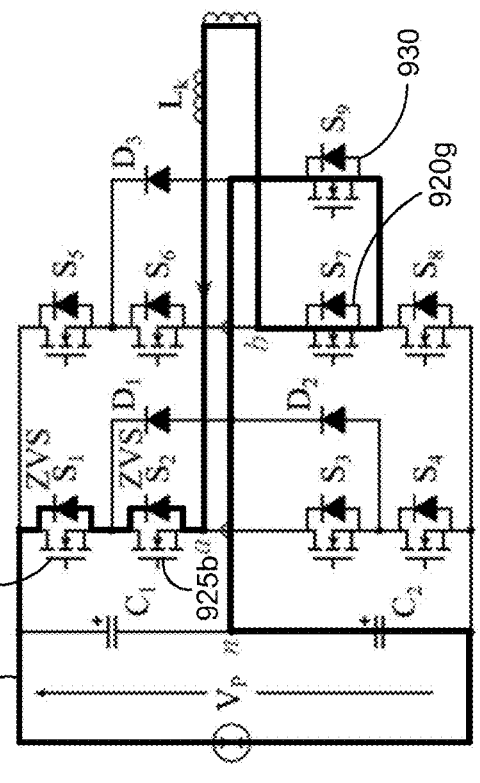
FIG. 15b
FIG. 15d
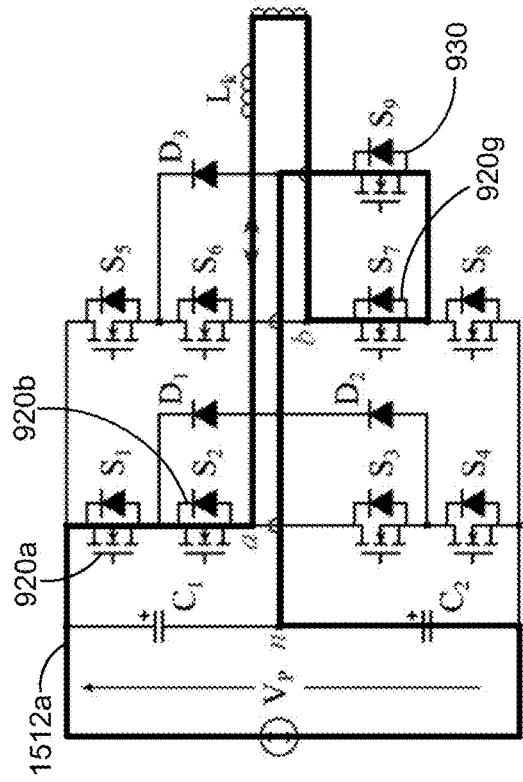
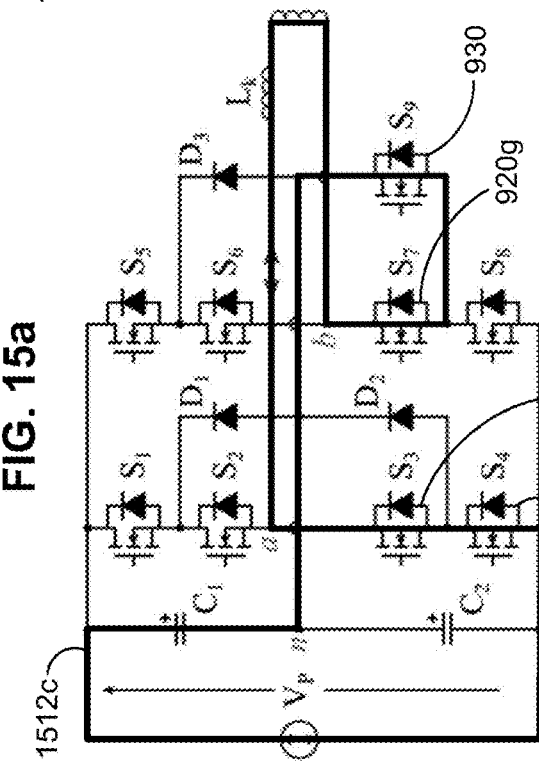
FIG. 15a
FIG. 15c

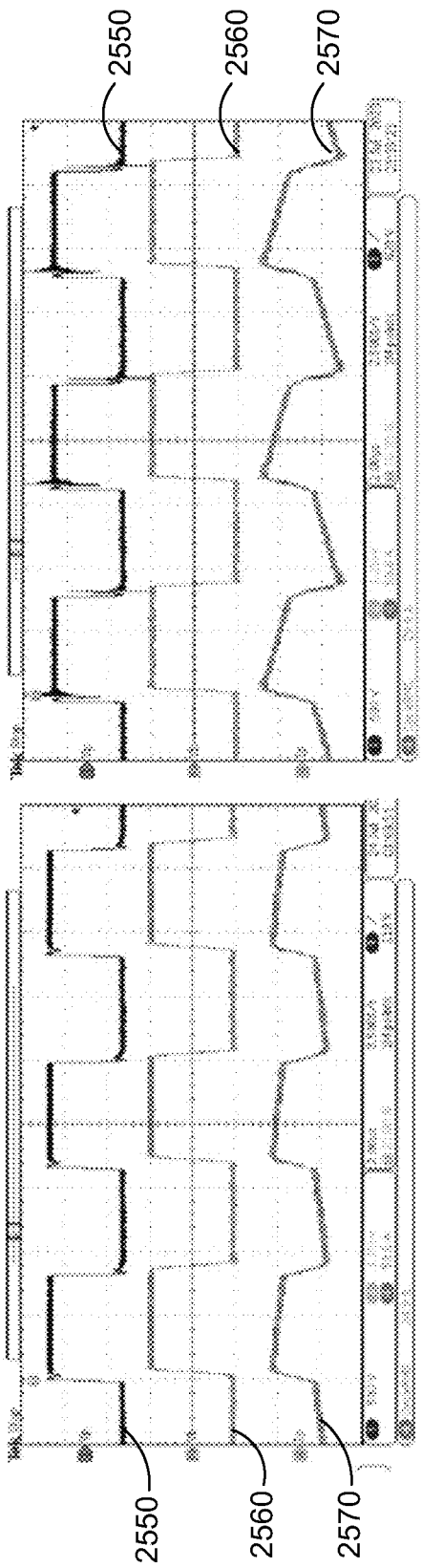
FIG. 25d
FIG. 25c
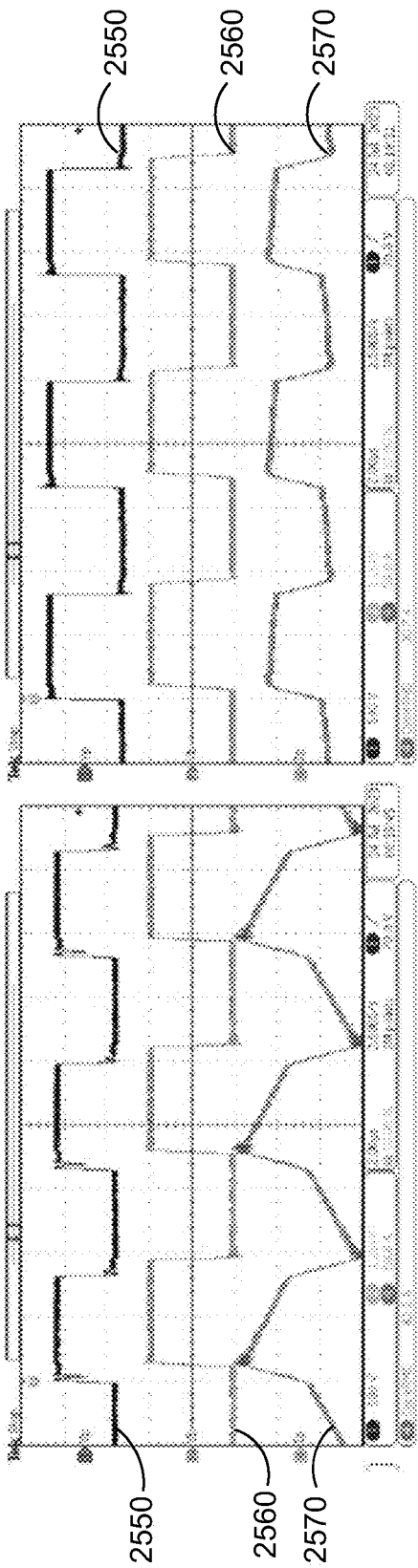
FIG. 25f
FIG. 25e

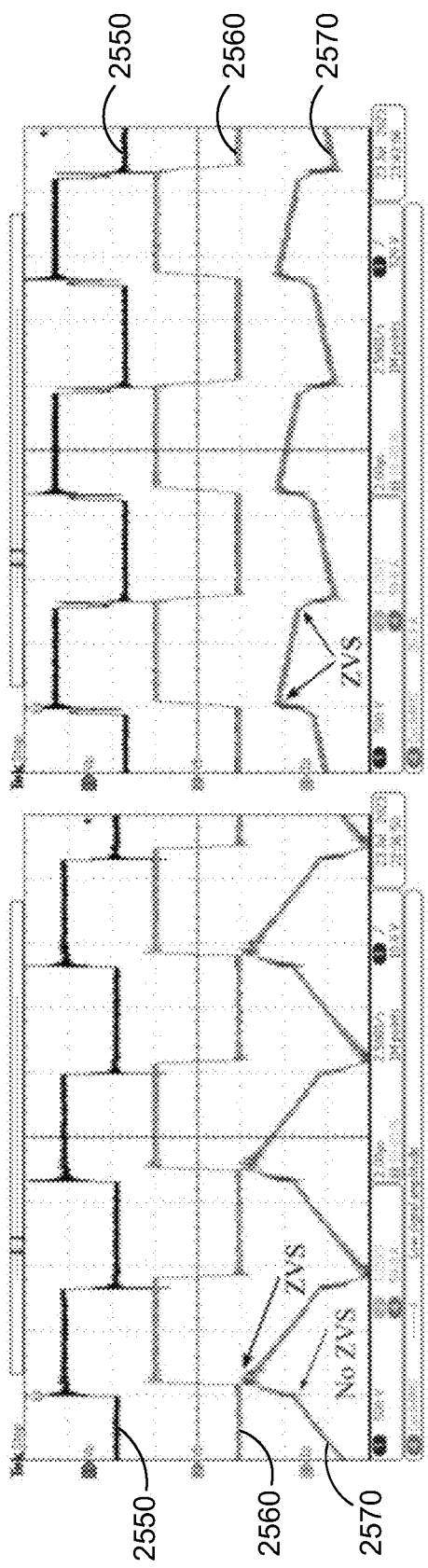
FIG. 25h
FIG. 25g
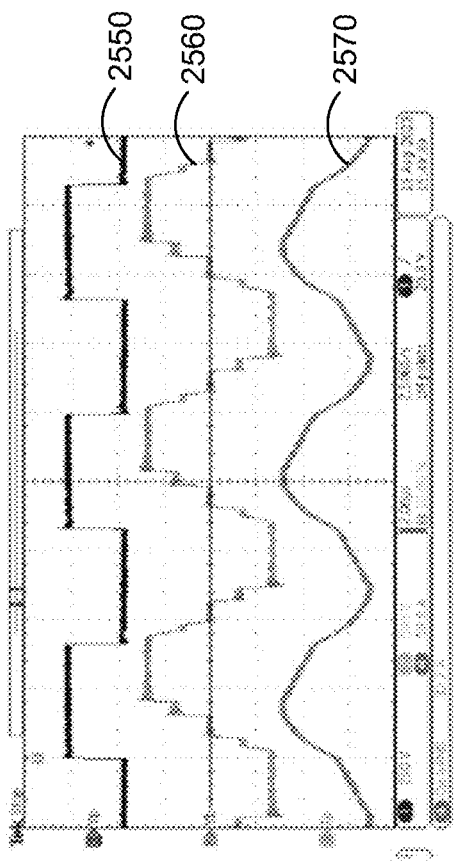
FIG. 25i

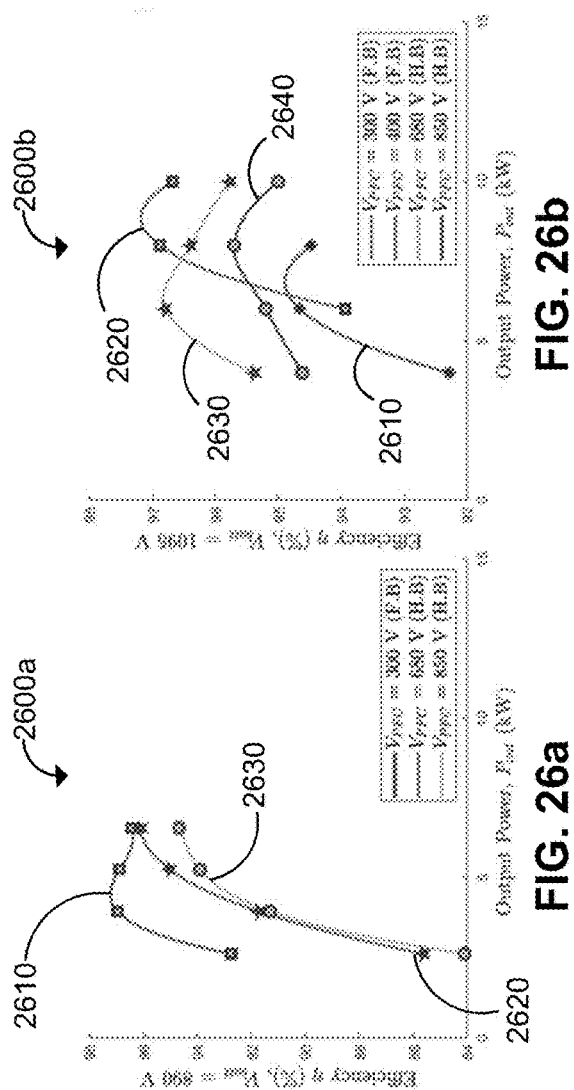
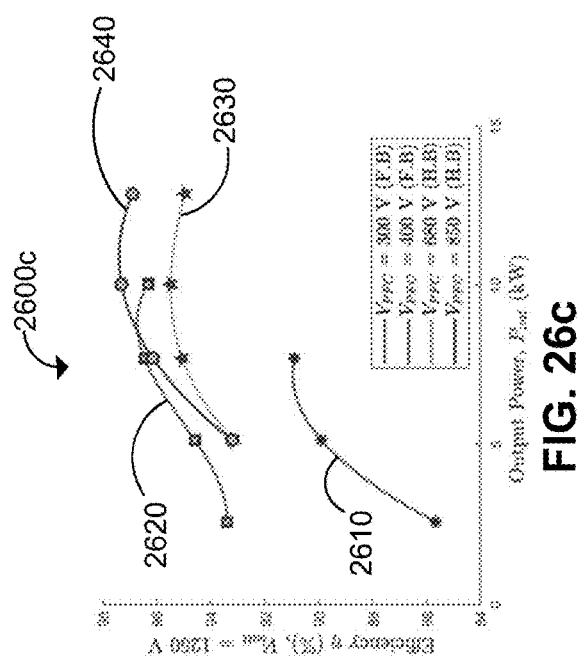
FIG. 26a
FIG. 26b
FIG. 26c

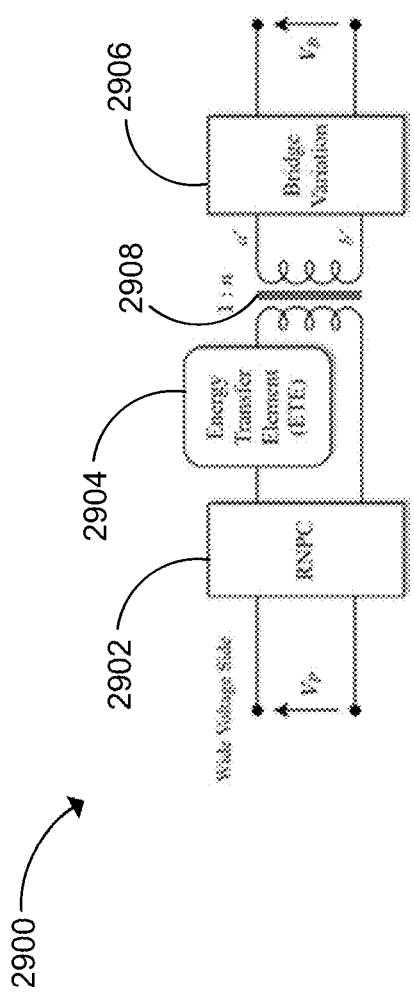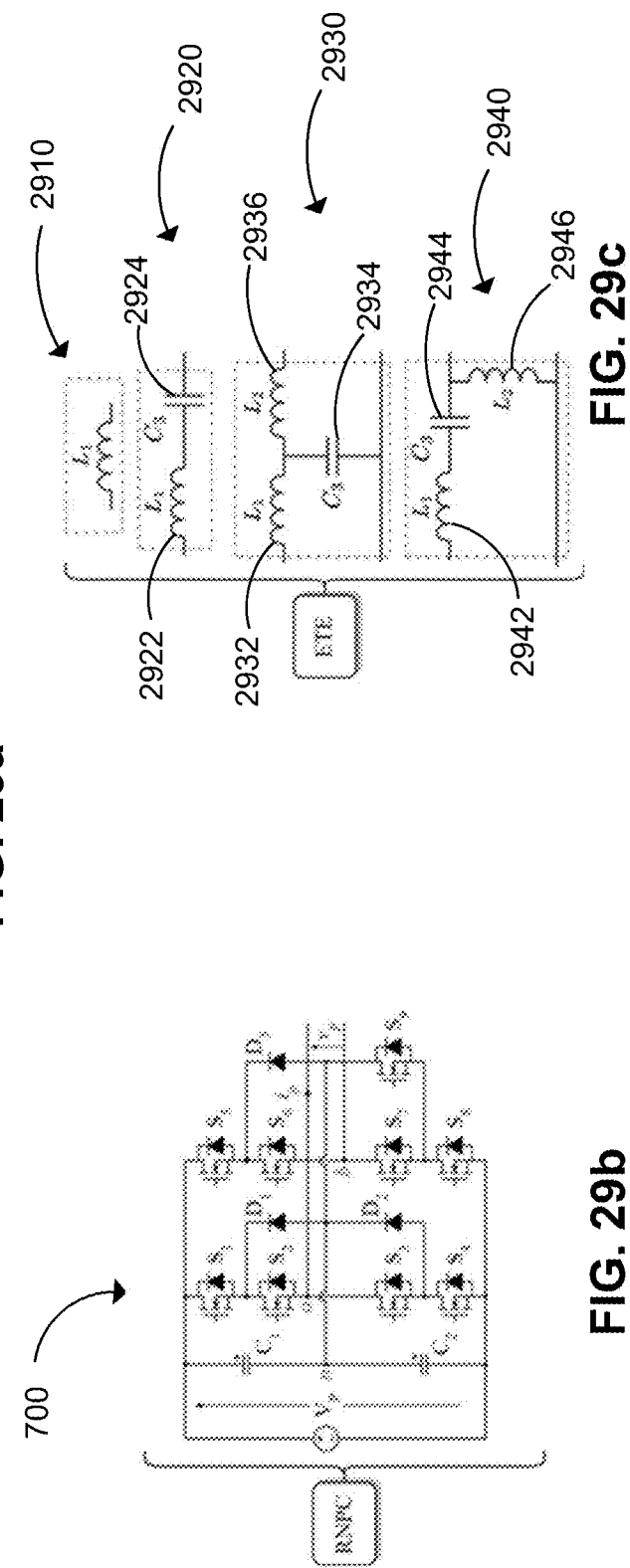
FIG. 29a
FIG. 29b
FIG. 29c

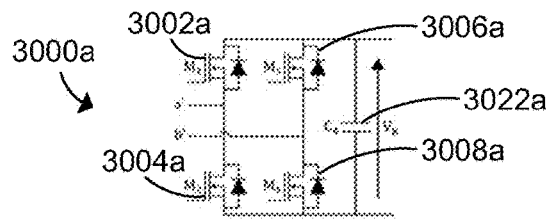
FIG. 30a
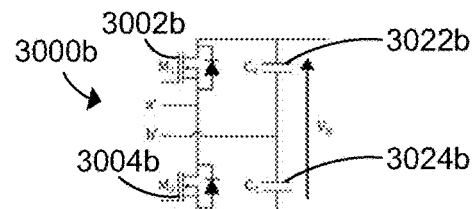
FIG. 30b
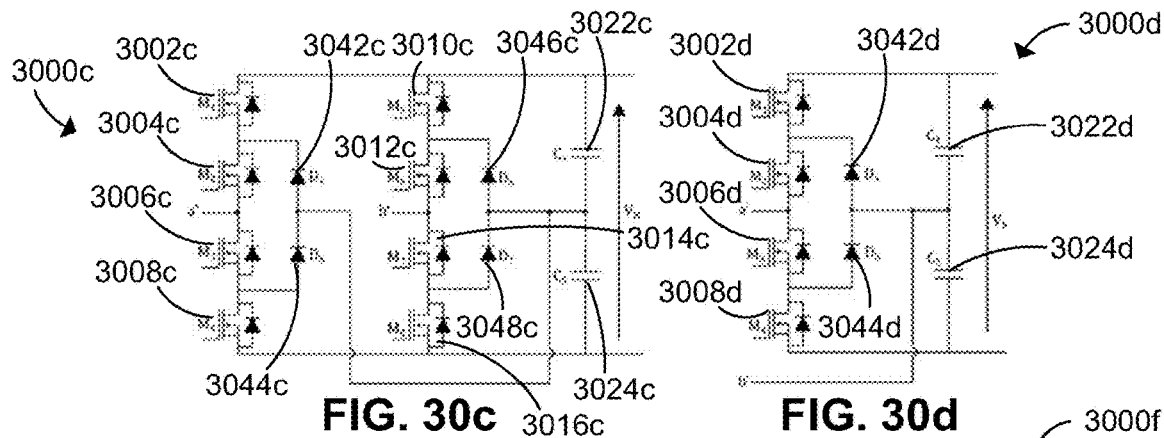
FIG. 30c
FIG. 30d
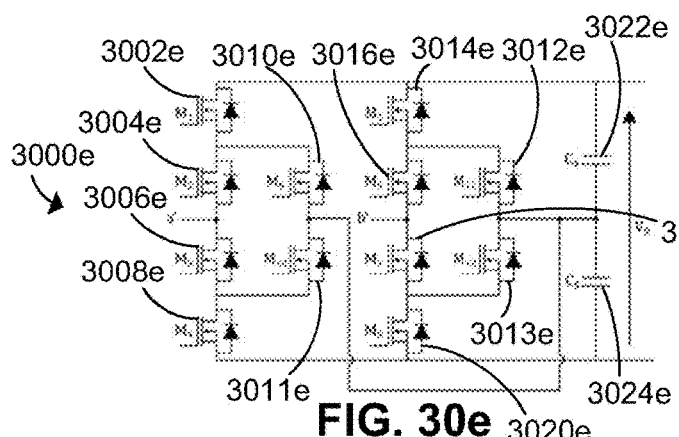
FIG. 30e
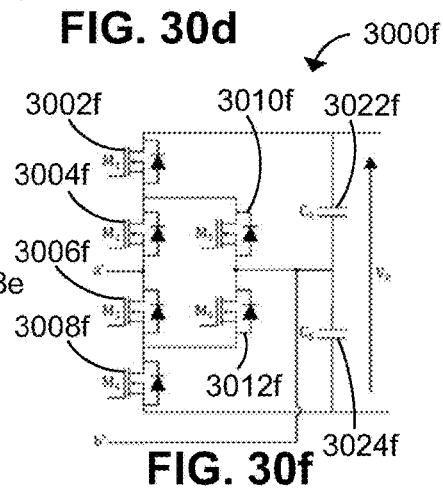
FIG. 30f
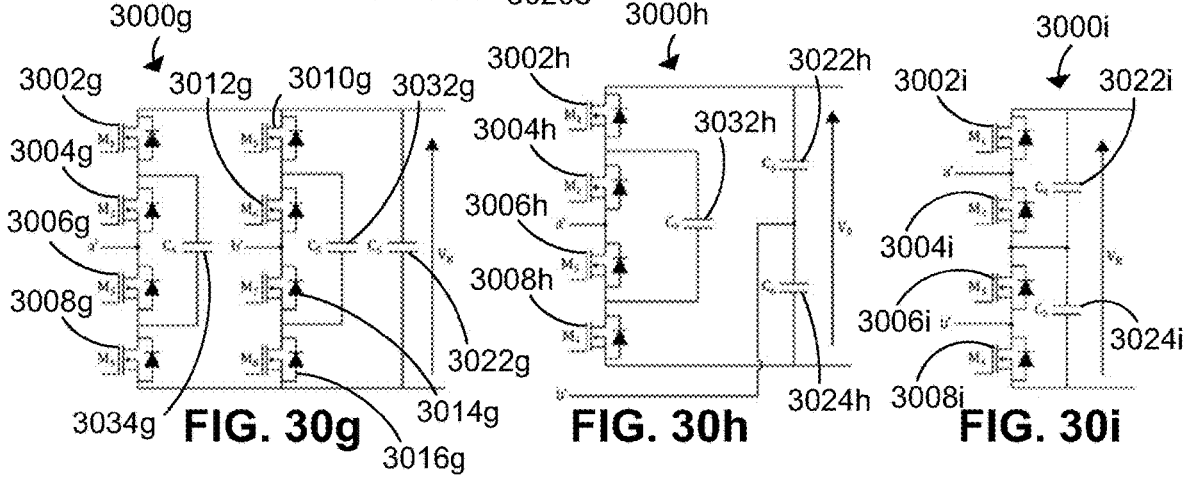
FIG. 30g
FIG. 30h
FIG. 30i

SYSTEMS AND METHODS FOR WIDE VOLTAGE DC-DC POWER CONVERSION

FIELD

The described embodiments generally relate to systems and methods for DC-DC power conversion.

BACKGROUND

The transportation sector is a significant contributor to global greenhouse gas emission. Internal combustion engines of motor vehicles burn fossil fuels like gasoline and diesel to drive the vehicles and generate greenhouse gas emissions in the process. The greenhouse gas emission of the transportation sector can be reduced by using electric vehicles instead of internal combustion engine-based motor vehicles. However, despite the push to electrification a significant challenge that stands in the way of reducing the greenhouse gas emission of the transportation sector is the availability of cost-effective electric vehicle service equipment (EVSE), such as direct current (DC)-connected charging stations. In the absence of convenient DC-connected charging station infrastructure, on-board chargers (OBCs) for EVs provide a viable means of charging an electric vehicle. Accordingly, improvements to OBC technologies are needed.

SUMMARY

The following summary is provided to introduce the reader to the more detailed discussion to follow. The summary is not intended to limit or define any claimed or as yet unclaimed invention. One or more inventions may reside in any combination or sub-combination of the elements or process steps disclosed in any part of this document including its claims and figures.

In a first aspect, in at least one embodiment, there is provided a DC-DC power converter comprising: a primary circuit coupled to an input voltage, the input voltage being DC type, the primary circuit operable to convert the input voltage into an AC voltage; a secondary circuit coupled to the primary circuit, the secondary circuit operable to convert the AC voltage into an output voltage, the output voltage being DC type; a transformer isolating the primary circuit from the secondary circuit, the transformer comprising a predetermined number of turns; an energy transfer element interfacing the primary circuit with the transformer; a first plurality of capacitors connected in series with each other, the first plurality of capacitors being connected in parallel with the input voltage; the primary circuit comprising a first primary circuit branch and a second primary circuit branch; wherein: the first primary circuit branch is connected in parallel with the input voltage and comprises a first plurality of primary switches and a first branch primary diode; the second primary circuit branch is connected in parallel with the input voltage and comprises a second plurality of primary switches and a plurality of second branch primary diodes coupled to each other; and wherein one of the first primary circuit branch and the secondary circuit comprises a reconfiguration switch, wherein the reconfiguration switch is operable to switch the power converter between a first mode and a second mode, and wherein the power converter operates as a full bridge circuit in the first mode and the power converter operates as a half bridge circuit in the second mode.

In some embodiments, the DC-DC power converter may further comprise a second plurality of capacitors connected in series with each other, the second plurality of capacitors being connected in parallel with the output voltage; and wherein the secondary circuit further comprises: a first secondary circuit branch and a second secondary circuit branch; the first secondary circuit branch being connected in parallel with the output voltage and comprising a first plurality of secondary switches and a first plurality of secondary diodes coupled to each other; and the second secondary circuit branch being connected in parallel with the output voltage and comprising a second plurality of secondary switches and a second plurality of secondary diodes coupled to each other.

In some embodiments, where the first primary circuit branch comprises the reconfigurable switch, the DC-DC power converter may further comprise: the first plurality of capacitors connects to the input voltage at a positive input node and a negative input node; the first plurality of capacitors further comprises a first and a second input DC-link capacitors, the first and the second input DC-link capacitors defining a floating neutral node at a first common connection point; the first primary circuit branch comprises: a first output node, a first primary junction node, and a second primary junction node, wherein: a first switch from the first plurality of primary switches is connected between the positive input node and the first primary junction node; a second switch from the first plurality of primary switches is connected between the first primary junction node and the first output node; a third switch from the first plurality of primary switches is connected between the second primary junction node and the first output node; a fourth switch from the first plurality of primary switches is connected between the second primary junction node and the negative input node; the first branch primary diode is connected between the first primary junction node and the floating neutral node; and the reconfiguration switch is connected between second primary junction node and the floating neutral node; and the secondary circuit comprises a rectifying circuit.

In some embodiments, the second primary circuit branch may further comprise: a second output node, a third primary junction node, and a fourth primary junction node, wherein: a first switch from the second plurality of primary switches is connected between the positive input node and the third primary junction node; a second switch from the second plurality of primary switches is connected between the third primary junction node and the second output node; a third switch from the second plurality of primary switches is connected between the fourth primary junction node and the output node; a fourth switch from the second plurality of primary switches is connected between the fourth primary junction node and the negative input node; a first diode from the plurality of second primary diodes is connected between the third primary junction node and the floating neutral node; and a second diode from the plurality of second primary diodes is connected between the fourth primary junction node and the floating neutral node.

In some embodiments, the DC-DC power converter may further comprise: the second plurality of capacitors connects with the output voltage at an output positive node and an output negative node; the second plurality of capacitors comprises at least a first and second output DC-link capacitor and the capacitors defining a floating output neutral node at a second common connection point; and the secondary circuit comprises a first and second secondary circuit branch; and wherein the first and second secondary circuit branches each comprise a plurality of secondary switches and a plurality of secondary diodes coupled to each other and are connected in parallel with the output voltage.

In some embodiments, the DC-DC power converter may further comprise: the first and second secondary circuit branches each comprise: an input node, a first secondary junction node, and a second primary junction node, wherein: a first switch from the plurality of secondary switches is connected between the output positive node and the first secondary junction node; a second switch from the plurality of secondary switches is connected between the first secondary junction node and the input node; a third switch from the plurality of secondary switches is connected between the second junction node and the input node; a fourth switch from the plurality of secondary switches is connected between the second junction node and the output negative node; a first diode from the plurality of secondary diodes is connected between the first junction node and the floating output neutral node; and a second diode from the plurality of secondary diodes is connected between second junction node and the floating output neutral node.

In some embodiments, the energy transfer element of the DC-DC power converter may comprise an inductor.

In some embodiments, the energy transfer element of the DC-DC power converter may comprise an inductor connected in series with a capacitor.

In some embodiments, the energy transfer element of the DC-DC power converter may comprise a first inductor, a second inductor connected to the first inductor at a common point, and a capacitor connected at the common point.

In some embodiments, the energy transfer element of the DC-DC power converter may comprise a first inductor connected in series with a capacitor and a second inductor connected in parallel across a primary winding of the transformer.

In some embodiments, the secondary circuit of the DC-DC power converter may comprise: a first secondary switch, a second secondary switch, a third secondary switch, and a fourth secondary switch arranged in a full-bridge configuration; and a DC-link capacitor connected in parallel across the output voltage.

In some embodiments, the secondary circuit of the DC-DC power converter may comprise: a first secondary switch and a second secondary switch arranged in a half-bridge configuration; and a first DC-link capacitor and a second DC-link capacitor connected in series with each other, and a series combination of the first DC-link capacitor and the second DC-link capacitor connected in parallel across the output voltage.

In some embodiments, the secondary circuit of the DC-DC power converter may comprise: four switches and two diodes arranged in a neutral point clamped configuration; and a series combination of a first DC-link capacitor and a second DC-link capacitor connected in parallel across the output voltage.

In some embodiments, the secondary circuit of the DC-DC power converter may comprise: a first circuit branch comprising six switches arranged in an active neutral point clamped configuration; a second circuit branch comprising six switches arranged in an active neutral point clamped configuration; and a series combination of a first DC-link capacitor and a second DC-link capacitor connected in parallel across the output voltage.

In some embodiments, the secondary circuit of the DC-DC power converter may comprise: six switches arranged in an active neutral point clamped configuration; and a series combination of a first DC-link capacitor and a second DC-link capacitor connected in parallel across the output voltage.

In some embodiments, the secondary circuit of the DC-DC power converter may comprise: a first circuit branch comprising four switches arranged in a flying capacitor configuration; a second circuit branch comprising four switches arranged in a flying capacitor configuration; and a DC-link capacitor connected in parallel across the output voltage.

In some embodiments, the secondary circuit of the DC-DC power converter may comprise: four switches arranged in a flying capacitor configuration; and a series combination of a first DC-link capacitor and a second DC-link capacitor connected in parallel across the output voltage.

In some embodiments, the secondary circuit of the DC-DC power converter may comprise: a first switch, a second switch, a third switch and a fourth switch connected in series across the output voltage; and a series combination of a first DC-link capacitor and a second DC-link capacitor connected in parallel across the output voltage.

In some embodiments, when a voltage swing associated with the output voltage is greater than a voltage swing associated with the input voltage, the secondary circuit comprises the reconfiguration switch.

In some embodiments, the secondary circuit of the DC-DC power converter may operate in a five-level operation to produce five voltage levels at a secondary of the transformer. In some embodiments, the primary circuit operates in a two-level operation to produce two output voltage levels at a primary of the transformer. In some other embodiments, the primary circuit operates in a three-level operation to produce three output voltage levels at a primary of the transformer based on operating in the first mode. In some further embodiments, the primary circuit operates in a five-level operation to produce five output voltage levels at a primary of the transformer based on operating in the first mode.

In some embodiments, a direction of power transfer between the input and the output voltages can be controlled by varying a phase shift in a modulation scheme.

In some embodiments, the power converter is coupled to an AC-DC module for converting a source AC input voltage into the input voltage of the power converter.

In accordance with a further aspect, in at least one embodiment, there is provided a Direct Current (DC)-Alternating Current (AC) power converter circuit comprising: an input voltage, the input voltage being DC type, the primary circuit operable to convert the input voltage into an AC voltage; a plurality of capacitors connected in series with each other, a series combination of the plurality of capacitors being connected in parallel with the input voltage; a first circuit branch and a second circuit branch; the first branch, connected in parallel with the input voltage, comprising a first plurality of switches, a first diode, and a reconfiguration switch; the second branch, connected in parallel with the input voltage, comprising a second plurality of switches and a second plurality of diodes; and wherein the reconfiguration switch is operable to switch the circuit between a first mode and a second mode, and wherein the circuit operates as a full bridge circuit in the first mode and the circuit operates as a half bridge circuit in the second mode.

In some embodiments, the plurality of capacitors connects to the input voltage at a positive input node and a negative input node; the plurality of capacitors further comprises a first and second input DC-link capacitor, the first and the second capacitors defining a floating neutral node at a first common connection point; and the first circuit branch comprises: a first output node, a first junction node, and a second junction node, wherein: a first switch from the first plurality of switches is connected between the positive input node and the first junction node; a second switch from the first plurality of switches is connected between the first junction node and the first output node; a third switch from the first plurality of switches is connected between the second junction node and the first output node; a fourth switch from the first plurality of switches is connected between the second junction node and the negative input node; a first diode is connected between the first primary junction node and the floating neutral node; and the reconfiguration switch is connected between the second junction node and the floating neutral node.

In some embodiments the second circuit branch may comprise: a second output node, a third junction node, and a fourth junction node, wherein: a first switch from the second plurality of switches is connected between the positive input node and the third junction node; a second switch from the second plurality of switches is connected between the third junction node and the second output node; a third switch from the second plurality of switches is connected between the fourth junction node and the second output node; a fourth switch from the second plurality of switches is connected between the fourth junction node and the negative input node; a first diode from the second plurality of diodes is connected between the third junction node and the floating neutral node; and the second diode from the second plurality of diodes is connected between the fourth junction node and the floating neutral node.

In some embodiments, the power converter may operate in a two-level operation to produce two output voltage levels across the first output node and the second output node.

In some embodiments, the primary circuit may operate in a three-level operation to produce three output voltage levels across the first output node and the second output node based on operating in the first mode.

In some embodiments, the primary circuit may operate in a five-level operation to produce five output voltage levels across the first output node and the second output node based on operating in the first mode.

In accordance with a further aspect, in at least one embodiment, a method of operating a primary circuit of a DC-DC converter in a half-bridge mode is provided, wherein the DC-DC converter comprises: the primary circuit coupled to an input voltage, the input voltage being DC type, the primary circuit operable to convert the input voltage into an AC voltage; a secondary circuit coupled to the primary circuit, the secondary circuit operable to convert the AC voltage into an output voltage, the output voltage being DC type; a first and second input DC-link capacitor, the first and second capacitors connected in series with each other, a series combination of the first and second capacitors connected in parallel with the input voltage at a positive input node and a negative input node, the first and the second capacitors defining a floating neutral node at a common connection point; a transformer isolating the primary circuit from the secondary circuit; the primary circuit comprising a first primary circuit branch and a second primary circuit branch; wherein: the first primary circuit branch is connected in parallel with the input voltage and comprises a first, a second, a third, and a fourth primary switch, a first branch primary diode, a reconfiguration switch, and first output node; and the second primary circuit branch is connected in parallel with the input voltage and comprises a fifth, sixth, seventh, and eighth primary switch. a third and fourth branch primary diode coupled to each other, and a second output node; where the method comprises: activating the third switch and the reconfiguration switch to allow a path of current flow between the first output node and the floating neutral node though the third switch and the reconfiguration switch; activating a fifth and sixth switch to allow a path of current flow between the positive input node to the second output node through the fifth and sixth switches; de-activating the fifth and sixth switches to divert the path of current flow from the fifth and sixth switches to body diodes contained within a seventh and eighth switch; activating the seventh and eighth switches to allow a path of current flow from the input negative node to the second output node through the seventh and eighth switches; deactivating the seventh and eighth switches to divert the path of current flow from the seventh and eighth switches to body diodes contained within the fifth and sixth switches.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 13a is a schematic diagram showing current paths within a DC-DC converter in accordance with an example embodiment.

FIG. 13b s is a schematic diagram showing current paths within a DC-DC converter in accordance with another example embodiment.

FIG. 13c is a schematic diagram showing current paths within a DC-DC converter in accordance with another example embodiment.

FIG. 13d is a schematic diagram showing current paths within a DC-DC converter in accordance with another example embodiment.

FIG. 13e is a schematic diagram showing current paths within a DC-DC converter in accordance with another example embodiment.

FIG. 13f is a schematic diagram showing current paths within a DC-DC converter in accordance with another example embodiment.

FIG. 13g is a schematic diagram showing current paths within a DC-DC converter in accordance with another example embodiment.

FIG. 13h is a schematic diagram showing current paths within a DC-DC converter in accordance with another example embodiment.

FIG. 13i is a schematic diagram showing current paths within a DC-DC converter in accordance with another example embodiment.

FIG. 13j is a schematic diagram showing current paths within a DC-DC converter in accordance with another example embodiment.

FIG. 14a is a schematic diagram showing current paths within a DC-DC converter in accordance with another example embodiment.

FIG. 14b is a schematic diagram showing current paths within a DC-DC converter in accordance with another example embodiment.

FIG. 14c is a schematic diagram showing current paths within a DC-DC converter in accordance with another example embodiment.

FIG. 14d is a schematic diagram showing current paths within a DC-DC converter in accordance with another example embodiment.

FIG. 14e is a schematic diagram showing current paths within a DC-DC converter in accordance with another example embodiment.

FIG. 14f is a schematic diagram showing current paths within a DC-DC converter in accordance with another example embodiment.

FIG. 14g is a schematic diagram showing current paths within a DC-DC converter in accordance with another example embodiment.

FIG. 14h is a schematic diagram showing current paths within a DC-DC converter in accordance with another example embodiment.

FIG. 14i is a schematic diagram showing current paths within a DC-DC converter in accordance with another example embodiment.

FIG. 14j is a schematic diagram showing current paths within a DC-DC converter in accordance with another example embodiment.

FIG. 15a is a schematic diagram showing current paths within a DC-DC converter on the primary side in accordance with an example embodiment when the converter is operating in half-bridge mode.

FIG. 15b is a schematic diagram showing current paths within a DC-DC converter on the primary side in accordance with another example embodiment when the converter is operating in half-bridge mode.

FIG. 15c is a schematic diagram showing current paths within a DC-DC converter on the primary side in accordance with another example embodiment when the converter is operating in half-bridge mode.

FIG. 15d is a schematic diagram showing current paths within a DC-DC converter on the primary side in accordance with another example embodiment when the converter is operating in half-bridge mode.

FIG. 25c is a graph showing experimentally measured waveforms of voltages and currents in a DC-DC converter in accordance with another example embodiment.

FIG. 25d is a graph showing experimentally measured waveforms of voltages and currents in a DC-DC converter in accordance with another example embodiment.

FIG. 25e is a graph showing experimentally measured waveforms of voltages and currents in a DC-DC converter in accordance with another example embodiment.

FIG. 25f is a graph showing experimentally measured waveforms of voltages and currents in a DC-DC converter in accordance with another example embodiment.

FIG. 25g is a graph showing experimentally measured waveforms of voltages and currents in a DC-DC converter in accordance with another example embodiment.

FIG. 25h is a graph showing experimentally measured waveforms of voltages and currents in a DC-DC converter in accordance with another example embodiment.

FIG. 25i is a graph showing experimentally measured waveforms of voltages and currents in a DC-DC converter in accordance with another example embodiment.

FIG. 26a is a graph showing efficiency as a function of output power for various DC-link voltages for a DC-DC converter operating at an output voltage of 890V in accordance with an example embodiment.

FIG. 26b is a graph showing efficiency as a function of output power for various DC-link voltages for a DC-DC converter operating at an output voltage of 1095V in accordance with an example embodiment.

FIG. 26c is a graph showing efficiency as a function of output power for various DC-link voltages for a DC-DC converter operating at an output voltage of 1250V in accordance with an example embodiment.

FIG. 29a is a schematic diagram of a DC-DC converter in accordance with example embodiments.

FIG. 29b is a schematic diagram of an RNPC converter in accordance with an example embodiment.

FIG. 29c are schematic diagrams of energy transfer elements in accordance with example embodiments . . .

FIG. 30a is a schematic diagram of a bridge variation in accordance with an example embodiment.

FIG. 30b is a schematic diagram of a bridge variation in accordance with another embodiment.

FIG. 30c is a schematic diagram of a bridge variation in accordance with another embodiment.

FIG. 30d is a schematic diagram of a bridge variation in accordance with another embodiment.

FIG. 30e is a schematic diagram of a bridge variation in accordance with another embodiment.

FIG. 30f is a schematic diagram of a bridge variation in accordance with another embodiment.

FIG. 30g is a schematic diagram of a bridge variation in accordance with another embodiment.

FIG. 30h is a schematic diagram of a bridge variation in accordance with another embodiment.

FIG. 30i is a schematic diagram of a bridge variation in accordance with another embodiment.

DETAILED DESCRIPTION

Figure 1:
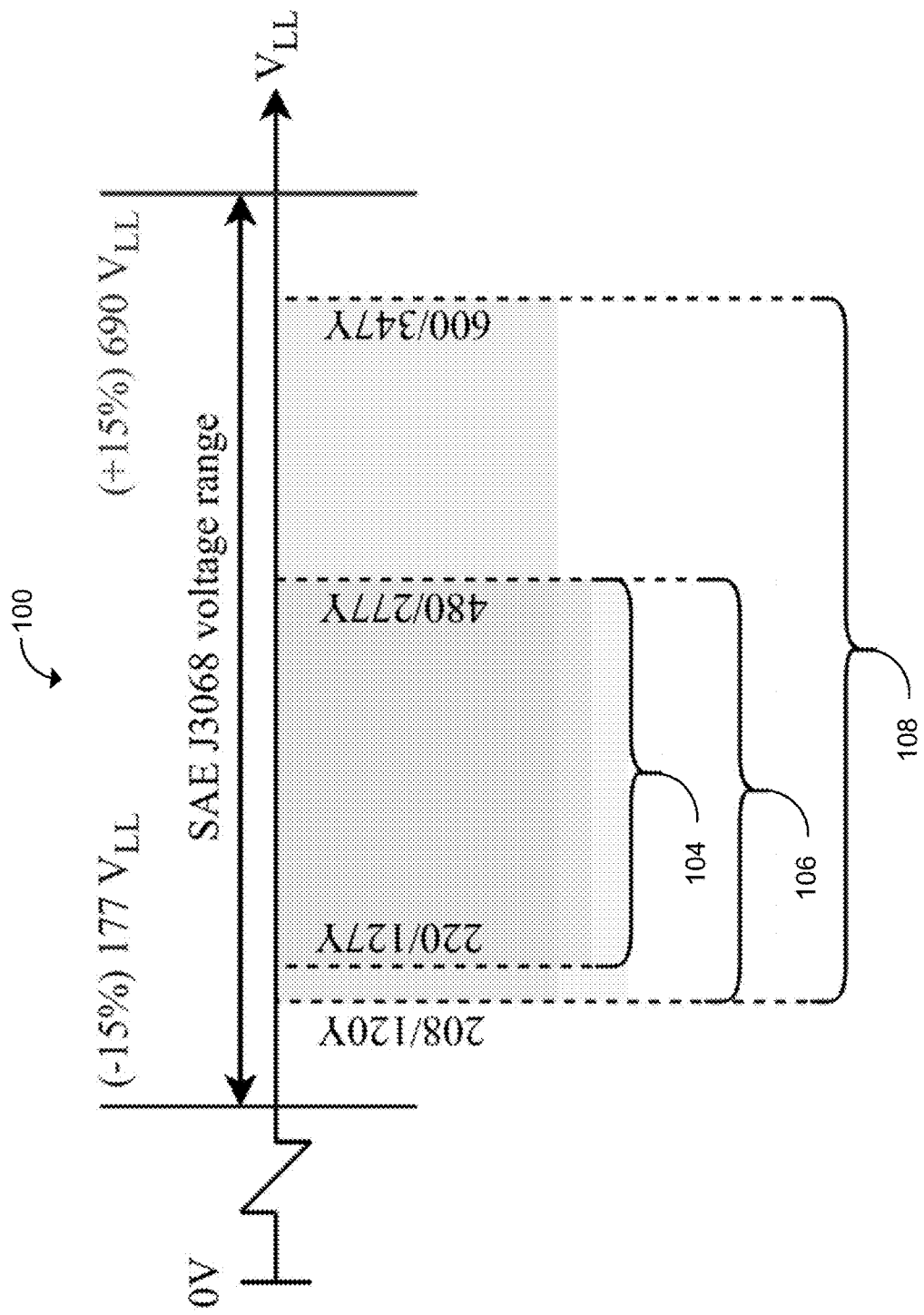
FIG. 1 is a diagram showing three-phase grid voltage ranges in North America.

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g., 112a, or 112₁). Multiple elements herein may be identified by part numbers that share a base number in common and that differ by their suffixes (e.g., 112₁, 112₂, and 112₃). All elements with a common base number may be referred to collectively or generically using the base number without a suffix (e.g., 112).

The following symbols and abbreviations may be used herein:

$A_c$ Transformer core cross section area
d DC/DC conversion ratio
$D_1$ Zero-level duration on the 5-level bridge
$D_2$ Half-level duration on the 5-level bridge
$f_{SW}$ DC/DC converter switching frequency
$i_p$ Transformer primary current $i_b$ Transformer secondary current
$K_{cfg}$ Transformer primary current
$k_{cfg}, \alpha, \beta$ Transformer core Steinmetz coefficients
$L_k$ Total system leakage inductance
n Secondary to primary transformer turns ratio
$n_l$ Number of layers per winding
$N_p$ Number of primary turns
$P_{hb(NPC)}$ NPC reconfiguration power loss
$P_{hb(ANPC)}$ ANPC reconfiguration power loss
$P_{hb(RNPC)}$ RNPC reconfiguration power loss
$P_{out}$ R3L-DAB converter output power
$R_{ds(on)}$ MOSFET on-state resistance
$t_{cu}$ Transformer winding copper thickness
$T_{hs}$ Switching period
$V_{LL}$ Line to line voltage
$V_{ph}$ Phase voltage
$V_{PFC}$ R3L-DAB converter output power
$V_{batt}$ Battery pack voltage
$V_P$ Input DC link voltage
$V_B$ Output DC link voltage
$W_{pri}$ Transformer primary winding trace width
$W_{sec}$ Transformer secondary winding trace width
$Z_{norm}$ Normalized high-frequency link impedance
η DC/DC converter efficiency
φ Primary to secondary phase shift
ρ Resistivity of copper
$ρ_v$ Volumetric power density of the DC/DC stage
OBC On-board charger
MCS Megawatt charging system
MHDV Medium- and heavy-duty vehicle
MLT Mean length per turn
NPC Neutral-point clamped
RNPC Reconfigurable neutral-point clamped
R3L-DAB Reconfigurable three-level dual active bridge North America has a land-connected region of 21.792 million km$^2$ covering Mexico, United States of America (the U.S.), and Canada. As of 2022, transborder truck freight between the U.S., Canada, and Mexico accounted for $827.8 billion worth of economic activity. According to some studies, medium- and heavy-duty vehicles (MHDV) may contribute 26% of the total greenhouse gag (GHG) emissions from transportation in 2020. Depending upon the adoption rate of battery electric vehicles (BEVs), projected GHG emissions from MHDVs are expected to decrease to as low as 80 Megatonnes carbon-dioxide equivalent ($CO_2$e) by 2050, compared to the current emissions of 625 Megatonnes $CO_2$e. DC fast charging of MHDVs may draw megawatt scale charging power to replenish the battery in a short time, which may result in violations of power grid fluctuation limits without proper coordination of requested power levels.

On-board charging of MHDVs is a viable option to reduce impact on the grid due to lower charging power requests. As of 2023, BEV charging in North America is governed by SAE J1772 with potential for moving completely to NACS (North American Charging Standard), which are both single-phase (1-Φ) charging compatible. For Level 3 AC charging (>43 kW), the SAE J3068 standard has been recommended for adoption, and is three-phase (3-Φ) charging compatible.

Battery electric vehicles in North America may be equipped with on-board chargers compliant with a standard connector compliant with SAE J1772 standard or the NACS standard, which only supports 1-Φ charging with power levels up to 22KW. The 3-Φ compatible SAE J3068 charging standard has been recommended for AC Level 3 charging of medium- and heavy-duty vehicles for power levels up to 166 KW. In North America, Mexico, the U.S. and Canada handle transmission and distribution of 3-Φ power in different manners.

Reference is made to FIG. 1, which shows three-phase grid voltage ranges in North America. Voltage levels 104, comprising 220/127Y and 480/277Y voltages, are common in Mexico. Voltage levels 106, comprising 208/120Y and 600/347Y voltages, are common in the U.S. Voltage levels 108, comprising 208/120Y, 480/277Y and 600/247Y voltages, are common in Canada. Voltage ranges used in Mexico 104 and voltage ranges used in the U.S. 106 are inter-compatible, but voltage ranges in Canada 108 are an exception due to a higher voltage limit of 600/347Y. In order to support on-board charging features across North America, a vehicle manufacturer must cater to the voltage levels from 208/120Y to 600/347Y to remain competitive in the market. Beyond this, the SAE J3068 standard requires a charger to adhere to a 15% margin on the communicated voltage range to the electric vehicle supply equipment (EVSE) to account for any voltage sag or swell on the 3-Φ AC inlet. This requires further extension to the input voltage, ranging from 177-690$V_{LL}$, while accounting for fluctuations.

Figure 2:
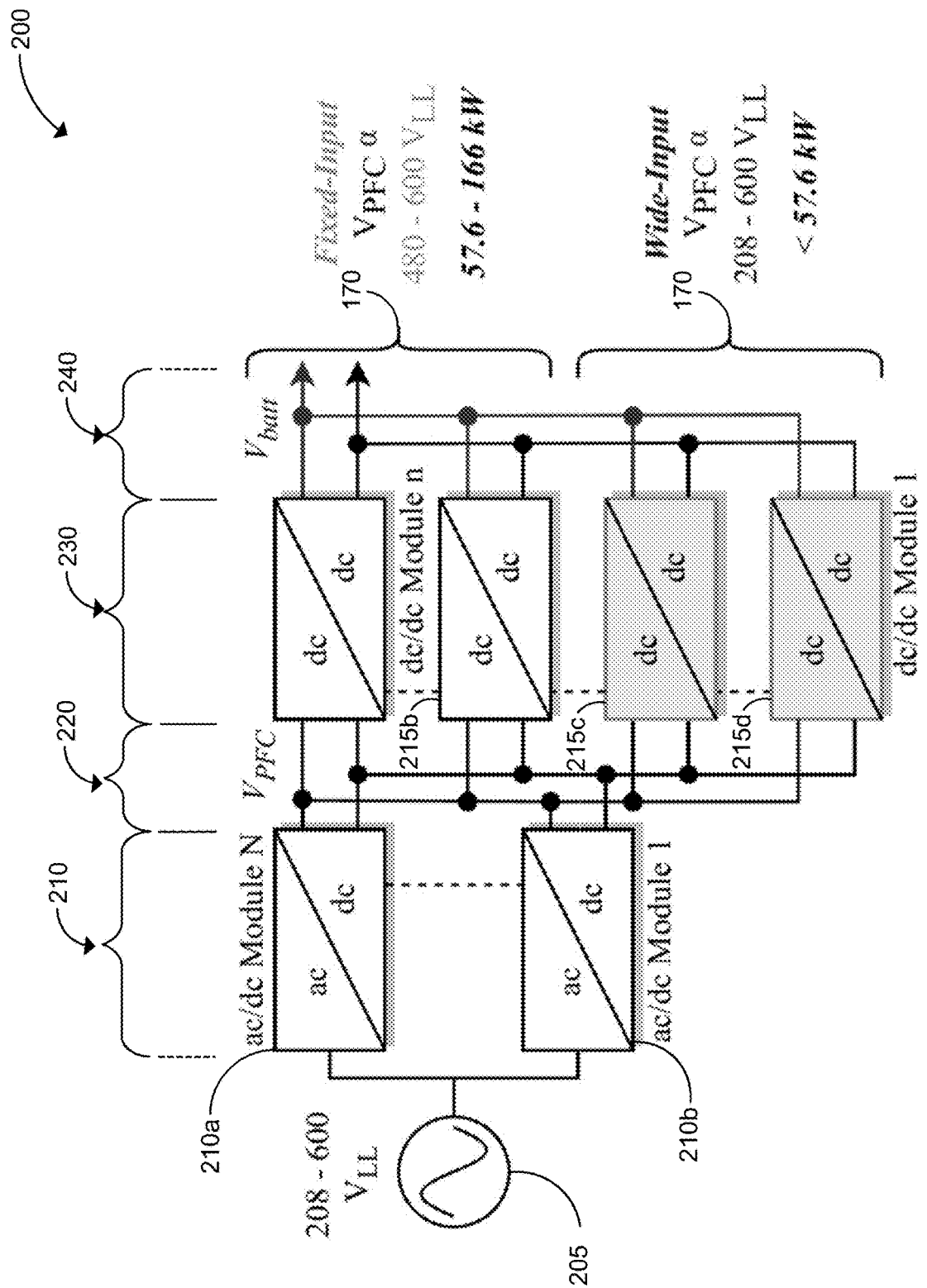
FIG. 2 is a schematic diagram showing an example on-board charger structure.

Reference is next made to FIG. 2, which shows a structure of an example multi-module, input parallel output parallel (IPOP) two-stage on-board charger 200, where an AC-DC power factor correction stage 210 generates a DC link 220, and a DC-DC converter stage 230 interfaces the generated DC link 220 with a traction battery at stage 240. A control loop for output voltage or current regulation can incorporate variation either on the AC-DC or DC-DC stage, or both, depending upon the region of operation.

A conventional approach for current-fed power factor correction (PFC) rectifiers is to buck/boost the PFC DC-link voltage, while maintaining a unity conversion ratio at the DC-DC stage to maintain high efficiency operation. For conventional PFC rectifiers, efficiency decreases as a voltage gain in the rectifier increases due to elevated hard-switching losses. Thus, lowering the gain of a conventional PFC rectifier enables operation in its high-efficiency region. To manage large voltage swings as a result of grid voltage variation from 208-600$V_{LL}$ across North America, DC-DC converters in SAE J3068 compliant on-board chargers using conventional PFC rectifiers must support wide-input and wide-output voltage operation. In context of electric vehicle charging applications, multiple previous topologies have been reported that support 400V and 800V DC fast charging. However, input voltage variation was not a challenge in the aforementioned solutions due to the use of fixed voltage DC links at the PFC stage. In prior solutions, a semi-DAB in a battery energy storage system (BESS) supported DC faster charger has been reported. However, this solution was limited to 400V traction battery systems.

Prior solutions in DC-DC converters for on-board chargers have reported peak efficiencies from 96%-98.8%, and power densities up to 8.66 KW/L. However, the effect of variation in the PFC DC link voltage has not been examined in said solutions due to standardization of 1-Φ charging in light-duty electric vehicles.

With the introduction of DC fast charging standards such as Megawatt Charging System (MCS) and ChaoJi/CHAdeMO 3.0, powertrain voltages of MHDVs may be raised as high as 1.25 KV to 1.5 kV. With electric vehicle powertrain voltages increasing beyond the 1 KV limit form the Combined Charging System (CCS) connector, and the introduction of new DC fast charging standards like MCS ChaoJi/CHAdeMO 3.0, it is important to address on-board charging requirements of future electric vehicles with high-voltages (>1 kV) powertrains.

Increasing powertrain voltage provides benefits such as reduced conduction losses in the powertrain cabling, lower consumption of copper in the vehicle and traction motors, and lower DC fast charging time due to higher DC fast charging power without increasing cable dimension. DC fast charging standards such as Megawatt Charging System (MCS) and ChaoJi/CHAdeMO 3.0 can support battery voltages up to 1.25 kV and 1.5 kV, and have been targeted for adoption in medium- and heavy-duty vehicles.

Figure 3B:
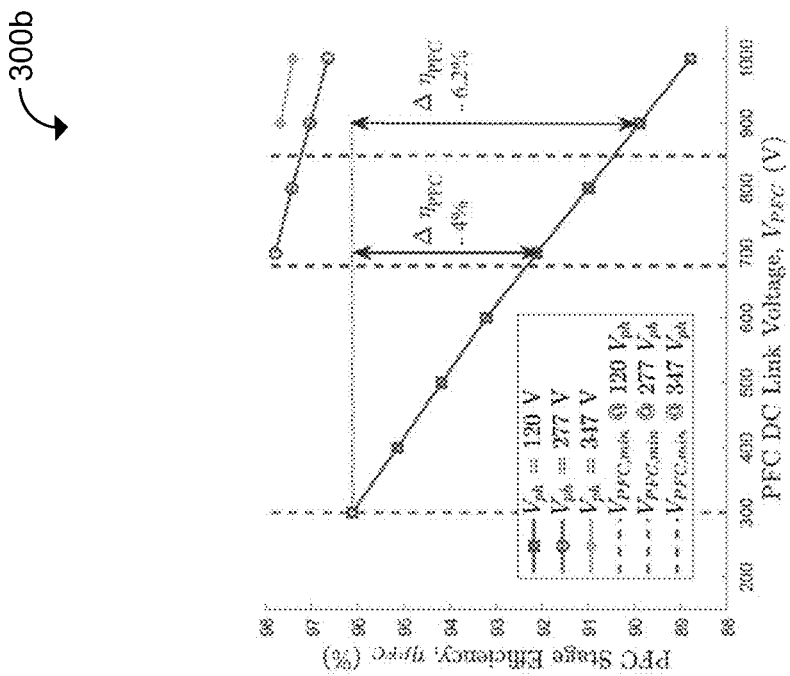
FIG. 3b is a graph showing various simulated efficiencies of an example power factor correction (PFC) converter.
Figure 3A:
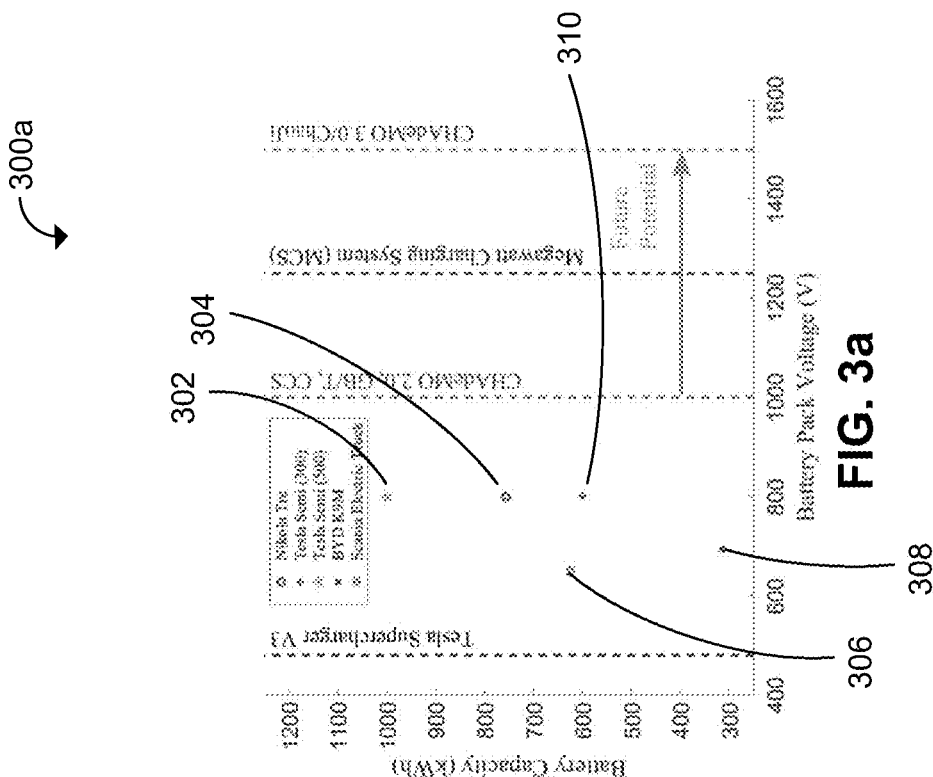
FIG. 3a is a graph showing a plot of current operating parameters of various electrified medium- and heavy-duty vehicles.

Reference is made to FIG. 3a, which shows the current status of electrified MHDVs against the voltage limits of DC fast charging standards. Operating point 302 corresponds to the Tesla Semi (500). Operating point 304 corresponds to the Nikola Tre. Operating point 306 corresponds to the Scania Electric Truck. Operating point 308 corresponds to the BYD K9M. Operating point 310 corresponds to the Tesla Semi (300).

Operating points 302, 304, 306, and 308 associated with various existing electrified MHDVs are all below the connector voltage of 1 kV, limited by the Combined Charging System connector. To support megawatt scale charging of MHDVs, methods have been previously proposed involving interacting with the grid and dynamically modifying the charging power level based on the grid loading scenario, since demand of megawatt scale charging power can risk instability of the grid. Additionally, supporting battery charging of MHDVs exclusively via DC fast charging may require significant capital expenditure in charging infrastructure to reduce the consumer's range anxiety. Having a secondary source of charging an MHDV until DC fast charging infrastructure is established may be addressed housing an on-board charger (OBC) in the vehicle.

The SAE J3068 standard has variation in the rated amperage of current carrying contacts that determine the power delivery limit of a charging connector. Standard contacts are rated at 63A, while advanced contacts ($AC_6$) are rated at 100A, 120A, 160A. Table I shows values of charging power vector $\vec{P}_{charge}$ for varying values of grid phase voltage $\vec{V}_{ph}$, charging contact current $\vec{I}_{ph}$, and displacement power factor cosφ=1, as seen in equation (1).

$$\vec{P}_{charge}(kW) = \eta_{obc} 3 \vec{V}_{ph} \vec{I}_{ph} \cos\phi \quad (1)$$

TABLE I

CHARGING POWER (KW) AS A FUNCTION OF VARYING AC INPUT VOLTAGE AND SAE J3068 CONTACTS

| Contact Current | | | 63 A | 100 A* | 120 A* | 160 AS |
|---|---|---|---|---|---|---|
| $V_{ph}$ (V) | $V_{LL}$ (V) | $V_{PFC(min)}$ (V) | | Power (kVA) | | |
| 120 | 208 | 294 | 22.7 | 36 | 43.2 | 57.6 |
| 127 | 220 | 311 | 24 | 38.1 | 45.7 | 61 |
| 277 | 480 | 679 | 52.4 | 83.1 | 99.7 | 133 |
| 347 | 602 | 851 | 65.6 | 104.1 | 124.9 | 166.6 |

A conventional PFC converter stage 230 can be classified as buck, boost, or buck-boost types. Since the battery voltage is higher than the AC input voltage, an example of a boost PFC converter, such as the six-switch PFC rectifier or the Vienna rectifier, is assumed. A minimum DC link voltage of the PFC $V_{PFC(min)}$, below which limit regulation is not possible, is given by equation (2):

$$V_{PFC(min)} = \sqrt{6} V_{ph} \quad (2)$$

A conventional 3-Φ PFC converter is preferred to be operated in continuous conduction mode (CCM) due to high power-handling requirements. However, this may cause hard-switching in the PFC converter, resulting in higher switching losses, and thus lower efficiency. Within a conventional two-level boost PFC converter, a switch's voltage stress is the DC-link voltage, while the switch's current stress is a sinusoidal input current. As PFC DC-link voltage 220 is raised beyond $V_{PFC(min)}$, the converter's efficiency diminishes based on the trajectory of rise in switching energy. A minima of losses will be experienced on the converter when $V_{PFC}=V_{PFC(min)}$.

An on-board charger must operate from 208/120Y to 600/347Y to fully operate across North America's varying grid voltage. This corresponds roughly to a voltage swing between 300<$V_{PFC}$<850V in order to enable maximum efficiency in a PFC converter within the charger.

Reference is made to FIG. 3b which shows a simulated efficiency map of a 3-Φ boost PFC converter in a software simulation environment, operating at a load of 15 KW, f sw=100 kHz, and utilizing Wolfspeed's C3M0016120D (1.2 kV/16mΩ) SiC MOSFETs. The simulated efficiency map confirms that the efficiency drop is detrimental as the DC link voltage 220 of the PFC stage increases, especially at lower input phase voltages.

Table II shows the comparison of recent contributions of DC-DC converters supporting EV charging, both on-board and off-board. The key difference being that the PFC stage voltage is fixed and no variation is accounted for due to a fixed grid voltage: single-phase for on-board charging in North American and three-phase for off-board charging. Additionally, the voltage range is limited to either 400 or 800V EV powertrains. Embodiments of a DC-DC converter as described herein extends to accounting for a wide input voltage variation on the PFC stage's output (300-850V), while catering to voltage levels needed for the next-generation of medium- and heavy-duty vehicles for 1.25 kV powertrains.

TABLE II

COMPARISON OF THE PROPOSED WORK TO THE RECENT
CONTRIBUTIONS IN EV CHARGING (ON-BOARD AND OFF-BOARD)

| Ref. | Application | Topology | $f_{sw}$ (kHz) | Switch | Power Density (kW/L) | Input Voltage (V) | Output Voltage (V) | $\eta_{peak}$ (%) |
|---|---|---|---|---|---|---|---|---|
| [31] | On-board | PSFB | 20 | Si | — | 760 | 420-760 | 98.3 |
| [32] | On-board | LLC | 47.2-100 | Si | — | 400 | 250-450 | 97.5 |
| [33] | On-board | LCCL | 88-120 | SiC | — | 400 | 250-450 | 97.4 |
| [11] | Off-board | LCL-T | 500 | GaN | 7.3 | 800 | 150-950 | 98.2 |
| [14] | On-board | DAB | 500 | GaN | 5.44 | 380 | 250-380 | 98 |
| This work | On-board | R3L-DAB | 150 | SiC | 3.25 | 300-850 | 890-1250 | 97.3 |

Described herein are methods for reconfiguring a neutral-point clamped converter to switch between half-bridge and full-bridge operation in a manner that reduces conversion effort on the converter. Said methods eliminate the need for additional relays or contactors, which may be limited by a fatigue life and may occupy a higher volume compared to solid-state devices.

Additionally, steady-state analysis to derive instantaneous and RMS currents, voltages, and zero voltage switching (ZVS) conditions for circuit topologies in accordance with embodiments disclosed herein, under certain modulation schemes also disclosed herein, are verified.

Further, a power loss model utilizing steady-state analytical equations described herein for estimating the efficiency of a converter in accordance with embodiments described herein under various operating conditions is disclosed. In addition, a design optimization procedure to select the turns ratio (n), leakage inductance ($L_K$) and switching frequency ($f_{SW}$) for embodiments of power converter circuits is disclosed herein.

Results of experimental verification for a 15 KW DC-DC power converter in accordance with an experimental embodiment in half-bridge and full-bridge modes, under varying input voltage, output voltage, and power levels, is disclosed.

Table III summarizes an example of design requirements of the converter disclosed herein. A Li-ion NMC cell varies from 3-4.2V representing 0-100% state of charge. A 1.25 kV battery pack would require serialization of 296 cells, resulting in a total battery voltage swing from 890-1250V. The maximum power defined in SAE J3068 is 166 KW. In various embodiments, the converter in accordance with the present disclosure is expected to operate in a multi-module IPOP architecture 200, as shown in FIG. 2. Accordingly, the power level of the converter is approximately 1/10th of the maximum power, and is set to 15 kW.

TABLE III

DESIGN TARGETS OF THE R3L DUAL
ACTIVE BRIDGE CONVERTER

| Design Variable | Description | Specification |
|---|---|---|
| $V_{PFC}$ | PFC DC link range | 300-850 V |
| $V_{batt}$ | Battery voltage range | 890-1250 V |
| $P_{out}$ | Power rating | 15 kW |

Reconfigurable Neutral-Point Clamped Converter

As the conversion ratio of a dual active bridge (DAB) converter deviates from unity, circulating current in the converter increases, resulting in an increase in transformer and switch RMS and peak current, increased conversion effort (bucking or boosting operation) and a detrimental impact on efficiency. Modulation techniques may be used to improve ZVS range and peak current stress of a DAB converter. Specifically, topology morphing control (TMC) may be utilized, wherein a bridge of a dc/dc converter is switched between half-or full-bridge mode depending upon a level of an input DC link voltage, in order to reduce the extent of the voltage swing observed by a high-frequency link. At lower DC link voltages, the bridge is configured in full-bridge mode, while at higher DC link voltages, it is configured in half-bridge mode, thus ensuring reduced voltage swing across the bridge input.

In some embodiments, a conversion ratio d of a DAB converter may be defined by equation (3), below. In such embodiments, conversion ratio d is a function of output voltage $V_B$, input voltage $V_P$, secondary to primary turns ratio n, and configuration factor $k_{config}$. $K_{config}$ is set to 1 while operating in full-bridge mode and is set to 0.5 while operating in half-bridge mode.

$$d = \frac{V_B}{nV_P k_{config}} \quad (3)$$

Figure 4A:
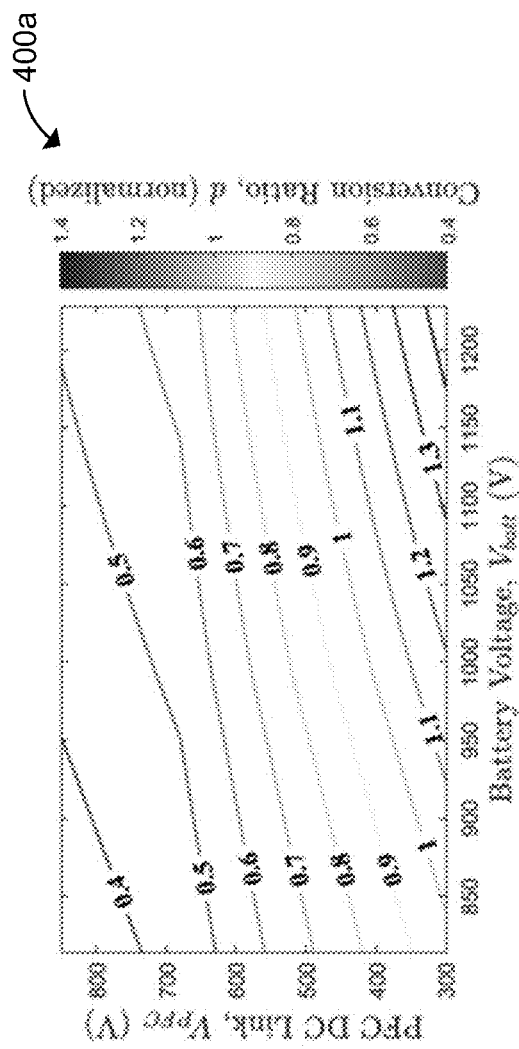
FIG. 4a is a contour map showing a range of conversion ratios of an example DC-DC converter without using topology morphing control.
Figure 4B:
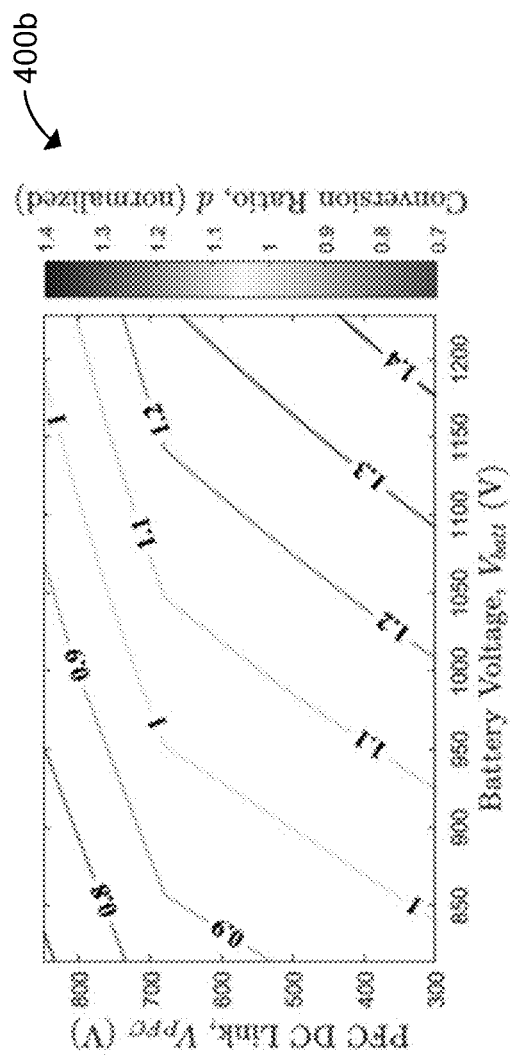
FIG. 4b is a contour map showing a range of conversion ratios of an example DC-DC converter with using topology morphing control.

Referring to FIG. 4a, a contour map 400a of a conversion ratio d of an embodiment of a DAB converter, wherein the primary only operates in full-bridge mode without any topology morphing control, is shown, and conversion ratio d can be seen in a range between 0.34-1.46. FIG. 4b shows a contour map 400b of a conversion ratio d of an embodiment of a DAB converter, wherein the primary is operated in full-bridge mode when $V_{PFC}$=300V, and in half-bridge mode when $V_{PFC}$=680/850V. As demonstrated, the range of d reduces to 0.68-1.46.

Figure 5:
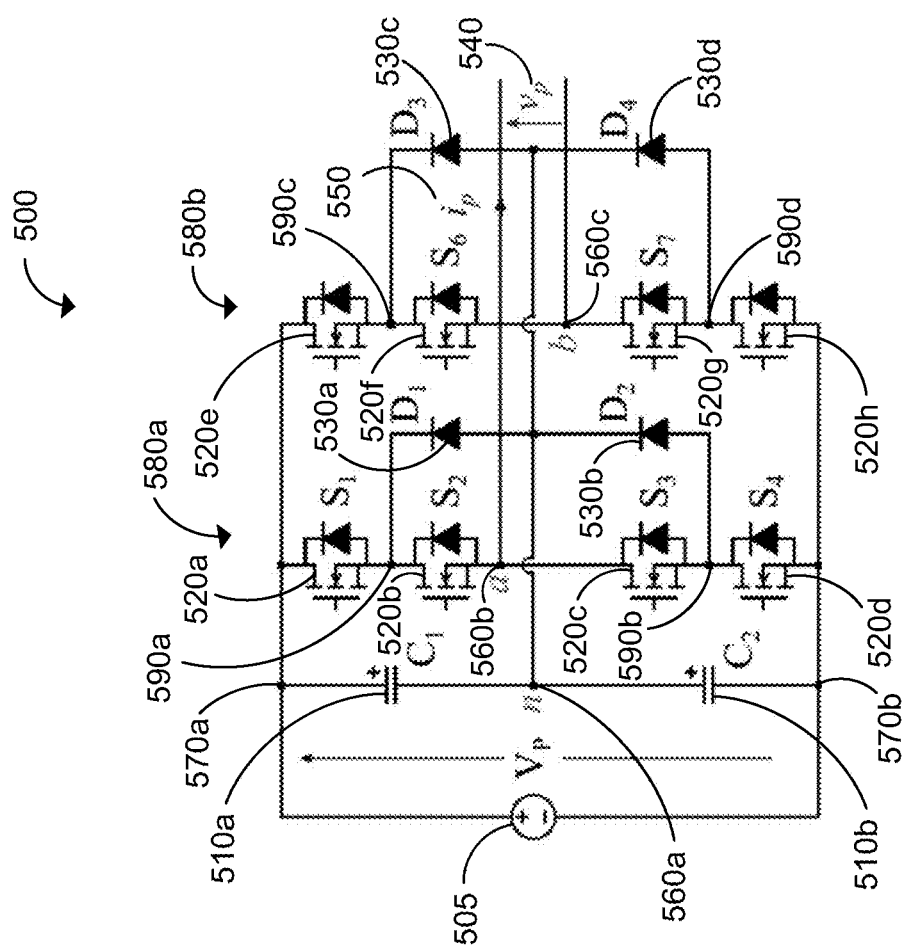
FIG. 5 is a schematic diagram of a conventional neutral-point clamped (NPC) converter.

Reference is made to FIG. 5, which illustrates a schematic view of an example conventional neutral-point clamped (NPC) converter 500 topology for DC-AC conversion. NPC converter 500 converts DC input voltage $V_P$ 505 into AC output voltage $v_p$ 540 and supplies AC output current $i_p$ 550. NPC converter 500 includes DC-link capacitors $C_1$ and $C_2$ (510a, 510b), and comprises a first branch 580a and a second branch 580b. DC-link capacitors 510a and 510b are connected in series across input voltage 505. DC-link capacitors 510a and 510b connect at floating neutral node 560a.

In some embodiments described herein, switches used may be MOSFET type switches.

The first branch 580a comprises an output node 560b and junction nodes 590a and 590b. Junction node 590a is connected to input voltage 505 cathode 570a through switch 520a, to output node 560b through switch 520b, and to floating neutral node 560a through diode 530a. Junction node 590b is connected to input voltage 505 anode 570b through switch 520d, to output node 560b through switch 520c, and to floating neutral node 560a through diode 530b.

The second branch 580a comprises an output node 560c and junction nodes 590c and 590d. Junction node 590c is connected to input voltage 505 cathode 570a through switch 520e, to output node 560c through switch 520f, and to floating neutral node 560a through diode 530c. Junction node 590d is connected to input voltage 505 anode 570b through switch 520h, to output node 560c through switch 520g, and to floating neutral node 560a through diode 530d. In some embodiments, branch 580b may be modulated with a separation of dead time and in such a way that switch S5 (520e) is switched inversely to switch S7 (520g) and switch S6 (520f) is switched inversely to switch S8 (520h).

Figure 6:
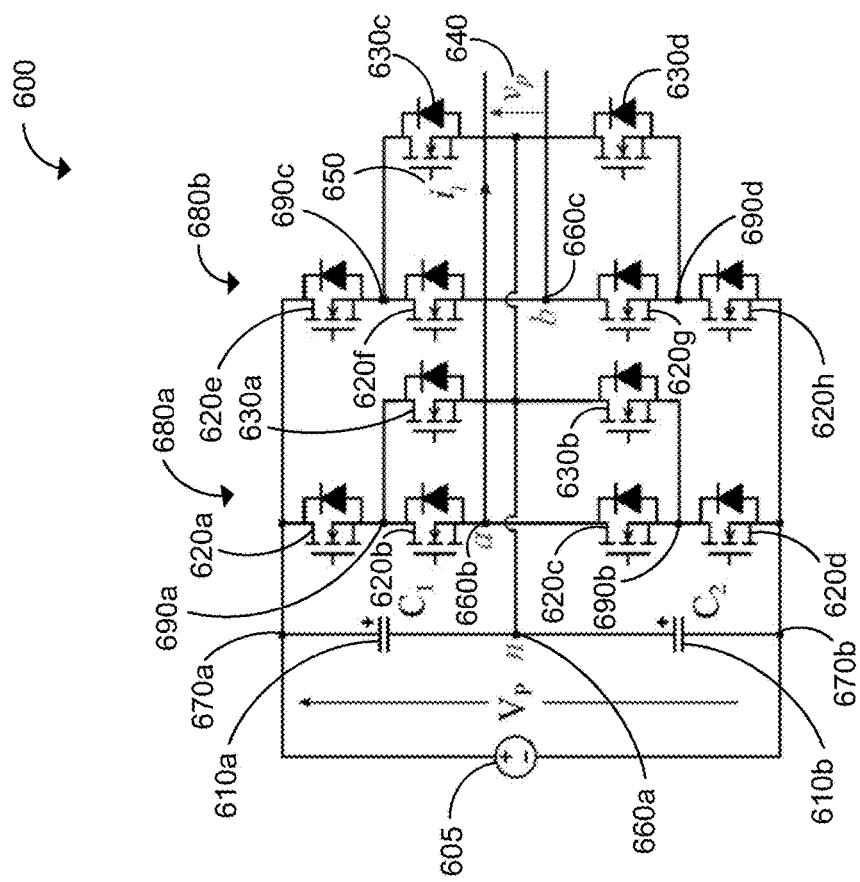
FIG. 6 is a schematic diagram of an active neutral-point clamped (ANPC) converter.

Reference is next made to FIG. 6, which shows an example active neutral point clamped converter (ANPC) 600. ANPC converter 600 converts DC input voltage $V_p$ 605 into AC output voltage $v_p$ 640 and supplies AC output current $i_p$ 650. NPC converter 600 includes DC-link capacitors $C_1$ and $C_2$ (610a, 610b), and comprises a first branch 680a and a second branch 680b. DC-link capacitors 610a and 610b are connected in series across input voltage 605. DC-link capacitors 610a and 610b connect at floating neutral node 660a.

The first branch 680a comprises an output node 660b and junction nodes 690a and 690b. Junction node 690a is connected to input voltage 605 cathode 670a through switch 620a, to output node 660b through switch 620b, and to floating neutral node 660a through diode 630a. Junction node 690b is connected to input voltage 605 anode 670b through switch 620d, to output node 660b through switch 620c, and to floating neutral node 660a through diode 630b.

The second branch 680a comprises an output node 660c and junction nodes 690c and 690d. Junction node 690c is connected to input voltage 605 cathode 670a through switch 620e, to output node 660c through switch 620f, and to floating neutral node 660a through diode 630c. Junction node 690d is connected to input voltage 605 anode 670b through switch 620h, to output node 660c through switch 620g, and to floating neutral node 660a through diode 630d.

Figure 7:
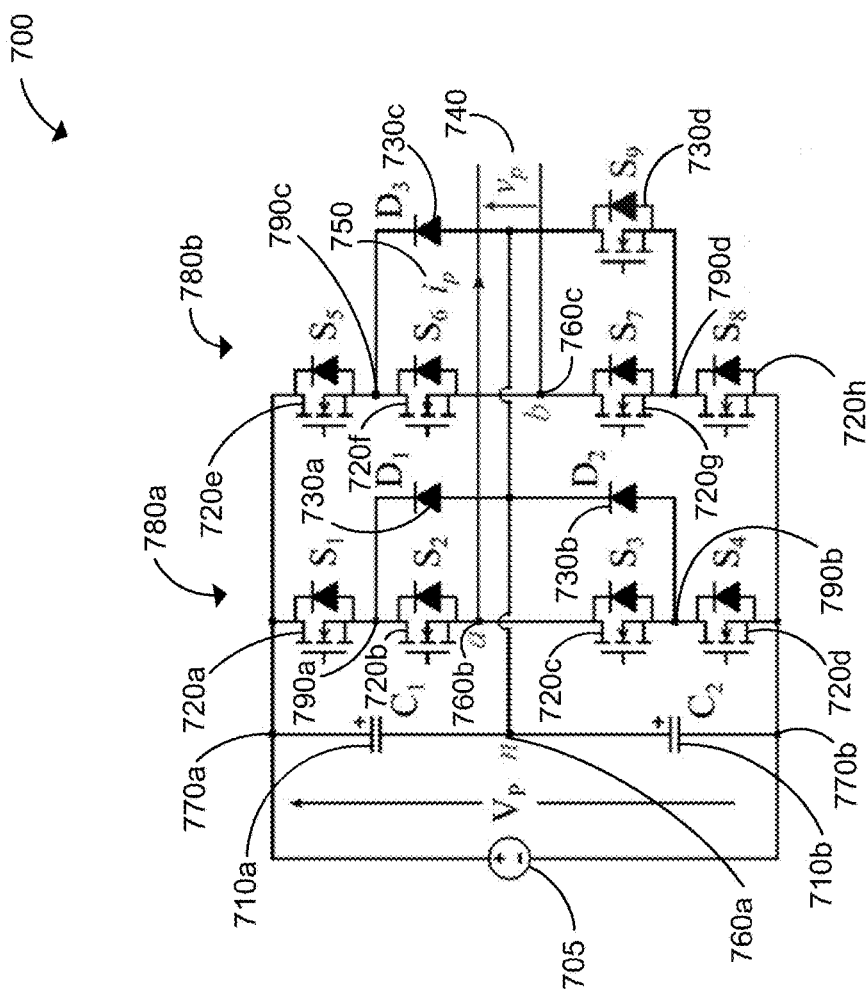
FIG. 7 is a schematic diagram of a topology of a reconfigurable neutral-point clamped (RNPC) converter in accordance with disclosed embodiments.

Reference is next made to FIG. 7, which shows an example reconfigurable neutral-point clamped (RNPC) converter topology 700 for DC-AC conversion. In the various embodiments disclosed herein, the RNPC is created by replacing diode 530d in a conventional NPC converter 500 with a switch 730d.

RNPC converter 700 converts DC input voltage $V_p$ 705 into AC output voltage $v_p$ 740 and supplies AC output current $i_p$ 770. RNPC converter 700 includes DC-link capacitors $C_1$ and $C_2$ (710a, 710b). NPC converter 700 converts DC input voltage $V_p$ 705 into AC output voltage $v_p$ 740 and supplies AC output current i 750. NPC converter 700 includes DC-link capacitors $C_1$ and $C_2$ (710a, 710b), and comprises a first branch 780a and a second branch 780b. DC-link capacitors 710a and 710b are connected in series across input voltage 705. DC-link capacitors 710a and 710b connect at floating neutral node 760a.

Table IV shows an example vector table of both a conventional NPC converter 500 and a RNPC converter 700 disclosed herein. 'O' and 'R' vectors both develop 0V referenced to potential at floating neutral node 760a. However, the 'R' vector can only be developed in a RNPC converter 700.

TABLE IV

VECTOR MATRIX OF THE NPC AND RNPC CONVERTERS.

| $S_5$ | $S_6$ | $S_7$ | $S_8$ | $S_9$ | Vector | Output referred to 'n' | Converter |
|---|---|---|---|---|---|---|---|
| 1 | 1 | 0 | 0 | X | P | $+V_p/2$ | NPC/RNPC |
| 0 | 1 | 1 | 0 | X | O | 0 | NPC/RNPC |
| 0 | 0 | 1 | 1 | X | N | $-V_p/2$ | NPC/RNPC |
| 0 | 0 | 1 | 0 | 1 | R | 0 | RNPC only |

The first branch 780b comprises an output node 760c and junction nodes 790c and 790d. Junction node 790c is connected to input voltage 705 cathode 770a through switch 720e, to output node 760c through switch 720f, and to floating neutral node 760a through diode 730c. Junction node 790d is connected to input voltage 705 anode 770b through switch 720h, to output node 760c through switch 720g, and to floating neutral node 760a through reconfiguration switch 730d.

The second branch 780a comprises an output node 760b and junction nodes 790a and 790b. Junction node 790a is connected to input voltage 705 cathode 770a through switch 720a, to output node 760b through switch 720b, and to floating neutral node 760a through diode 730a. Junction node 790b is connected to input voltage 705 anode 770b through switch 720d, to output node 760b through switch 720c, and to floating neutral node 760a through diode 730b.

In some embodiments, to operate either NPC converter 500 or RNPC converter 700 in full-bridge mode, a modulation scheme representing the P/O/N vectors detailed in Table III can be individually applied to either of the branches, and an output voltage swing v (t)=+$V_p$ is generated at 740. To operate an NPC converter 500 in half-bridge mode, switch S6 (520f) and switch S7 (520g) are turned on, resulting in an 'O' vector on branch 580b, and limiting the output voltage swing at 540 to $$v(t) = \pm \frac{V_P}{2}.$$

Figure 8A:
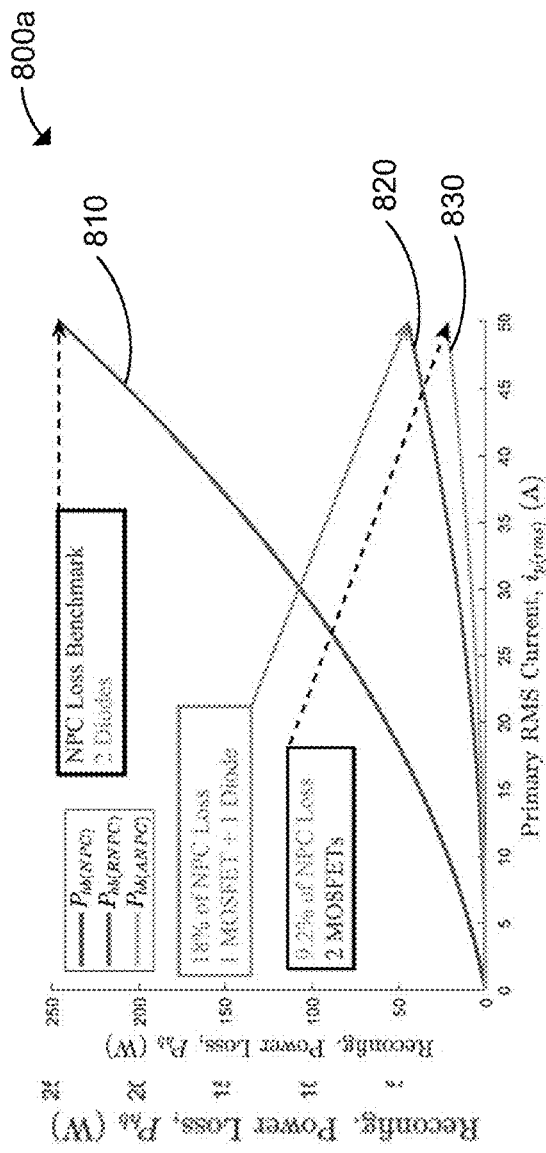
FIG. 8a is a graph of a comparison of reconfiguration power losses between NPC, RNPC, and ANPC converters.

Reference is next made to FIG. 8a, which shows a comparison in reconfiguration power loss 810 in an NPC converter 500, reconfiguration power loss 820 in an RNPC converter 700, and reconfiguration power loss 830 in an ANPC converter 600. The reconfiguration power loss 810 is defined as the additional conduction loss experienced in the DC-DC converter when switched to half-bridge mode. This difference results from permanently routing the AC node's potential over one half-bridge to neutral instead. The reconfiguration power loss 810 in an NPC converter is given by the expression:

$$P_{hb(NPC)} = i_{p(rms)}^2 \left( R_{ds(on)} + R_d + \frac{\sqrt{2} V_{T0}}{i_{p(rms)}} \right) \quad (4)$$

Where $i_{p(rms)}$ is the RMS current handled by the bridge. $R_{ds(on)}$ is the on-state resistance of the MOSFET. $R_d$ is the on-state resistance of the clamp diodes. $V_{T0}$ is the clamp diode threshold voltage.

The reconfiguration power loss 820 in a RNPC converter is given by the following expression:

$$P_{hb(RNPC)} = 2i_{p(rms)}^2 R_{ds(on)} \quad (5)$$

The reconfiguration power loss 830 in an ANPC converter is given by the following expression:

$$P_{hb(ANPC)} = i_{p(rms)}^2 R_{ds(on)} \quad (6)$$

When $R_{ds(on)}=9\Omega$, $R_d$, $R_d=59m\Omega$, $V_{T0}=1.07V$, and $i_{p(rms)}=50A$, losses 810 for the NPC 500 are 245 W, losses 820 for the RNPC 700 are 44 W, and losses 830 for the ANPC 600 are 22 W. The losses 810 of the NPC converter 500 are greater than the losses 820 of a RNPC 700 or the losses 830 of an ANPC 600, thus making the topology less suitable for topology morphing control at high RMS current levels.

In embodiments of the reconfiguration method described herein, the method does not require additional relays or contactors, and is solid-state in nature. This improves the reliability of the application, since utilization of electromechanical devices with a fatigue life affected by vehicle vibrations is a cause of concern in an on-board charger application. Additionally, RNPC converter 700 saves the cost of one gate driver and MOSFET when compared to ANPC converter 600 and provides a reconfiguration option with a lower switch-count in its comparison, thus providing a trade-off for cost-sensitive applications.

Figure 8B:
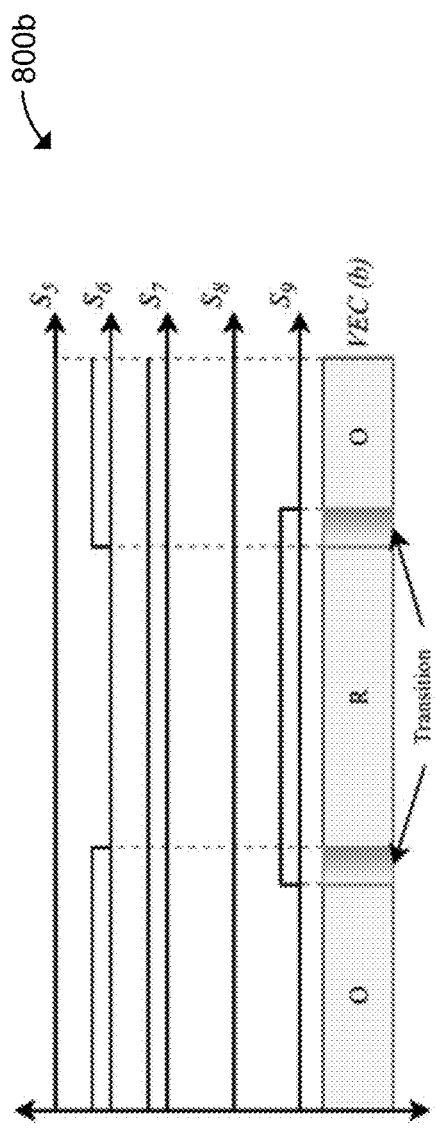
FIG. 8b is a diagram showing proposed gate pulse sequence to perform reconfiguration between an 'O' vector and an 'R' vector for an RNPC converter.

Reference is next made to FIG. 8b, which shows an example pulse sequence to switch from the 'O' vector to the 'R' vector (half-bridge mode), and vice versa. In some embodiments, switching the DAB converter between half-bridge and full-bridge modes may include ceasing a modulation of the converter, and switching RNPC branch 710b to the 'O' vector. This sequence may prevent transient overvoltages on the branch 710b while transition is in progress.

Reconfigurable Three-Level Dual Active Bridge Converter

Figure 9:
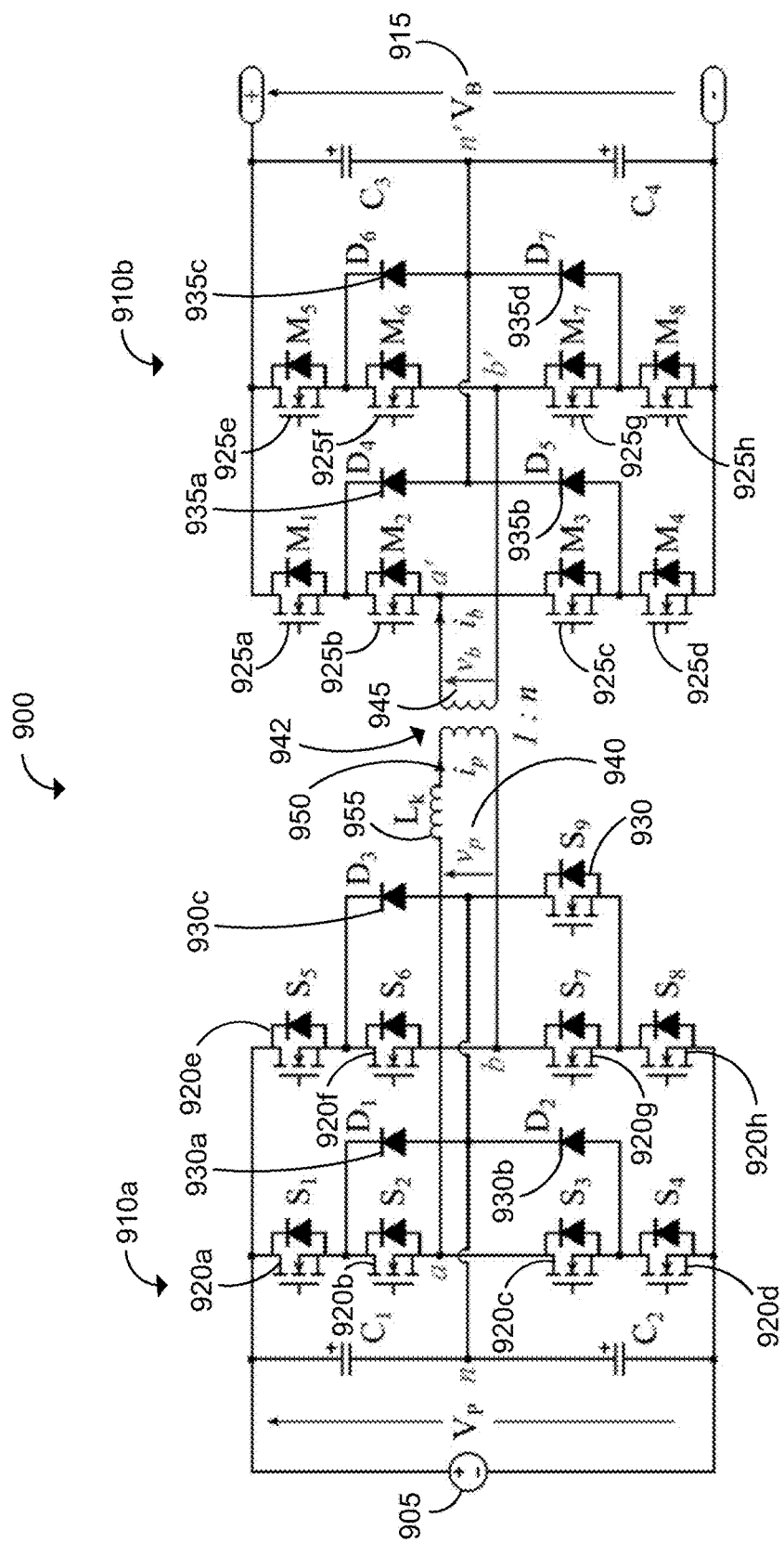
FIG. 9 is a schematic diagram of a DC-DC power converter topology in accordance with an example embodiment.

Reference is next made to FIG. 9, which shows an example reconfigurable three-level dual active bridge (R3L-DAB) converter topology 900 for DC-DC conversion. Converter 900 comprises a primary circuit 910a coupled to a fixed or variable DC input voltage 905, a secondary circuit 910b coupled to a DC output voltage 915, and a transformer 942 isolating the primary circuit from the secondary circuit with a secondary to primary turns ratio n. The converter 900 includes an internal leakage inductance Lx 955 representing the system's total leakage inductance. Primary bridge voltage $v_p$ (940) is observed at the output of the primary circuit 910a and secondary bridge voltage $V_b$(945) is observed at the input of secondary circuit 910b.

In the exemplary embodiment, primary circuit 910a comprises a RNPC circuit 700 and secondary circuit 910b comprises an NPC converter 500. A high-frequency link is generated using leakage inductance 955 and isolation transformer 942.

Analogous to what was shown in FIG. 7 for the RNPC circuit, FIG. 9 shows switches 920a, 920b, 920c, 920d, 920e, 920f, 920g, 930, diodes 930a, 930b, 930c, 930d, and input voltage 905 for primary circuit 910a.

Analogous to what was shown in FIG. 5 for the NPC circuit, FIG. 9 shows switches 925a, 925b, 925c, 925d, 925e, 925f, 925g, 925h, diodes 935a, 935b, 935c, 935d, and output voltage 915 for secondary circuit 910b.

In some embodiments, the voltage swing across the input voltage 905 may be greater than the voltage swing across the output voltage. In such instances, the primary circuit 910a may comprise a RNPC circuit analogous to converter 700, as shown in FIG. 7, and the secondary circuit 910b comprises an NPC circuit analogous to converter 500, as shown in FIG. 5. In other embodiments, the voltage swing of the output voltage may be greater than the voltage swing of the input voltage. In such instances, the primary circuit 910a comprises an NPC converter 500 and the secondary circuit 910b comprises an RNPC converter 700.

Figure 10A:
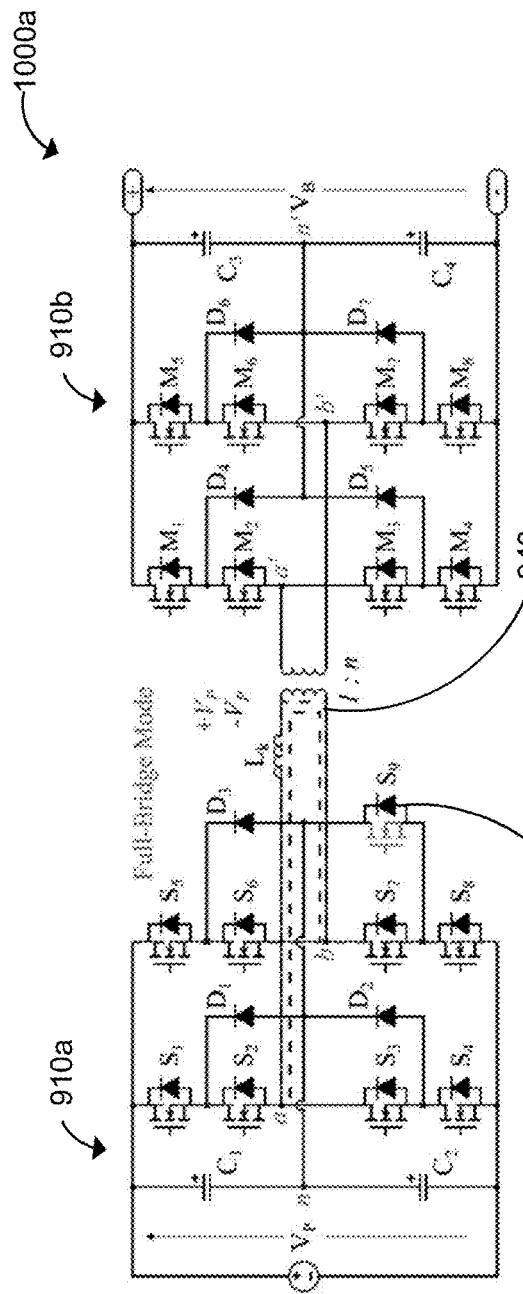
FIG. 10a and FIG. 10b are schematic diagrams of the DC-DC power converter of FIG. 9, showing example operational modes in full-bridge mode and half-bridge mode, respectively.

Reference is next made to FIG. 10a, which shows a DAB converter 900 of FIG. 9 with primary circuit 910a operating in two-level full-bridge mode to produce two output voltage levels of $V_p$ and $-V_p$ at transformer primary side 940. The gate command of switch 930 is maintained at logic 0, thus only allowing its body diode to conduct and serve as a clamp diode. The voltage swing observed across the transformer primary 940 is $+V_p$.

Figure 10B:
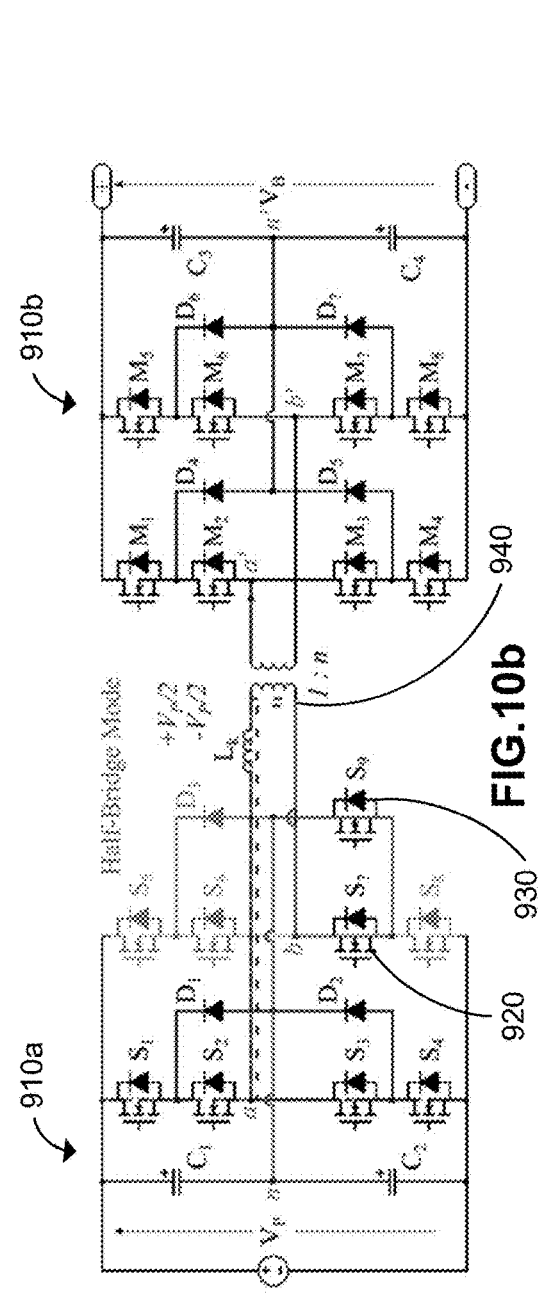

Reference is next made to FIG. 10b, which shows the DAB converter 900 of FIG. 9 with primary circuit 910a operating in two-level half-bridge mode to produce two output voltage levels $$\frac{V_P}{2} \text{ and } -\frac{V_P}{2}$$

at transformer primary 940. In this configuration, switches 920g and 930 are permanently switched on, creating a permanent connection between nodes 'b' and 'n', resulting in a voltage swing of $$\pm \frac{V_P}{2}$$

observed across the transformer primary 940.

In some embodiments, primary circuit 910a may be extended to three-level operation based on the half-bridge mode. In some embodiments, primary circuit 910a may be extended to five-level operation based on the full-bridge mode.

Figure 11:
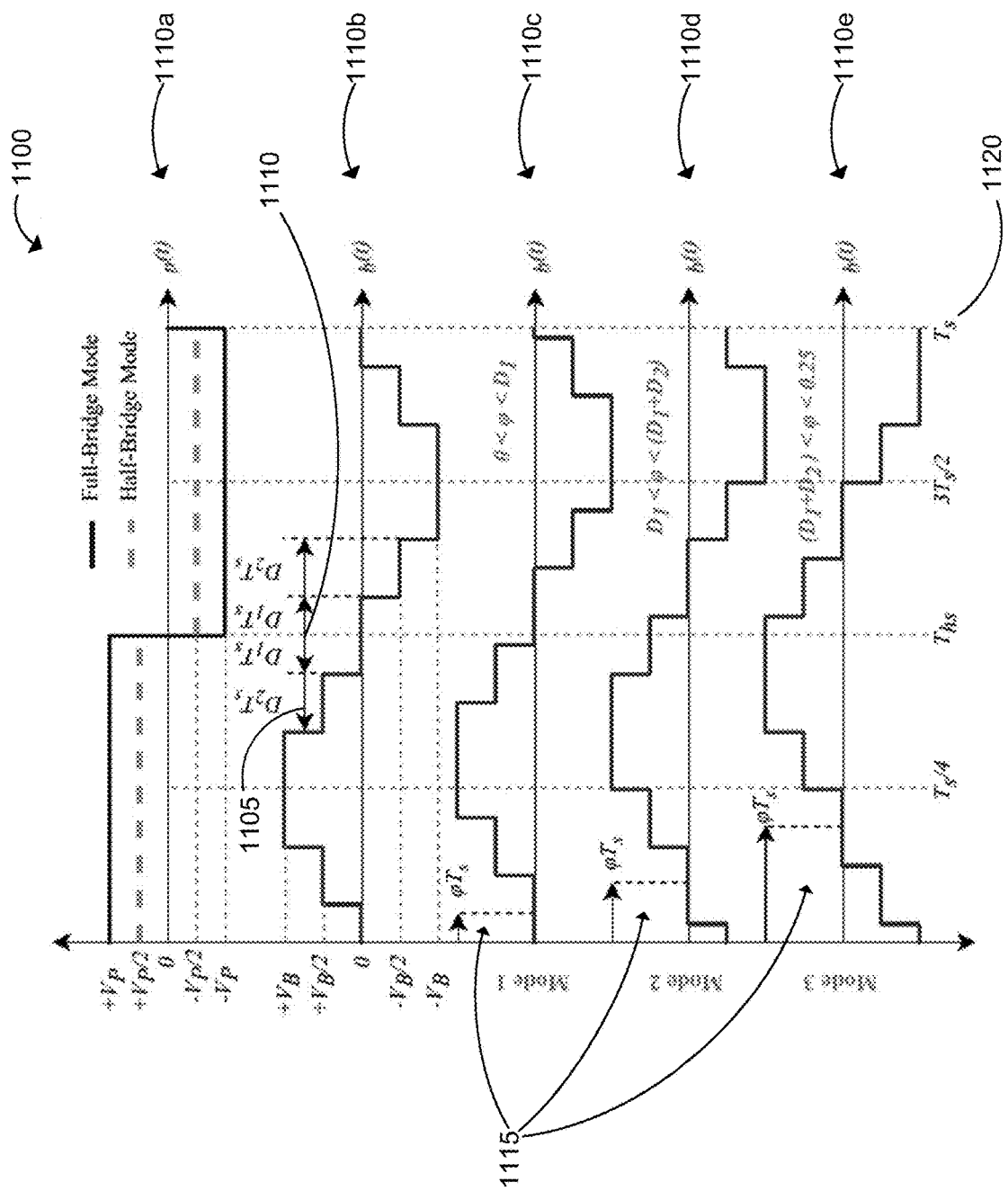
FIG. 11 is a diagram showing example voltage waveforms of primary voltage and output voltage for various example operating modes of the DC-DC converter of FIG. 9.

Reference is next made to FIG. 11, which shows various operating modes of the DAB converter 900. In some embodiments, the primary side operates in two-level full-bridge or two-level half-bridge mode (as shown in graph 1110a) while a five-level waveform is produced on the secondary side 945 (as shown in graph 1110b). The secondary excitation is controlled by a first duty cycle $D_1$ (1105) and a second duty cycle $D_2$ (1110). The power transfer between the two ports is controlled by the phase shift φ (1115) between the primary voltage 940 and the secondary voltage 945, wherein phase shift 1115 is referenced to the zero position of the voltages.

When phase shift φ 1115 is positive, power is transferred from $V_P$ 905 to $V_B$ 915. When phase shift φ 1115 is negative, power is transferred from $V_B$ 915 to $V_p$ 905. The DAB converter 900 may operate in a first mode of operation 1110c when phase shift φ 1115 is greater than 0 and less than the first duty cycle $D_1$ (1105). The DAB converter 900 may operate in a second mode 1110d when phase shift φ 1115 is greater than the first duty cycle $D_1$ and less than the combination of the first duty cycle $D_1$ and the second duty cycle $D_2$. The DAB converter 900 may operate in a third mode 1110e when $(D_1+D_2)<\varphi<0.25$. Each of these operating modes are applicable when the DAB 900 is operated in either the full-bridge or the half-bridge configuration.

A selection between operating in first mode 1110c, second mode 1110d, and third mode 1110e may be made on the basis of maximizing the efficiency of the DAB converter 900. In some embodiments, this choice may be made based on the input voltage, output voltage, and output power. Identifying the particular solution may involve solving a multivariable optimization problem.

For the purposes of consistency and convenience of description, DAB converter 900 generally operates in the third mode 1110e in the embodiments described herein. Nevertheless, this does not limit the DAB converter 900 from operating in any one of the above-described modes in accordance with the principles described herein.

Figure 12:
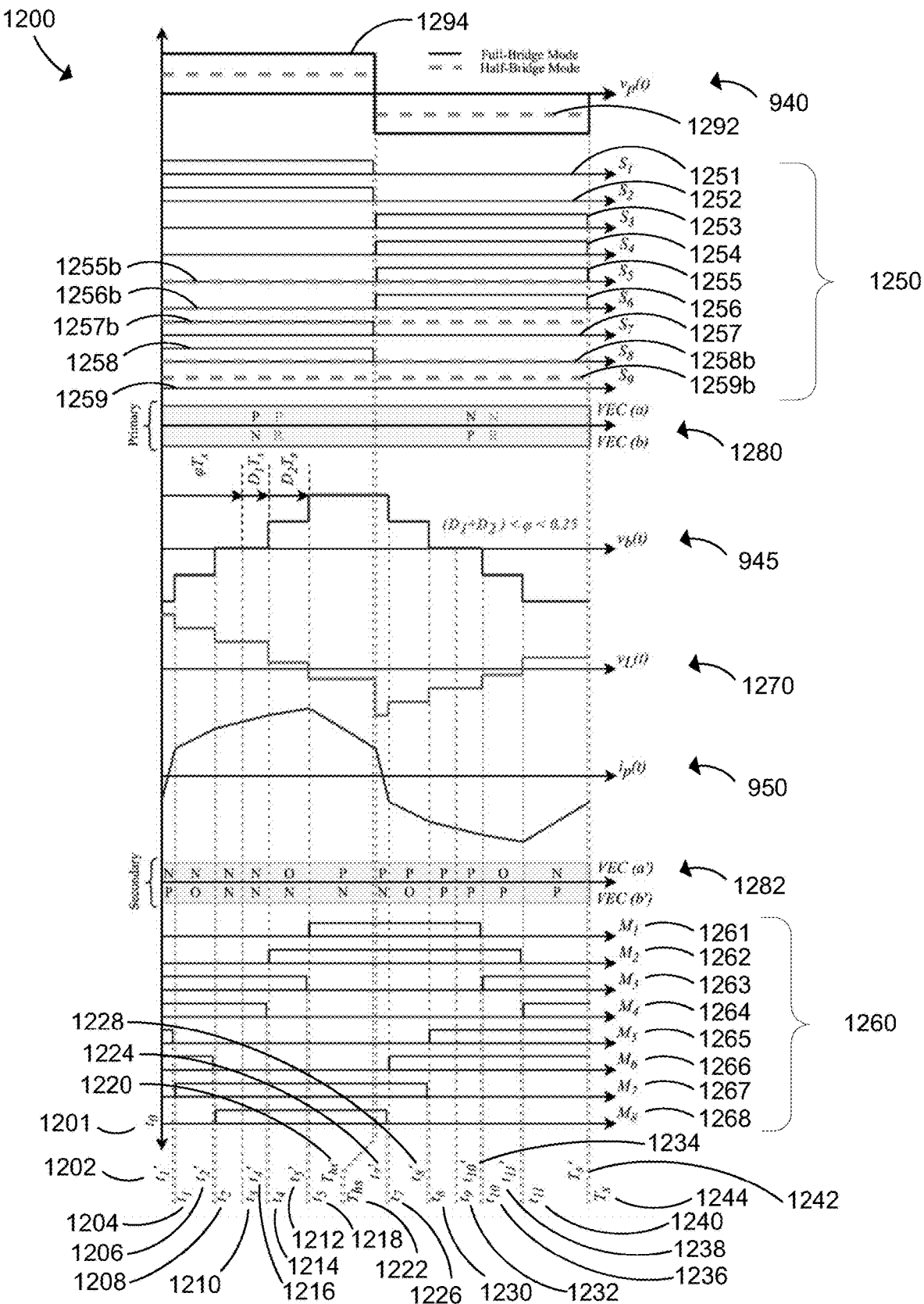
FIG. 12 is timing diagram showing example waveforms of gating signals and various electrical quantities for the DC-DC converter of FIG. 9.

Reference is next made to FIG. 12, which shows relationships between various signals in the circuit in an example modulation scheme 1200 for a DAB converter 900 of FIG. 9 operating in a third mode 1110e over a time period of $T_S$. Time periods from $t_0$ to $T_S$ (1201-1244) are shown on the x-axis. Gating signals waveforms for switches $S_1$-$S_9$ in full bridge mode (1251-1259), for $S_5$-$S_9$ in half bridge mode (1255b-1259b), and for $M_1$-$M_8$ (1261-1268) are shown.

Primary gating signals 1250 are gating signals to switches 920a-920h and 930 respectively of DAB converter 900 from FIG. 9. Secondary gating signals 1260 are gating signals to switches 925a-925h of DAB converter 900. Transformer primary voltage $v_p$ 940 for full bridge mode (1294) and half-bridge mode (1292), inductor voltage $v_L$ 1270, secondary voltage $v_b$ 945, inductor current $i_p$ 950 are shown. Modulation vectors 1290 for primary circuit 910a and modulation vectors 1282 are shown for secondary circuit 910b.

In some embodiments where the DAB converter 900 operates in full-bridge mode and in the third mode 1110e, the relationship between the gating signals is $S_1$ (1251)=$\overline{S_3}$ (1253), $S_2$ (1252)=$\overline{S_4}$ (1254), $S_5$ (1255)=$\overline{S_7}$ (1257), $S_6$ (1256)=$\overline{S_8}$ (1258). The complementary signals are separated by a dead time $t_{dead}$ at the turn-off interval, which is depicted in graph as the interval between $t'_x$ and $t_x$, where $x \in \{0 \ldots 12\}$. $t_6$ is represented by half-cycle period $T_{hs}$ 1222 and $t_{12}$ is represented by switching period $T_S$ 1244. As shown according to primary voltage waveform 940, primary side 910a can be connected to the RNPC converter 700 and can be operated in full-bridge or half-bridge mode. The secondary side 910b can be operated in full-bridge mode and generates a five-level waveform 945 based on symmetric modulation scheme 1200.

Table V summarizes turn-on and turn-off criterion for switches S1-S9 (920a-920h, 930, respectively) and M1, M2, M5, M6 (925a, 925b, 925e, 925f, respectively) of the DAB converter 900 in the third operating mode 1110e for both full-bridge and half-bridge operation. The specified modulation criterion is valid for third mode 3 1110e in the forward power mode ($0<\varphi<0.25$). In some embodiments, the modulation criterion can be realized using a digital signal processor (DSP) or field programmable gate array (FPGA) for modes 1, 2, and reverse power mode ($-0.25<\varphi<0$) provided the necessary overflow conditions of the PWM modules are managed according to the implementation platform.

TABLE V

SWITCHING CRITERION OF THE R3L-DAB CONVERTER IN MODE 3.

| Switch | Turn-on instance $t_{on}$ | Turn-off instance $t_{off}$ |
|---|---|---|
| $S_{1,2}$ | 0 | $T_{hs}$ |
| $S_{5,6}$ | $T_{hs}$ | $T_s$ |
| $S_{5,6,8}$ | Always off (half-bridge) | |
| $S_{7,9}$ | Always on (half-bridge) | |
| $M_1$ | $(\varphi + D_1 + D_2)T_s$ | $(2\{\varphi + D_1\} + 1)T_{hs}$ |
| $M_2$ | $(\varphi + D_1)T_s$ | $(2\{\varphi + D_1 + D_2\} + 1)T_{hs}$ |
| $M_5$ | $(2\{\varphi - D_1\} + 1)T_{hs}$ | $(\varphi - D_1 - D_2)T_s$ |
| $M_6$ | $(2\{\varphi - D_1 - D_2\} + 1)T_{hs}$ | $(\varphi - D_1)T_s$ |

Reference is made to FIGS. 13a-13j, which show current paths of a converter 900 in accordance with disclosed embodiments, in full-bridge mode 3 operation, from time interval $t_0$ (1201) to time interval $T'_{hs}$ (1220).

FIG. 13a shows the current paths from $t_0$ (1201) to $t'_1$ (1202) in the region when the inductor current 950 is negative. As shown by current paths 1312a, 1314a, switches 920a, 920b, 920g, 920h, 925e, 925f, 925c, 925d are conducting.

FIG. 13b shows the current paths from $t_0$ (1201) to $t'_1$ (1202) in the region when the inductor current 950 is positive. As shown by current paths 1312b, 1314b, switches 920a, 920b, 920g, 920h, 925e, 925f, 925c, 925d are conducting.

FIG. 13c shows the current paths from $t'_1$ (1202) to $t_1$ (1204). As shown by current paths 1312c, 1314c, switches 920a, 920b, 920g, 920h, 925c, 925d and the body diodes of switches 925g, 925h are conducting.

FIG. 13d shows the current paths from $t_1$ (1204) to $t'_2$ (1206). As shown by current paths 1312d, 1314d, switches 920a, 920b, 920g, 920h, 925f, 925c, 925d and diode 935c are conducting.

FIG. 13e shows the current paths from $t'_2$ (1206) to $t_2$ (1208). As shown by current paths 1312e, 1314e, switches 920a, 920b, 920g, 920h, 925c, 925d, 925g and the body diodes of switches 925g, 925h are conducting.

FIG. 13f shows the current paths from $t_2$ (1208) to $t'_4$ (1216). As shown by current paths 1312f, 1314f, switches 920a, 920b, 920g, 920h, 925c, 925d, 925g, 925h are conducting.

FIG. 13g shows the current paths from $t'_4$ (1216) to $t_4$ (1214). As shown by current paths 1312g, 1314g, switches 920a, 920b, 920g, 920h, 925g, 925h and the body diodes of switches 925a, 925b are conducting.

FIG. 13h shows the current paths from $t_4$ (1214) to $t'_5$ (1212). As shown by current paths 1312h, 1314h, switches 920a, 920b, 920g, 920h, 925c, 925g, 925h and diode 935b are conducting.

FIG. 13i shows the current paths from $t'_5$ (1212) to $t_5$ (1218). As shown by current paths 1312i, 1314i, switches 920a, 920b, 920g, 920h, 925b, 925g, 925h and the body diode of switch 925a are conducting.

FIG. 13j shows the current paths from $t'_5$ (1218) to $T'_{hs}$ (1220). As shown by current paths 1312j, 1314j, switches 920a, 920b, 920g, 920h, 925a, 925b, 925g, 925h are conducting.

FIGS. 14a-14j, show current paths of the converter 900 in full-bridge mode 3 operation from time interval $T'_{hs}$ to time interval $T_S$.

FIG. 14a shows the current paths from $T'_{hs}$ (1220) to $T_{hs}$ (1222). As shown by current paths 1412a, 1414a, switches 925a, 925b, 925g, 925h and the body diodes of switches 920e, 920f, 920c, 920d are conducting.

FIG. 14b shows the current paths from $T_{hs}$ (1222) to t'₇ (1224) when inductor current 950 is positive. As shown by current paths 1412b, 1414b, switches 920e, 920f, 920c, 920d, 925a, 925b, 925g, 925h are conducting.

FIG. 14c shows the current paths from $T_{hs}$ (1222) to t'₇ (1224) when inductor current 950 is negative. As shown by current paths 1412c, 1414c, switches 920e, 920f, 920c, 920d, 925a, 925b, 925g, 925h are conducting.

FIG. 14d shows the current paths from t'₇ (1202) to t'₈ (1204). As shown by current paths 1412d, 1414d, switches 920e, 920f, 920c, 920d, 925a, 925b, 925g and diode 935d are conducting.

FIG. 14e shows the current paths from t'₈ (1228) to t₈ (1230). As shown by current paths 1412e, 1414e, switches 920e, 920f, 920c, 920d, 925a, 925b, 925f and the body diode of switch 925e are conducting.

FIG. 14f shows the current paths from t₈ (1230) to t'₁₀ (1234). As shown by current paths 1412f, 1414f, switches 920e, 920f, 920c, 920d, 925a, 925b, 925e, 925f are conducting.

FIG. 14g shows the current paths from t'₁₀ (1234) to t'₁₁ (1238). As shown by current paths 1412g, 1414g, switches 920e, 920f, 920c, 920d, 925b, 925e, 925f and diode 935a are conducting.

FIG. 14h shows the current paths from t'₁₁ (1238) to t₁₁ (1240). As shown by current paths 1412h, 1414h, switches 920e, 920f, 920c, 920d, 925c, 925e, 925f and the body diode of 925d are conducting.

FIG. 14i shows the current paths from t₁₁ (1240) to T'ₛ (1242). As shown by current paths 1412i, 1414i, switches 920e, 920f, 920c, 920d, 925c, 925d, 925e, 925f are conducting.

FIG. 14j shows the current paths from T'ₛ (1242) to Tₛ (1244). As shown by current paths 1412j, 1414j, switches 925c, 925d, 925e, 925f and the body diodes of switches 920a, 920b, 920g, 920h are conducting.

Reference is next made to FIGS. 15a-15d, which shows steady state current paths of the primary circuit 910a of the DAB converter 900 in accordance with disclosed embodiments in half-bridge mode 3 operation. The current paths of the secondary circuit 910b remain the same as secondary current paths in full-bridge operating mode, shown from FIG. 13a-FIG. 14j.

FIG. 15a shows the steady state current paths from t'₀ (1201) to T'$_{hs}$ (1220). As shown by current path 1512a, switches 920a, 920b, 920g, 930 are conducting.

FIG. 15b shows the steady state current paths from T'hs (1220) to $T_{hs}$ (1222). As shown by current path 1512b, switches 920g, 930 and the body diodes of switches 920c, 920d are conducting.

FIG. 15c shows the steady state current paths from $T_{hs}$ (1222) to T's (1242). As shown by current path 1512c, switches 920c, 920d, 920g, 930 are conducting.

FIG. 15d shows the steady state current paths from T's (1242) to Tₛ (1244). As shown by current path 1512d, switches 920g, 930 and the body diodes of switches 920a, 920b, are conducting.

Steady State Analysis

Closed-form solutions of quantities in the circuit are herein derived. $i_p$ (t) is a steady-state instantaneous current in a leakage inductance 955 in a DAB converter 900 accordance with embodiments shown on FIG. 9 operating using modulation scheme 1200 as detailed in FIG. 12. $i_{p(rms)}$ is an RMS current in the leakage inductance 955.

In some embodiments, due to the use of modulation scheme 1200, there may be discontinuities observed in voltages seen by the primary 940 and secondary bridges 945. Time instances tx are unique in all modes of operation. Specifically, the time instances are defined as a function of D1 1105, D2 1110, φ 1115, and $T_s$ 1120.

Instantaneous value of a current through an inductor can be expressed by solving the following:

$$\frac{V_L(t)}{L_k} = \frac{di_p(t)}{dt} \tag{7}$$

$$\frac{V_L}{L_k} = \frac{i_p(t_{x+1}) - i_p(t_x)}{t_{x+1} - t_x} \tag{8}$$

$$i_p(t_{x+1}) = i_p(t_x) + \frac{V_L}{L_k}(t_{x+1} - t_x) \tag{9}$$

Under steady-state condition of a DAB converter 900 in accordance with disclosed embodiments, the average value of current through the leakage inductance 955 is zero, and is given by the following:

$$\langle i_p \rangle_{t=t_0}^{T_0} = 0 \tag{10}$$

Since current through the inductor 955 is half-wave symmetric, the following condition is satisfied:

$$i_p(t_0) = -i_p(T_{hs}) \tag{11}$$

Further, since operation of an RNPC converter 700 can be reconfigured between half-bridge mode 1000a and full-bridge mode 1000b, this can be reflected by choosing $k_{config}=0.5$ for half-bridge mode and $k_{config}=1$ for full-bridge mode.

The value of the inductor currents at various instances (t₁-t₆) can be calculated by solving the simultaneous equations at x=0 . . . 6 in equation (9) using the equality shown in equation (11). The solution of $i_p$ (t) in mode 3 of operation is shown in equation (12), below:

$$i_p(t) = \tag{12}$$

$$\begin{cases} \frac{(1 + D_2 - 2nD_2 - 4\varphi)V_B + (-1 + 2D_2)nV_Pk_{cfg}}{4nf_{sw}L_k} \\ \frac{(-1 + 4D_1 + 3D_2 + 2nD_2)V_B + (1 + 4D_1 + 2D_2 - 4\varphi)nV_Pk_{cfg}}{4nf_{sw}L_k} \\ \frac{(-1 + 4D_1 + D_2 + 2nD_2)V_B + (1 + 4D_1 - 2D_2 - 4\varphi)nV_Pk_{cfg}}{4nf_{sw}L_k} \\ \frac{(-1 + 4D_1 + D_2 + 2nD_2)V_B + (1 - 2D_2 - 4\varphi)nV_Pk_{cfg}}{4nf_{sw}L_k} \\ -\frac{(-1 + 4D_1 + D_2 + 2nD_2)V_B + (-1 + 4D_1 + 2D_2 + 4\varphi)nV_Pk_{cfg}}{4nf_{sw}L_k} \\ -\frac{(-1 + 4D_1 + 2D_2 + 2nD_2)V_B + (-1 + 4D_1 + 6D_2 + 4\varphi)nV_Pk_{cfg}}{4nf_{sw}L_k} \end{cases}$$

for $t = t_0 \ldots t_5$

The average power transferred through the high-frequency link is given by equation (13), below. By solving $i_p$ (t) in modes 1, 2, and 3, the power transfer equations in their respective modes are given by equations (14), (15) and (16) below.

$$P_{out} = \frac{1}{T_{hs}} \int_{t_0}^{T_{hs}} v_p(t) i_p(t) dt \qquad (13)$$

$$P_{out,1} = \frac{V_P V_B}{n f_{sw} L_k} (\varphi - 4D_1 \varphi - 2D_2 \varphi) \qquad (14)$$

$$P_{out,2} = \frac{V_P V_B}{n f_{sw} L_k} (\varphi - \varphi^2 - 2D_2 \varphi - 2D_1 \varphi - D_1^2) \qquad (15)$$

$$P_{out,3} = \frac{V_P V_B}{n f_{sw} L_k} (\varphi - 2\varphi^2 - 2D_1^2 - 2D_1 D_2 - D_2^2) \qquad (16)$$

Figure 16B:
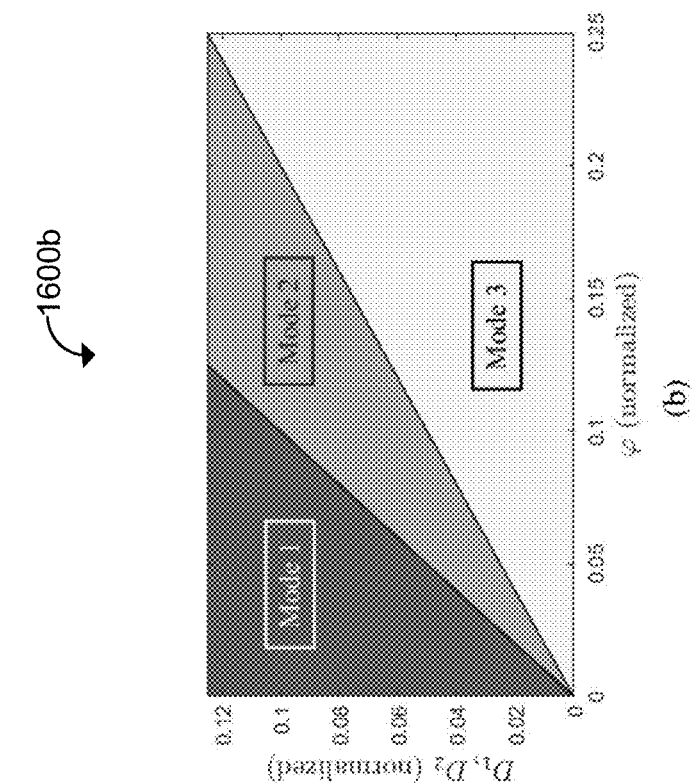
FIG. 16b is a graph showing different operating mode domains of the DC-DC converter of FIG. 9 operating in accordance with some embodiments as a function of duty cycle and phase shift.
Figure 16A:
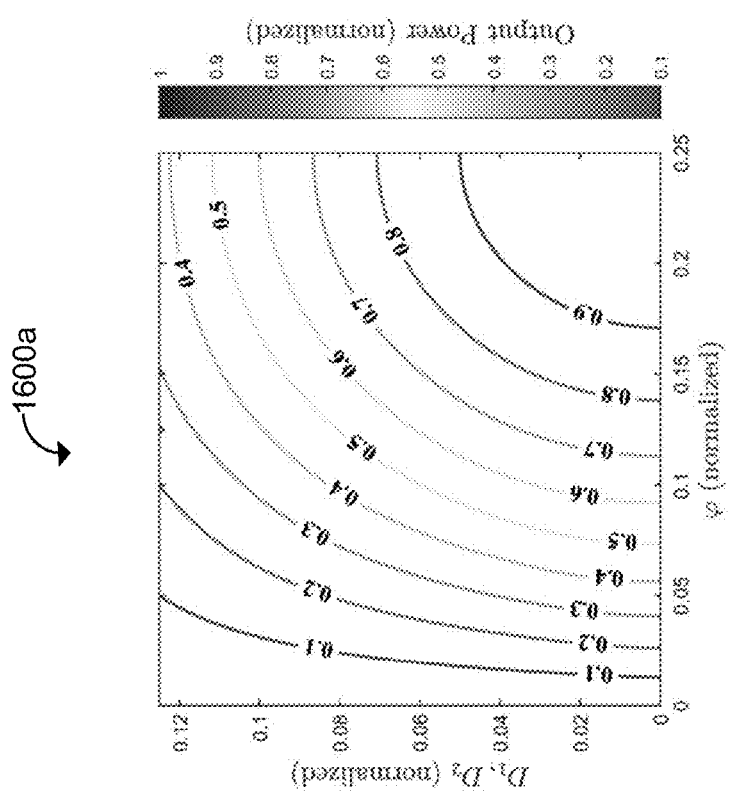
FIG. 16a is a contour map of output powers of the DC-DC converter of FIG. 9 operating in accordance with some embodiments as a function of duty cycle and phase shift.

Reference is made to FIG. 16a, which shows a graph 1600a of the normalized output power variation as a function of D1, D2, and φ when 0<φ<0.25, 0<D1<0.125, and D1=D2, while FIG. 16b shows a graph 1600b of the mode variation as a function of D1, D2, and φ when 0<φ<0.25, 0<D1<0.125, and D1=D2.

Leakage inductance RMS current $\bar{i}_{p(rms)}$ through a DAB converter 900, in accordance with various embodiments, may be calculated using its general form as seen in equation (17), below:

$$i_{p(rms)} = \sqrt{\frac{1}{T_s} \int_{t_\theta}^{T_s} i_p^2(t) dt} \qquad (17)$$

Solving for mode 3, the closed form solution of $\bar{i}_{p(rms)}$ is seen in equation (21), below.

$$i_{p(rms)} = \frac{1}{4\sqrt{3}} \left[ \frac{V_p^2 k_{cfg}^2}{f_{sw}^2 L_k^2} \right. \qquad (21)$$
$$\{1 - 4D_2(4D_1^2 + D_1(3 + 6D_2 - 8\varphi) + 2(D_2 - 2\varphi)(D_2 - \varphi) - 3\varphi) +$$
$$2d(-1 + D_2^2(21 - 32D_2 - 6n) + 4D_1^2(6 - 15D_2 + 2D_2 n - 24\varphi) -$$
$$D_2(-21 + 52D_2 + 6n + 8D_2 n)\varphi + 4(6 - 9D_2 + 2D_2 n)\varphi^2 -$$
$$32\varphi^2 + D_1 D_2(27 - 68D_2 + 6n + 8D_2 n - 16(6 + n)\varphi)) +$$
$$d^2[(1 + 128D_1^3 + 8D_1^2(-6 + D_2(17 + 14n)) +$$
$$2D_1 D_2(-21 - 6n + D_2(41 + 4n(15 + n)) - 4\varphi + 8n\varphi) +$$
$$D_2(2D_2^2(9 + 4n(7 + n)) + 2(-1 + 2n)\varphi(-9 + 16\varphi) - D_2(-5 + 2n)(-3 -$$
$$\left. 6n - 2\varphi + 4n\varphi))\}\right]^{1/2}$$

One or more values of RMS current stress of various switches in the DAB converter 900 in can be calculated using the general form seen in equation (18), below. $t_{start}$ and $t_{stop}$ are the conduction intervals of the switch, dependent upon the mode of operation.

$$i_{S/M/D(rms)} = \sqrt{\frac{1}{T_s} \int_{t_{start}}^{t_{stop}} i_{S/M/D}^2(t) dt} \qquad (18)$$

Since the RNPC 910a is operating in the two-level modulation scheme 1200, and switches S1-S8 operate at a fixed duty-cycle of 50%, the RMS current for these switches in full-bridge mode is given by (18). In half-bridge mode, (19) is applicable for $S_1$-$S_4$, and $i_{S_7,S_9(rms)} = i_{p(rms)}$.

$$i_{S_1-S_8(rms)} = i_{p(rms)} \frac{1}{\sqrt{2}} \qquad (19)$$

Closed-form solutions of various RMS currents in a DAB converter 900 in accordance with an example embodiment are evaluated using the general form shown in equation (18), above, and the intervals shown in Table VI.

TABLE VI

COMPARISON OF THE ANALYTICALLY MODELED AND SIMULATED RMS CURRENTS OF THE R3L-DAB CONVERTER IN OPERATING MODE 3.

| Section | $t_{start}$ | $t_{stop}$ | Analytical $i_{rms}$ | Simulation $i_{rms}$ | Error ∈ (%) |
|---|---|---|---|---|---|
| $L_k$ | $t_0$ | $T_s$ | 55.41 | 55.24 | +0.31 |
| $S_1 \ldots _8$ | $t_0$ | $T_{hs}$ | 39.17 | 36.79 | +6.47 |
| $M_1, M_4$ | $t_5$ | $t_{10}$ | 12.60 | 13.14 | −4.07 |
| $M_2, M_3$ | $t_5$ | $t_{11}$ | 13.92 | 13.99 | −0.50 |
| $D_4, D_5$ | $t_{10}$ | $t_{11}$ | 4.63 | 4.82 | +0.22 |
| $M_5, M_8$ | $t_0$ & $t_8$ | $t_1$ & $t_{12}$ | 13.36 | 13.67 | −2.27 |
| $M_6, M_7$ | $t_0$ & $t_7$ | $t_2$ & $t_{12}$ | 13.96 | 13.99 | −0.21 |
| $D_6, D_7$ | $t_7$ | $t_8$ | 2.90 | 2.96 | −2.03 |

RMS current stress on M1 925a, M2 925b, D4 can be computed from equations (22), (23), and (26), below.

$$i_{M1(rms)} = \qquad (22)$$
$$\frac{1}{4\sqrt{6}} \left[ \frac{V_P^2 k_{cfg}^2}{n^2 f_{sw}^2 L_k^2} \{1 - 2D_2(3 + 64D_1^2 + 6D_2(-3 + 10D_2) - 36\varphi + \right.$$
$$72D_2\varphi + 64\varphi^2 + 4D_1(-3 + 30D_2 + 16\varphi)) + 2d[-1 +$$
$$6D_2(1 + 2D_2(-1 + D_2 - n + 4D_2 n)) + 8D_1^2(3 + D_2(3 + 2n) - 12\varphi) +$$
$$2D_2(-3 - 6n + 4D_2(-1 + 4n))\varphi + 8(3 + D_2(-3 + 2n))\varphi^2 -$$
$$32\varphi^2 + 2D_1 D_2(-9 + 6n + 4D_2(7 + 8n) - 16n\varphi)] +$$
$$d^2[1 + 128D_1^3 + 16D_1^2(-3 + D_2(2 + 8n)) + 4D_1 D_2(-1 + 2n)$$
$$(-3 + D_2(7 + 2n) + 4\varphi) + D_2(-6 - 2D_2^2(7 + 4(-2 + n)n) +$$
$$3D_2(5 + 4(-1 + n)n) - 4D_2(5 + 4(-3 + n)n)\varphi +$$
$$\left. 4(-1 + 2n)\varphi(-3 + 4\varphi))\} \right]^{1/2}$$

$$i_{M2(rms)} = \qquad (23)$$
$$\frac{1}{4\sqrt{6}} \left[ \frac{V_P^2 k_{cfg}^2}{n^2 f_{sw}^2 L_k^2} \{1 - 4D_2(3 + 4D_1 + 4D_2 - 4\varphi)(2D_1 + D_2 - 2\varphi) + \right.$$
$$2d[-1 - 40D_2^3 + 8D_1^2(3 + D_2(-9 + 2n) - 12\varphi) + 8(3 - 4\varphi)\varphi^2 +$$
$$2D_2(-3 + 2n)\varphi(-3 + 4\varphi) - 8D_2^2(-3 + 7\varphi + 2n\varphi) +$$
$$2D_1 D_2(15 + 6n + D_2(-44 + 8n) - 16(3 + n)\varphi)] + d^2[1 + 128D_1^3 + 16$$
$$D_1^2(-3 + 8D_2(1 + n)) + 4D_2^3(3 + 4n(4 + n)) + 4D_2(-1 + 2n)\varphi(-3 + 4\varphi) +$$
$$4D_1 D_2(-9 - 6n + D_2(1 + 2n)(17 + 2n) - 4\varphi + 8n\varphi) - D_2^2(9 + 20\varphi +$$
$$\left. 4(-3 + n)n(-3 + 4\varphi))\} \right]^{1/2}$$

$$i_{D4(rms)} = \frac{1}{4\sqrt{3}} \left[ \frac{D_1^2 V_P^2 k_{cfg}^2}{n^2 f_{sw}^2 L_k^2} \{16 D_1^2 + 3d^2(-1 + 4D_1 + D_1 + 2D_2 n)^2 + \right. \qquad (26)$$
$$12D_1(-1 + 2D_2 + 4\varphi) + 3(-1 + 2D_2 + 4\varphi)^2 - 6d(-1 + 4D_1 + D_2 +$$

-continued $$2D_2n)(-1+2D_1+2D_2+4\varphi)\}\right]^{1/2}$$

RMS current stress on M5 925e, M6 925f, D6 can be computed from equations (24), (25), and (27), below.

$$i_{M5(rms)} = \frac{1}{4\sqrt{6}} \left[ \frac{V_P^2 k_{cfg}^2}{n^2 f_{sw}^2 L_k^2} \{1 + 12D_2^2 - 8D_2^3 - 6D_2(1+4D_1-4\varphi)^2 - \right. \tag{24}$$

$$2d[1+28D_2^3 + 24D_1D_2(-1+2D_2(2+n)) + 8\varphi^2(-3+4\varphi) +$$

$$24D_1^2(-1+6D_2+4\varphi) - 6D_2^2(1-4n+8n\varphi) + 6D_2(-1+8\varphi^2)] +$$

$$d^2[1+128D_1^3 + 48D_1^2(-1+D_2+2D_2n) + 3(D_2+2D_2n)^2 -$$

$$\left. 2D_2^3(1+12n^2) + 6D_2(-1+4(-1+2n)\varphi(-1+2n)\varphi(-1+2\varphi))] \right\}^{1/2}$$

$$i_{M6(rms)} = \frac{1}{4\sqrt{6}} \left[ \frac{V_P^2 k_{cfg}^2}{n^2 f_{sw}^2 L_k^2} \{1 + 12D_2^2 - 2d[1+24D_2^3 + \right. \tag{25}$$

$$24D_2\varphi(-1+2\varphi) + 8\varphi^2(-3+4\varphi) + 24D_1^2(-1+2D_2+4\varphi) +$$

$$24D_1D_2(-1+2D_2+4\varphi) + 6D_2^2(-3+2n+8\varphi)] + d^2[1+$$

$$128D_1^3 + 48D_1D_2(-1+2D_2(1+n)) + 48D_1^2(-1+D_2(3+2n)) + 3D_2$$

$$\left. (8D_2^2(1+2n) + D_2(-7+4(-1+n)n) + 8(-1+2n)\varphi(-1+2\varphi))] \right\}^{1/2}$$

$$i_{D6(rms)} = \frac{1}{4\sqrt{3}} \left[ \frac{D_2^2 V_P^2 k_{cfg}^2}{n^2 f_{sw}^2 L_k^2} \{d^2(3+48D_1^2 - \right. \tag{27}$$

$$12D_2(1+n) + 24D_1(-1+2D_2(1+n)) + D_2^2(13+12n(2+n))) +$$

$$4(D_2^2 + 12(D_1-\varphi)^2) + 3(1+8D_1-8\varphi) + 2d[-3+48D_1^2+24D_1$$

$$\left. (D_2+D_2n-2\varphi) + 12\varphi + 2D_2(D_2+3(1+n-4(1+n)\varphi))] \right\}^{1/2}$$

Figure 17:
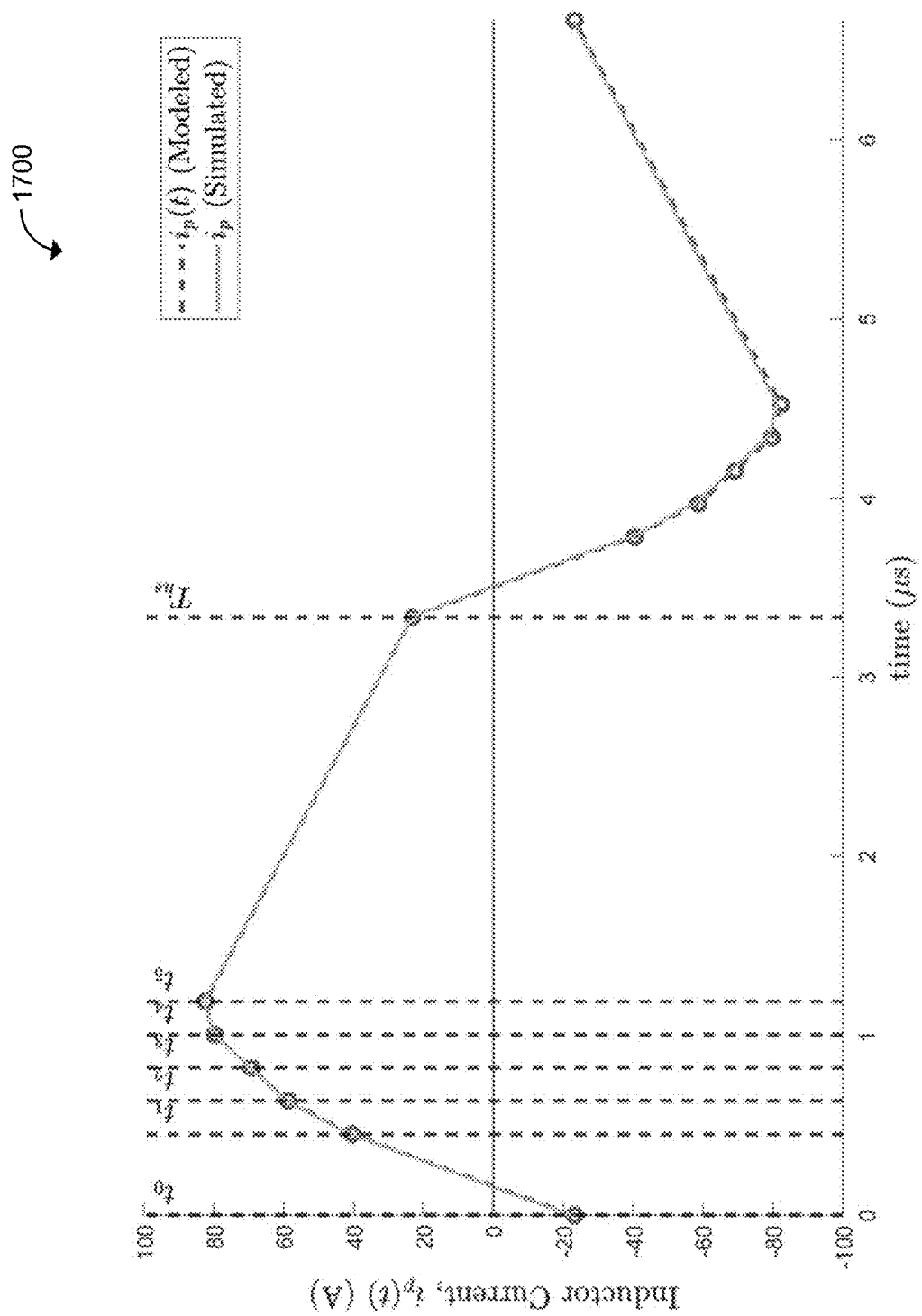
FIG. 17 is a graph showing a comparison of analytically modeled and simulated steady-state inductor currents in the DC-DC converter of FIG. 9 operating in accordance with an embodiment.

Reference is made to FIG. 17, which shows a graph 1700 of a comparison between analytically modeled and simulated values for steady-state current across inductor 955 for conditions where D1=0.028, D2=0.028, φ=0.12, Pout=15KW, V_pfc=300V, V_batt (905)=1.25 kV. The mean value of the modeling error $\bar{\epsilon}$=−0.26%. The standard deviation of the modeling error $\sigma_\epsilon$=2.9%.

Soft-Switching

In various embodiments, DAB converter 900 may not contain a resonant tank, and hence may not have the ability to perform zero current switching (ZCS) without using advanced modulation techniques.

In some embodiments, DAB converter 900 may contain a resonant tank (not shown) placed between the primary circuit 910a and the transformer 942. The resonant tank may comprise one or more inductors and one or more capacitors. In some embodiments, the resonant tank may be one of the embodiments shown in FIG. 29c.

In some embodiments, zero-voltage switching (ZVS) may be achieved by having a lagging current prior to the turn-on instant of the switch under consideration. In some embodiments, the action of forward-biasing the body-diode of a MOSFET prior to turn-on enables a zero-voltage turn-on. The ZVS criterion of all the switches in the DAB converter 900 is shown in Table VI, which shows specified inequalities that are required to be satisfied, based on the mode of operation used, for achieving ZVS. The criterion applies for full-bridge operation in all three modes of operation 1110c, 1110d, 1110e. In some embodiments, DAB converter 900 may be reconfigured as a half-bridge, and the soft-switching criterion of $S_{3,4,5,6}$ may not be applicable due to the permanent connection of leg b to neutral and the inactivity of these switches in the switching operation.

TABLE VI

ZERO VOLTAGE SWITCHING (ZVS) CRITERION OF
THE R3L-DAB IN ALL MODES OF OPERATION.

| Switch | Mode 1 | Mode 2 | Mode 3 |
|---|---|---|---|
| | | Soft-Switching Criterion | |
| $S_{1, 2, 7, 8}$ | | $i_p(t_0) < 0$ | |
| $S_{3, 4, 5, 6}$ | | $i_p(T_{hs}) > 0$ | |
| $M_{1, 4}$ | $i_p(t_3) > 0$ | $i_p(t_4) > 0$ | $i_p(t_5) > 0$ |
| $M_2$ | $i_p(t_2) > 0$ | $i_p(t_3) > 0$ | $i_p(t_4) > 0$ |
| $M_3$ | $i_p(t_8) < 0$ | $i_p(t_9) < 0$ | $i_p(t_{10}) < 0$ |
| $M_{5, 8}$ | $i_p(t_5) < 0$ | $i_p(t_7) < 0$ | $i_p(t_8) < 0$ |
| $M_6$ | $i_p(t_4) < 0$ | $i_p(t_5) < 0$ | $i_p(t_7) < 0$ |
| $M_7$ | $i_p(t_{10}) > 0$ | $i_p(t_{11}) < 0$ | $i_p(t_1) < 0$ |

In some embodiments, ZVS may be caused by a forward-biased body diode of a switch, which may be a MOSFET switch, and may arise due to a resonance between the leakage inductance and a switch's output capacitance (Coss). Depending on the state of the bridge, and whether various inner-phase shifts are present based on the modulation scheme, equivalent capacitance $C_{eq}$ may change in accordance with inequality (28).

$$0.5 L_k I_{on}^2 > 0.5 C_{eq} V_{eq}^2 \tag{28}$$

Design of the R3L-DAB Converter

Figure 27:
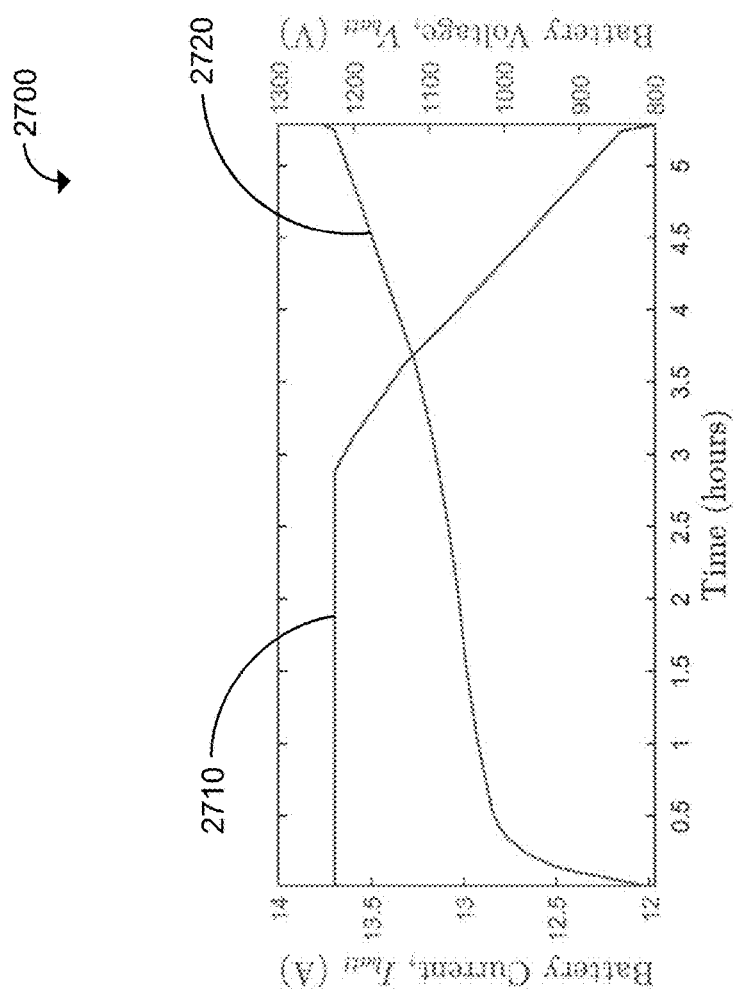
FIG. 27 is a graph showing a charging profile of a 1.25 kV, 500 Ah Li-ion battery.

Priority operating regions of a DAB converter 900 operating in Grid to Vehicle (G2V) operating modes can be determined based on battery charging profiles. FIG. 27 shows an example assumed charging profile 2700 for a 1.25 kV/500Ah battery pack. Charging profile 2700 shows a trend of battery current 2710 and battery voltage 2720 over time.

An operating point vector is $\vec{OP}$ is set equal to f ($V_{PFC}$, $V_{batt}$, $P_{batt}$) and is discretized based on finite time intervals in the charging profile.

Selection of the turns ratio n, switching frequency $f_{sw}$, and leakage inductance $L_k$ may affect the average efficiency of the DAB converter 900. The normalized high-frequency link impedance $Z_{norm}$ is calculated using equation (16), where the equation is evaluated at phi=0.5, D1=0, D2=0. The value of the leakage inductance RMS current shall thus remain consistent while scaling the switching frequency.

$$Z_{norm}\bigg|_{\varphi=0.25}^{D_1, D_2=0} = nf_{sw}L_k = \frac{V_{P(min)}V_{B(min)}}{8P_{out(max)}} \tag{29}$$

Mean RMS current through the leakage inductance $\bar{i}_{p(rms)}$ is evaluated at $Z_{norm}$ for every $\vec{OP}$ using equation (21). Since $D_1=D_2=0$, the modulation scheme is limited to two-level modulation on the secondary bridge. Lower RMS current is an indicator of the highest utilization of the high-frequency link and minimum deviation in the conversion ratio of the converter away from its nominal value.

Figure 18:
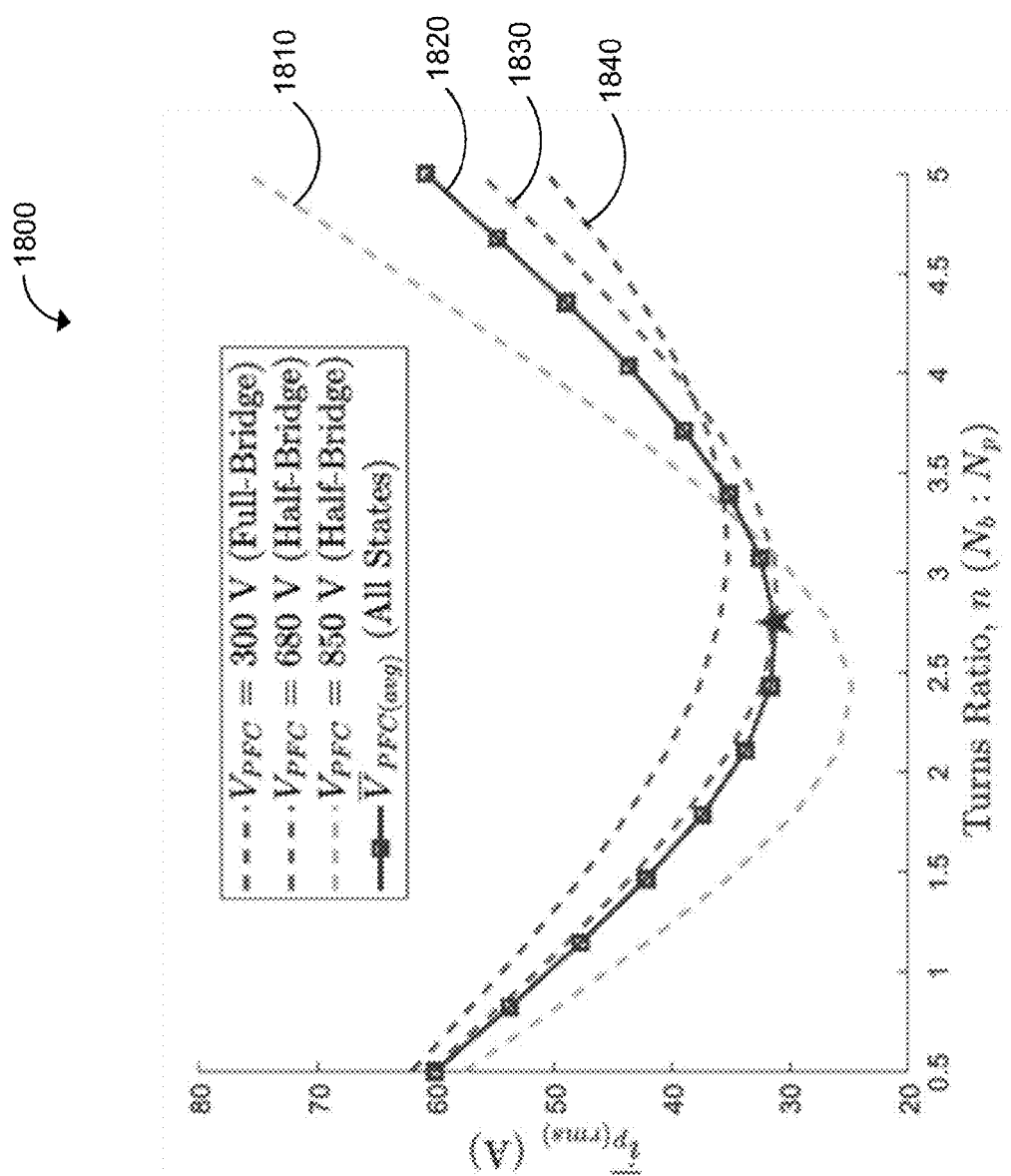
FIG. 18 is a graph showing mean leakage inductance RMS currents as a function of turns ratio and variation in DC-link voltage for the DC-DC converter of FIG. 9 operating in accordance with an embodiment.

Reference is made to FIG. 18, which shows mean values of RMS current $\vec{i}_{p(rms)}$ as a function of turns ratio n for: $\vec{V}_{PFC}$=300V, $k_{config}$=1 (1840); $\vec{V}_{PFC}$=680V, $k_{config}$=.5 (1830); $\vec{V}_{PFC}$=850V, $k_{config}$=.5 (1810). The average RMS current across all states is also shown. A minima for $\vec{i}_{p(rms)}$ is observed at n=2.8, which is the selected turns ratio of the converter.

Figure 20:
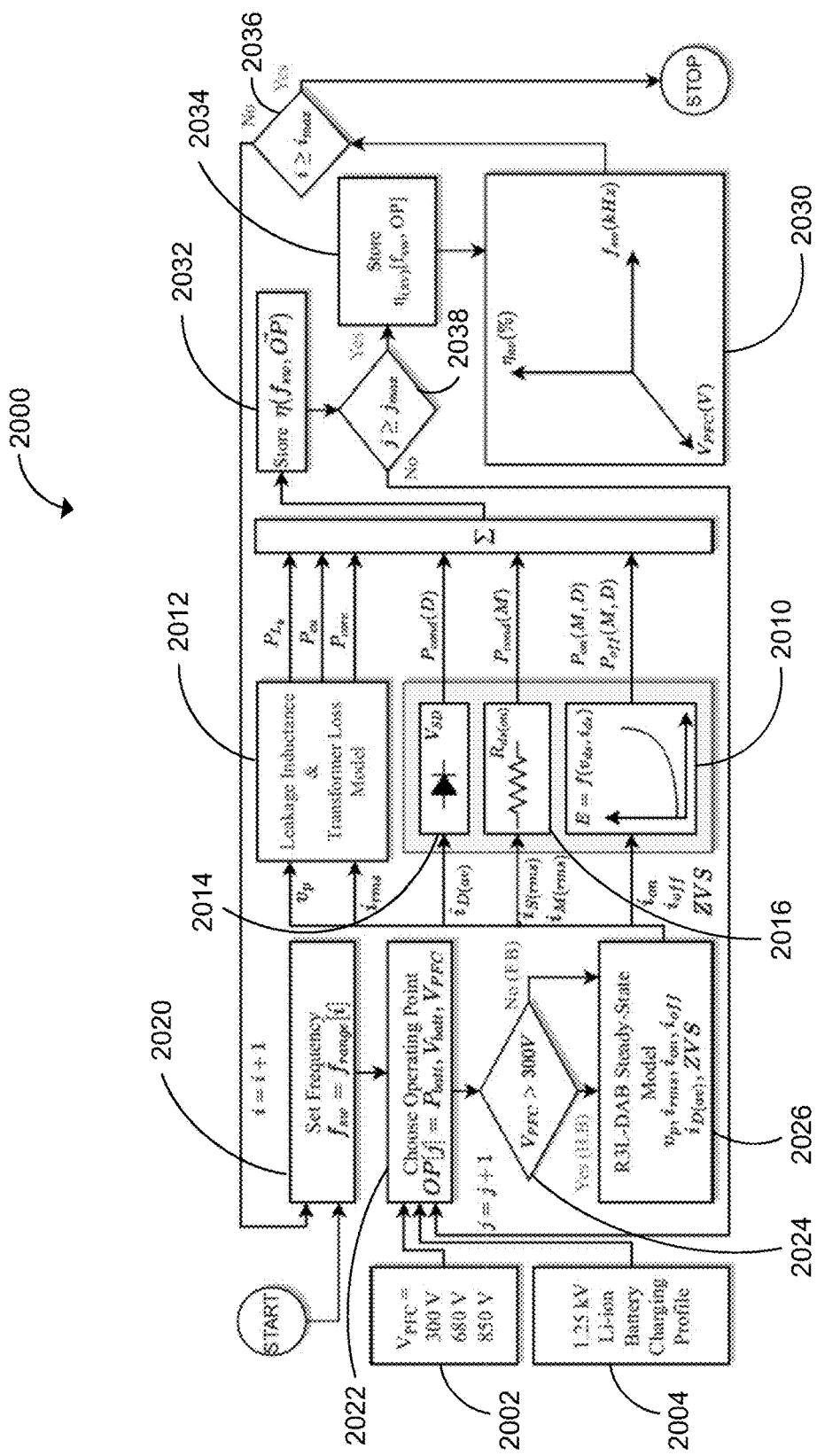
FIG. 20 is a block diagram showing a process for selecting design parameters of a DC-DC converter.

Reference is next made to FIG. 20, which shows a process 2000 for selecting design parameters for a DAB converter 900, such as switching frequency and leakage inductance.

In some embodiments, in order to maintain the same $\vec{i}_{p(rms)}$ while scaling the switching frequency, the maximum leakage inductance $L_K$ (max) may be given by equation (30), below:

$$L_{k(max)}|_{f_{SW}} = \frac{V_{P(min)} V_{B(min)}}{8 n f_w P_{out(max)}} \quad (30)$$

After the turns ratio n is selected and the high-frequency link impedance is normalized, RMS current $i_{p(rms)}$ and peak current stress of DAB converter 900 will not change with variation in $f_{SW}$.

Figure 19B:
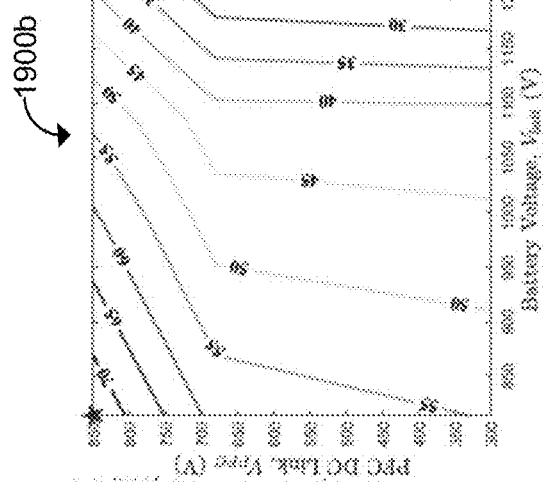
FIG. 19b is a contour map showing input current stress contours for variations in DC-link voltage and output voltage evaluated at an output power of 15 kW for the DC-DC converter of FIG. 9 operating in accordance with an example embodiment.
Figure 19C:
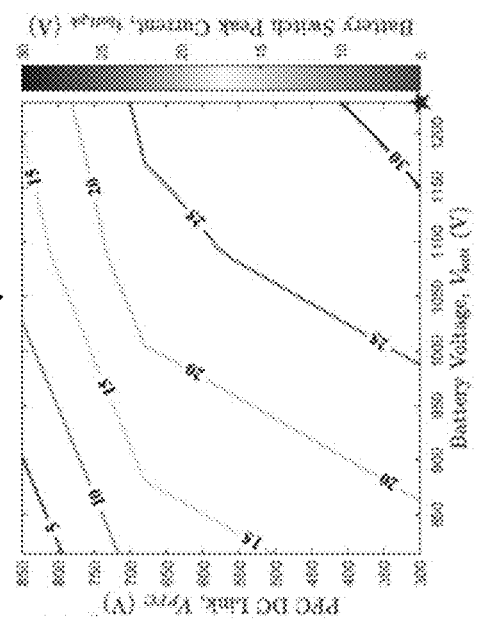
FIG. 19c is a contour map showing output current stress contours for variations in DC-link voltage and output voltage evaluated at an output power of 15 kW for the DC-DC converter of FIG. 9 operating in accordance with an example embodiment.
Figure 19A:
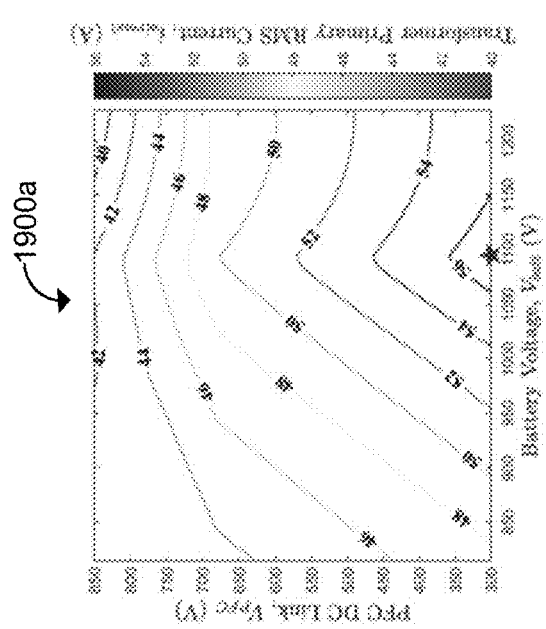
FIG. 19a is a contour map showing leakage inductance RMS current stress contours for variations in DC-link voltage and output voltage evaluated at an output power of 15 kW for the DC-DC converter of FIG. 9 operating in accordance with an example embodiment.

Reference is next made to FIGS. 19a-19c, which show graphs 1900a, 1900b, 1900c of worst-case analysis (WCA) results of transformer primary RMS current $i_{p(rms)}$, PFC switch peak current $i_{PFC,pk}$, and battery switch peak current $i_{batt,pk}$ in one embodiment of the DAB converter 900. In said embodiment, the switching devices selected were UJ4SC075009K4S for switches S1-S9 in the primary bridge 910a and G3R20MT12K for switches M1-M8 in the secondary bridge 910b. Switching energy tables, $E_{on/off}$=f ($V_{ds}$, $I_{ds}$) are used in the design framework 2000 of the DAB converter 900 at block 2010.

Planar Transformer

In some embodiments, the transformer core size and material may be selected to be ELP 1Feb. 20, 1938 and N97 (TDK) based on the required power handling requirement of the DAB converter 900. The high frequency link between the primary and secondary bridges is isolated using transformer 942. with a secondary to primary turns ratio n. In some embodiments, the turns ratio may be selected as n=2.8.

The number of primary winding turns $N_P$ and its optimal value $N_{P,opt}$ can be evaluated at every frequency using equation (31), below, for which the symbol definitions are as follows: copper resistivity p, mean length per turn (MLT), number of layers per winding $\eta_l$, copper thickness $t_{cu}$, primary winding PCB trace width $W_{pri}$, secondary winding PCB trace width $w_{sec}$, core cross section area $A_c$, core effective volume $V_e$, number of secondary winding turns $N_s$, and the Steinmetz coefficients of the core $k_{fe}$, $\alpha$, and $\beta$.

$$N_{p,opt}(f_{sw}) = \min\left( \underbrace{\operatorname{ceil}\left(\frac{N_p}{n}\right)^3 \frac{i_{p(rms)}^2}{n_l} \left(\frac{\rho MLT}{t_{cu} w_{sec}}\right)}_{\text{Secondary Copper Loss}} \underbrace{N_p \frac{i_{p(rms)}^2}{n_l} \left(\frac{\rho MLT}{t_{cu} w_{pri}}\right)}_{\text{Primary Copper Loss}} + \underbrace{k_{fe} f_{sw}^\alpha \left(\frac{V_{batt(max)}}{\operatorname{ceil}(nN_p) f_{sw} A_c}\right)^\beta V_e}_{\text{Core Loss}} \right) \quad (31)$$

Figure 21:
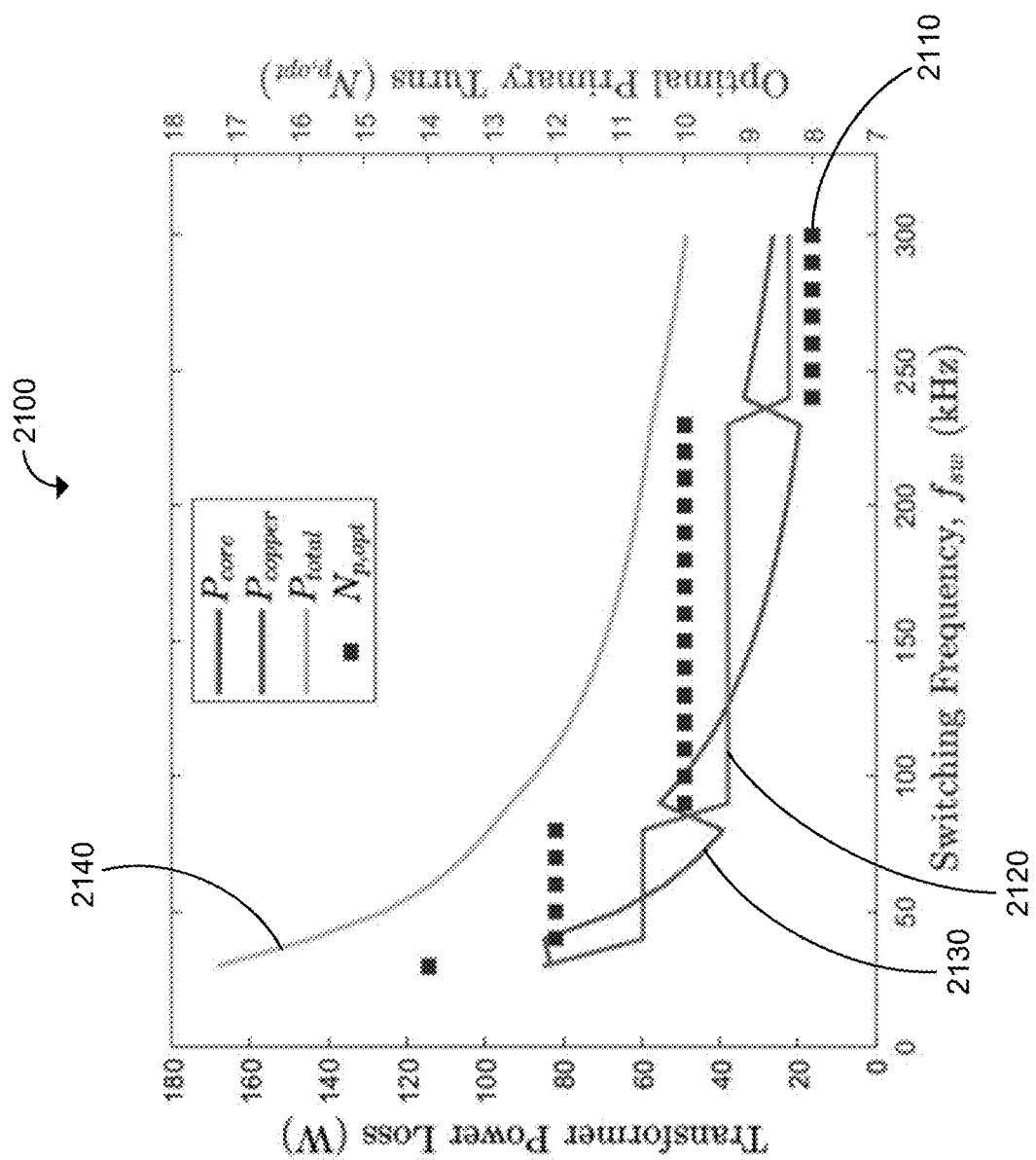
FIG. 21 is a graph showing optimal numbers of primary turns for a transformer in a DC-DC converter over variation in switching frequency.

$f_{sw} \in \{f_{sw(min)} \ldots f_{sw(max)}\}$ $N_p \in \{N_{p(min)} \ldots N_{p(max)}\}$ Reference is next made to FIG. 21, which shows a graph 2100 of the variation of the optimal primary turns $N_{opt}$ 2110 as a function of $f_{SW}$ for an experimental embodiment of transformer 942. In said embodiment, transformer 942 is constructed using a set of two EE cores; B66297G0000X197 by TDK. The number of layers n=10. The primary and secondary windings are separated by an FR-4 insulator. Graph 2100 also shows power loss 2120 representing losses through copper $P_{copper}$, power loss 2030 representing losses through core $P_{core}$, and power loss 2140 representing total loss $P_{total}$. Magnetostatic simulations to evaluate the parasitic capacitance of the transformer have been done using Ansys Maxwell. Detailed specifications of transformer 942 in accordance with said embodiment is shown in Table IV.

Power Loss Model

A set of equations that may be used to estimate the losses within various components of the DAB converter 900 will be described herein. A chosen operating point may be evaluated using the steady-state analytical model to evaluate the instantaneous and RMS current values. The power loss equations of various components in various embodiments of the DAB converter 900 are defined in Table VIII. $E_{on}$ and $E_{off}$ are switching energy look up tables and are defined as a function of switched voltage and current. $t_{dead}$ is the dead time between the transition of the complementary switches. $V_{SD}$ is the forward voltage of the MOSFET's body-diode. $V_F$ is the forward voltage of the clamp diodes, $I_{D(av)}$ is the average forward current through the clamp diode. $R_p$ and $R_s$ are the AC resistances of the transformer winding. $V_e$ is the total core volume. $l_{c(rms)}$ is the capacitor RMS current. $ESR_C$ and $ESR_L$ are the equivalent series resistances of the capacitor and inductor, respectively. ZVS is a boolean and is 0 when the above mentioned ZVS conditions for the operating point are true, and is 1 when ZVS condition is false.

TABLE VIII

POWER LOSS EQUATIONS OF THE R3L-DAB CONVERTER.

| Component | Loss Symbol | Equation (W) |
|---|---|---|
| $S_x/M_y$ | $P_{cond(M)}$ | $i_{rms}^2 R_{ds(on)}$ |
|  | $P_{on}$ | ZVS, $f_{sw} E_{on}(V_{ds}, I_{on})$ |
| $x \in 1 \ldots 9$ | $P_{off}$ | $f_{sw} E_{off}(V_{ds}, I_{off})$ |
| $y \in 1 \ldots 8$ | $P_{cond(D)}$ | $f_{sw} t_{dead} V_{SD} I_{on}$ |
| $D_x$ | $P_d$ | $V_F I_{D(av)}$ |
| $x \in 1 \ldots 7$ | $P_{rr}$ | Neglected |
| Transformer | $P_{cu}$ | $i_{p(rms)}^2 R_p + (i_{p(rms)}/n)^2 R_s$ |
|  | $P_{core}$ | $k_{fe} f_{sw}^\alpha \Delta B^\beta V_e$ |
| Passives | $P_L$ | $i_{p(rms)}^2 ESR_L$ |
|  | $P_C$ | $i_{c(rms)}^2 ESR_C$ |

Optimization Results

Referring back to FIG. 20, the optimization process 2000 as shown involves, at block 2030, generating a three-dimensional space of the average efficiency nav as a function of the input voltage $V_{PFC}$ 2002 and the switching frequency $f_{SW}$. The process 2000 proceeds as follows:

At block 2020, a switching frequency sweep is defined between $f_{SW(min)}$=25 kHz to $f_{SW}$ (max)=300 kHz. Specifically, a switching frequency $f_{SW}$ is set at a value between the range corresponding to an index $i(f_{range}[i])$, where i is an integer.

At block 2022, an operating point based on an index j(OP [j]) is selected. The operating point OP [j] may be selected based on an input $V_{PFC}$ 2002 and the charging profile 2004 of the battery. The charging profile may be, for example, the profile shown in FIG. 27. In some embodiments, the input $V_{PFC}$ 2002 may be one of 300V, 680V, 850V.

At block 2024, operation in full-bridge mode or half-bridge mode is selected based on the selected $V_{PFC}$ 2010. Specifically, the decision may be based on the $V_{PFC}$ 2002. For example, if $V_{PFC}$ 2002 is greater than 300V, full-bridge operation may be selected. Otherwise, half-bridge operation may be selected instead.

At block 2026, the operating point OP [j], where j is an integer, is passed through the steady state model of the DAB converter 900 to obtain the steady state instantaneous and RMS currents in the power converter.

At blocks 2012, 2014, 2016 and 2010, the steady state current equations shown in equations (22)-(27) and the power loss equations shown in Table VIII are used to evaluate various losses as shown. The values obtained in block 2026 may be used to calculate the losses.

At block 2032, an efficiency of the DAB converter 900 at the operating point OP [j] is computed using the sum of the losses calculated at blocks 2010, 2012, 2014, and 2016.

At block 2038, if j is greater or equal to j max, move to block 2034. Otherwise, increment j and return to block 2022.

At block 2034, the average efficiency of the DAB converter 900 at a single input voltage $V_{PFC}$, across all operating points of $V_{batt}$ and $P_{out}$, is computed.

At block 2036, the average efficiency computed in block 2034 is plotted on the trajectory map of efficiency as a function of $V_{PFC}$ and $f_{SW}$.

At block 2036, if i is greater or equal to $i_{max}$, the process ends. Otherwise, increment i and return to block 2020.

Figure 22A:
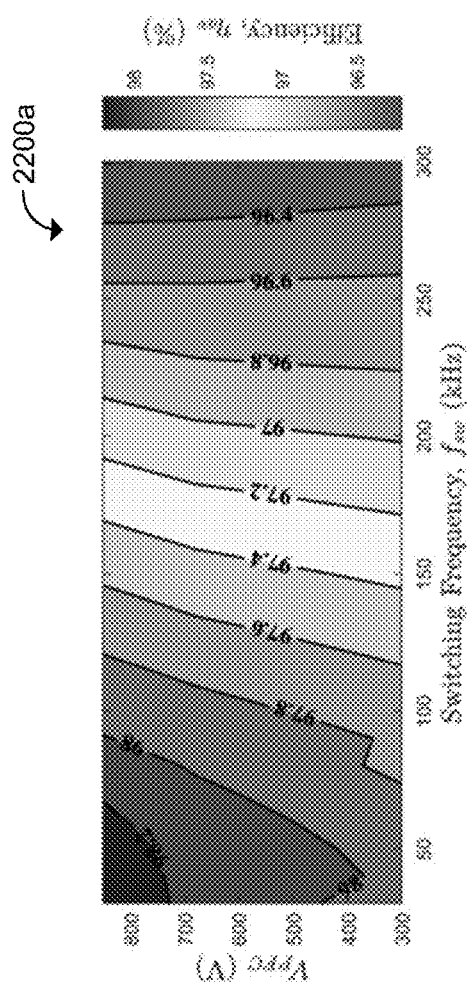
FIG. 22a is an estimated efficiency map of a DC-DC converter in accordance with disclosed embodiments as a function of variation in switching frequency and DC-link voltage.
Figure 22B:
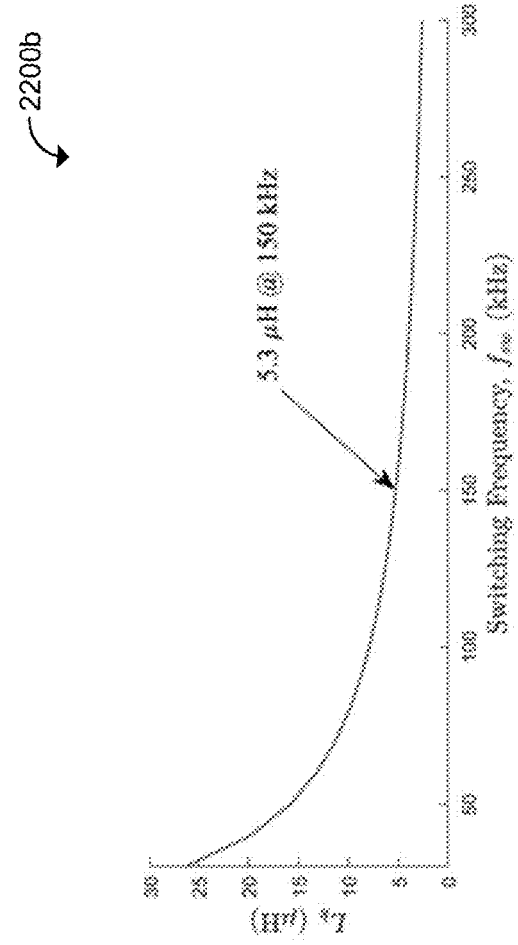
FIG. 22b is a graph showing leakage inductance as a function of switching frequency in a DC-DC converter in accordance with disclosed embodiments.

Reference is next made to FIG. 22a, which shows an efficiency map 2200a of the DAB converter 900 in disclosed embodiments as a function of the variation in switching frequency $f_{SW}$ and PFC DC link voltage $V_{PFC}$. The mean efficiency observed is approximately 97% and the increase in switching frequency $f_{SW}$ of the DAB converter 900 is not very detrimental to the average efficiency. However, the variation in required leakage inductance is minimal beyond an inflection point. In some embodiments, in order to reduce the challenges in management of the system's leakage inductance and not affect the power converter's control sensitivity, the leakage inductance may be chosen at the inflection point of $dL_k/df_{SW}$ <0.5uH/10 kHz, while also ensuring that the external leakage inductance can fit into the power electronics package.

Experimental verification

Figure 23:
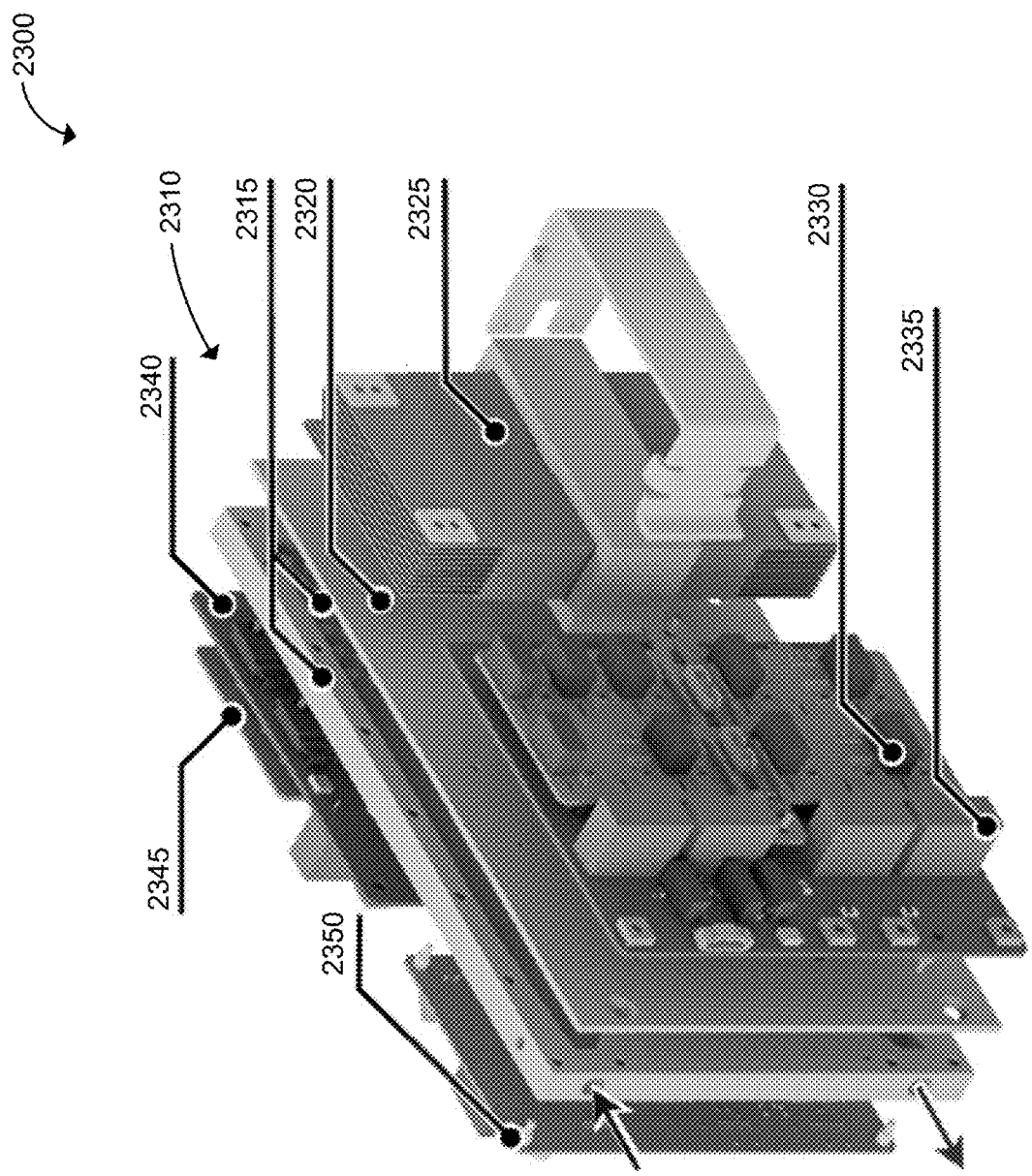
FIG. 23 is a 3-dimensional (3D) schematic view of an experimental setup of a DC-DC converter according to an embodiment.

Reference is next made to FIG. 23, which shows a 3D exploded view 2300 of a 15 KW hardware demonstrator 2310 of an embodiment of DAB converter 900 in accordance with disclosed embodiments. For the exemplary embodiment of the hardware demonstrator 2310, the power and gate driver PCBs were developed using Altium Designer. The layout of the power board was optimized for minimum commutation loop inductance based on the study in [34]. Autodesk Inventor was used for CAD modelling of the cold plate. In the embodiment shown, the hardware demonstrator 2310 converter measures 176×274×96 mm and achieves a volumetric power density ($P_v$) of 3.25 KW/L, or 53.25 W/in³.

As shown, hardware demonstrator 2310 contains a cold plate 2315. One side of the cold plate 2315 contains a space for the leakage inductance 2320, a planar transformer 2325, a gate driver PCB 2330, a power PCB 2335 containing an RNPC 700. Another side of the cold plate 2315 contains a power PCB 2340 containing an NPC 500, a gate driver PCB 2345, and a control PCB 2350.

Figure 24:
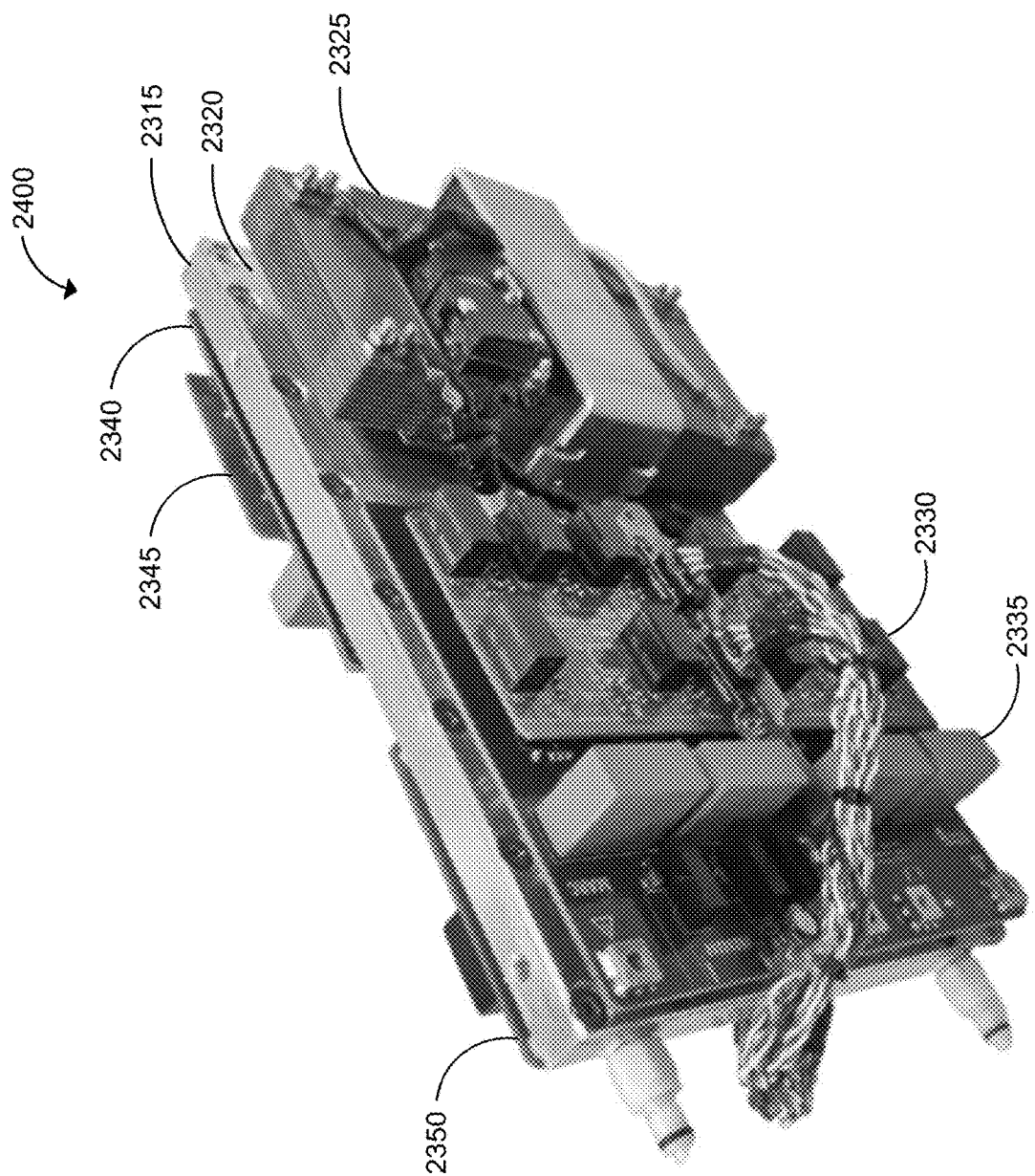
FIG. 24 is an example physically realized DC-DC converter in accordance with the converter of FIG. 23.

Reference is next made to FIG. 24, which shows a physical prototype 2400 of the hardware demonstrator 2300 shown in FIG. 23. The physical prototype 2400 measures 176 ×274×96 mm, and achieves a power density of 3.25 KW/L, or 53.25 W/in^3. The physical prototype 2400 is liquid-cooled and is designed at a flow-rate of 8 L/minute (LPM). The modulation scheme used is implemented on a Texas Instruments' TMS320F28379D digital signal processor (DSP) platform. Table IX consolidates information regarding the physical prototype 2400 of DAB converter 900 as depicted in FIG. 24.

TABLE IX

REALIZATION DETAILS OF THE R3L-DAB CONVERTER

| | Parameter | Specification |
| --- | --- | --- |
| Key Specifications | $V_{PFC}$ | 300-850 V |
| | $V_{batt}$ | 890-1250 V |
| | $P_{out(max)}$ | 15 kW |
| | $f_{sw}$ | 150 kHz |
| | $L_k$ | 5.3 µH |
| | $\eta_{peak}$ | 97.32% |
| Primary (RNPC) | SiC MOSET | UJ4SC075009K4S (Qorvo) |
| | $R_{ds(on)}/V_{ds(max)}$ | 9 mΩ/750 V |
| | $V_{gs(on)}/V_{gs(off)}$ | +15 V/-5 V |
| | $R_{g(on)}/R_{g(off)}$ | 3.3 Ω/5.6 Ω |
| | $R_s/C_s$ | 5 Ω/560 pF |
| | SiC Diode | MSC030SDA070K (Microchip) |
| | SiC Diode's $V_F/I_D$ | 700 V/30 A |
| Secondary (NPC) | SiC MOSET | G3R20MT12K (GeneSiC) |
| | $R_{ds(on)}/V_{ds(max)}$ | 20 mΩ/1200 V |
| | $V_{gs(on)}/V_{gs(off)}$ | +15 V/-5 V |
| | $R_{g(on)}/R_{g(off)}$ | 12 Ω/2 Ω |
| | SiC Diod | GD20MPS12A (GeneSiC) |
| | SiC Diode's $V_F/I_D$ | 1200 V/20 A |
| Power Board Components | DC link capacitor | 5 µF/800 V B32774D8505K000 (EPCOS) |
| | Bypass capacitor | 0.1 µF/1500 V C222SC104KFRAC (KEMET) |
| | Gate driver | IED3322MC12N (Infincon) |
| | Iso. power supply | MGJ2D1515055C (muRata) |
| Transformer | Turns ratio (n) | 28:10 (2.8) |
| | Core & material | ELP 102/20/38 & N97 B6629700000X197 (TDK) |
| | $L_{mag}$ | 768.08 µH at 1 kHz |
| | $L_{k,xfmr}$ | 1.17 µH at 1 kHz |
| | Copper thickness | 6 oz/ft² (210 µm) |
| | PCB prepreg | FR-4 (0.35 mm) |
| | $n_l$ per winding | 10 |
| | Insulator thickness | 0.35 mm |
| | Insulator breakdown | 4130 $V_{peak}$ |
| Cold Plate | Dimensions | 176 × 274 × 14 mm |
| | Flow rate | 8 LPM |
| | Coolant | 50% DI water/ethylene glycol |
| Mech. Dimensions | Dimensions | 176 × 274 × 96 mm |
| | Power density | 3.25 kW/L or 53.25 W/in³ |

Figure 25A:
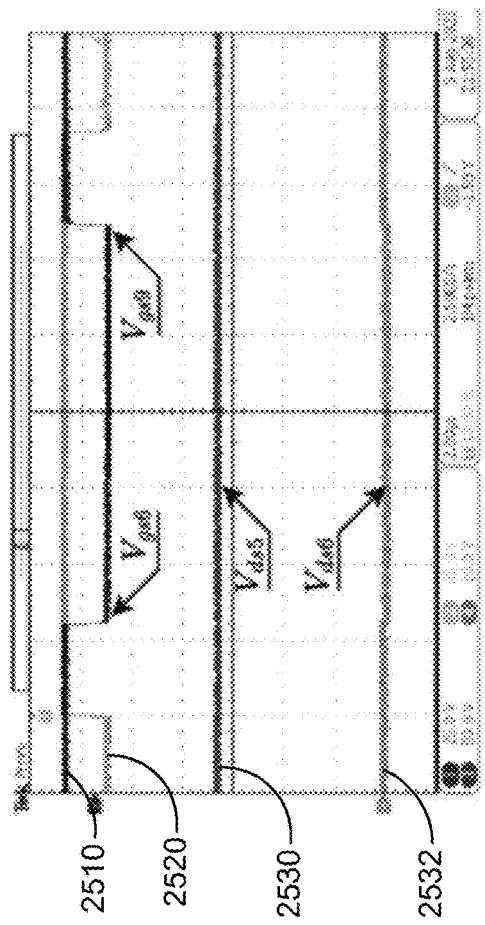
FIG. 25a is a graph showing experimentally measured voltages across various switches in a DC-DC converter in accordance with an example embodiment.
Figure 25B:
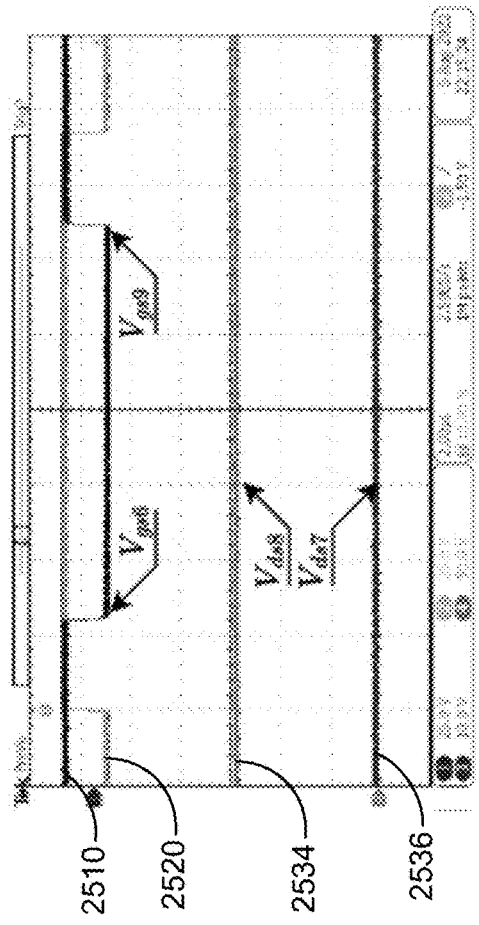
FIG. 25b is a graph showing experimentally measured voltages across various switches in a DC-DC converter in accordance with another example embodiment.

Reference is next made to FIGS. 25a-25b, which show an experimental verification, on the physical prototype 2400 of FIG. 24, of reconfiguration pulse sequence 800, as shown in FIG. 8, for reconfiguring DAB converter 900 from full-bridge mode to half-bridge mode. Gating signals $V_{gs6}$ 2510 and $V_{gs9}$ 2520 are shown in accordance with reconfiguration pulse sequence 800. FIG. 25a shows observed voltages $V_{ds5}$ 2530, $V_{ds6}$ 2532 when $V_p$=300V. FIG. 25b shows observed voltages of $V_{ds7}$ 2536, $V_{ds8}$ 2534 when $V_p$=300V. In both instances, there is no unnatural transient voltage stress observed across any of the switches during both the transitions.

In some embodiments, the Zimmer LMG671 Power Analyzer may be used to measure the electrical efficiency of the DAB converter 900. DC currents of the PFC and battery side may be measured using the LEM IT 700-S and LEM IT 60-S ULTRASTAB current sensors, respectively.

In some embodiments, efficiency measurements may be performed for the following variation of the PFC voltage: $\vec{V}_{PFC}$= [300,400,680,850] V. Battery side voltage variations may be done based on the minimum, nominal and maximum voltages of the battery pack: $\vec{V}_{batt}$=[890, 1095, 1250]. Efficiency may be evaluated by connecting a resistive load across the $V_B$ potential. Power variations may be performed by paralleling resistors. In an exemplary embodiment, load resistance ranges varied from 1.2 kΩ to 120Ω. As the minimum achievable load resistance was 120Ω, efficiency maps were capped to 6.6 KW when $V_{batt}$=890V, 9.9 kW when $V_{batt}$=1095V, and 13 KW when $V_{batt}$=1250V.

Reference is next made to FIGS. 25c-25i, which show an experimental measurement, on the physical prototype 2400 of FIG. 24, of certain current and voltage waveforms in DAB converter 900 in operation. Specifically, experimentally measured waveforms for primary bridge voltage $V_p$ (t) 2550 (corresponding to voltage 940 in FIG. 9), secondary bridge voltage $V_b$(t) 2560 (corresponding to voltage 945 in FIG. 9), and transformer primary current $i_p$ (t) 2570 (corresponding to current 950 in FIG. 9) are shown.

FIG. 25c shows waveforms for primary bridge voltage $V_p$ (t) 2550, secondary bridge voltage $V_b$(t) 2560, and transformer primary current $i_p$ (t) 2570 at a peak efficiency point of $V_{PFC}$ =850V, $V_{batt}$=1.25 KV, $P_{out}$=10.38 KW, according to some embodiments, in the full-bridge mode, with an efficiency of 97.32%.

FIGS. 25d-25f shows waveforms for primary bridge voltage $v_p$ (t) 2550, secondary bridge voltage $V_p$(t) 2560, and transformer primary current $v_p$ (t) 2570 when $V_{batt}$=1.25 kV while $V_{PFC}$=400V (full-bridge), 680V (half-bridge), and 850V (half-bridge), respectively.

FIGS. 25g and 25h show a comparative difference of waveforms for primary bridge voltage $V_p$ (t) 2550, secondary bridge voltage $V_b$(t) 2560, and transformer primary current $i_p$ (t) 2570 in operation when $V_{batt}$=1.25 KV, $P_{out}$=7.72 KW. According to waveform 2570 under such conditions, it can be seen that primary circuit 910a loses ZVS when $V_{PFC}$=300V, while it is in full ZVS when $V_{PFC}$=400V.

FIG. 25i shows waveforms for primary bridge voltage $v_p$ (t) 2550, secondary bridge voltage $V_b$(t) 2560, and transformer primary current $i_p$ (t) 2570 when DAB converter 900 is operating in five-level, mode 3, full-bridge operation. For the purposes of clearly identifying the distinction in voltage levels, the control point is $D_1$=0.05, $D_2$=0.06, φ=0.14. $V_{PFC}$=150V, $V_{batt}$=690V, $P_{out}$=4 KW. At this operating point, the conversion ratio d=1.64, yet the DAB converter 900 exhibits an efficiency of 93%. The control variables may be further optimized for minimized conduction and switching losses using numerical optimization methods.

Reference is next made to FIGS. 26a-26c, which show efficiency plots of the DAB converter 900 in accordance with disclosed embodiments at $V_{PFC}$=300V (2610), $V_{PFC}$=680V (2620), $V_{PFC}$=850V (2610), $V_{PFC}$=400V (2640), output voltages, and output powers. It can be noted that the average efficiency of the DAB converter 900 is approximately 95% with varying input and output voltage.

Due to the reconfiguration between half-bridge and full-bridge modes, the wide voltage variation of 300-850V at the input does not cause detrimental impact on the converter's efficiency. The peak efficiency $\eta_{peak}$=97.32% is measured when $V_{batt}$=1.25 kV, $P_{out}$=10.38 KW. The efficiency of the DAB converter 900 when $P_{out}$=12.98 kW is 96.91%.

FIG. 26c shows an efficiency plot 2600c as a function of output power $P_{out}$ when $V_{batt}$=1250V. It can be observed, in said plot, that raising $V_{PFC}$ by 100V results in an efficiency improvement of +5.56%. In some embodiments, the information from function 2600c may be used to perform system-level coordination between a PFC stage and a DC-DC converter stage in order to maximize total efficiency. Based on the efficiency simulations shown in FIG. 3c and experimental results at 300V and 400V as shown in FIG. 26c, the projected efficiency at 300V is 87.37% and at 400V is 91.78%, leading to an efficiency improvement of 4.4%.

Figure 28:
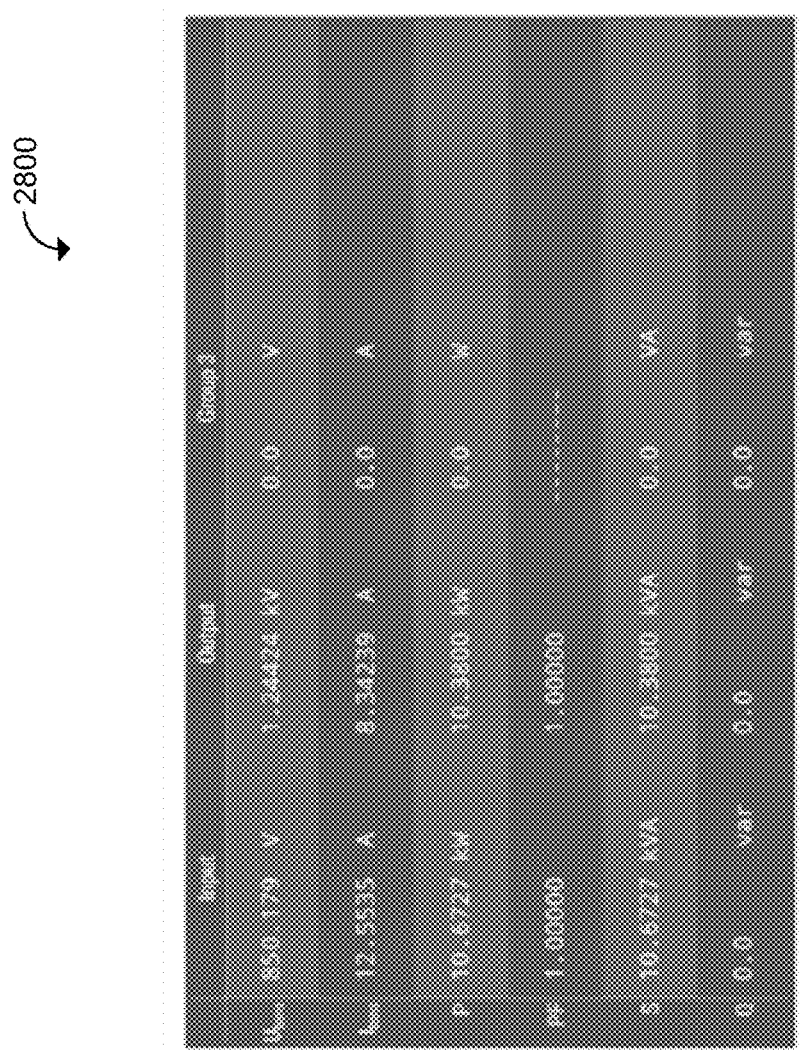
FIG. 28 is a table showing power analyzer measurements for a DC-DC converter in accordance with an example embodiment at the peak efficiency point of efficiency=97.32%.

Reference is next made to FIG. 28, which shows power analyzer measurements of physical prototype 2400 operating at peak efficiency point of $\eta_{peak}$=97.32%, as measured from a Zimmer LMG671 power analyzer.

Reference is next made to FIG. 29a which shows block schematic diagram 2900 of the DAB converter 900 showing the DAB converter 900 represented by an RNPC block 2902, an energy transfer element block 2904, a bridge variation block 2906, and a transformer 2908. Transformer 2908 is analogous to transformer 942 as shown in FIG. 9 and the two reference numerals may be used interchangeably herein.

Referring next to FIG. 29b, there is shown a circuit for RNPC block 2902 of FIG. 29a, which is analogous to primary circuit 910a, as shown in FIG. 9. As with FIG. 9, primary circuit 910a is the circuit interfacing with the DC-link voltage on the primary side of the DAB circuit 900 and may comprise an RNPC converter 700.

Referring next to FIG. 29c, energy transfer element block 2904 represents the circuit interfacing with the output voltage, $v_p$ (940), of primary circuit 910a with the primary side of transformer 942. In some embodiments, the energy transfer element block 2904 may be a resonance network.

In various embodiments, the energy transfer element block 2904 may comprise an inductor 2910. The inductor 2910 may be the leakage inductance 955.

In some embodiments, energy transfer element 2904 may comprise an LC circuit 2912 comprising an inductor 2922 in series with a capacitor 2924.

In some embodiments, energy transfer element 2904 may comprise an LCL circuit in a T-configuration 2914 comprising a first series inductor 2932, a parallel capacitor 3934, and a second series inductor 2936.

In some embodiments, energy transfer element 2904 may comprise an LLC circuit 2916 comprising a series inductor 2942, a series capacitor 2944, and a parallel inductor 2946.

Reference is next made to FIGS. 30a-30i, which shows embodiments of the bridge variation block 2906 of FIG. 29a. The bridge variation block is analogous to the secondary circuit 910b of FIG. 9 and interfaces the secondary side of the transformer 942 with the output DC voltage $V_B$ (915). The bridge variation block 2906 may comprise a rectifying circuit.

FIG. 30a shows an embodiment of the bridge variation block 2906 comprising four switches 3002a, 3004a, 3006a, 3008a arranged in a full bridge configuration and one DC-link capacitor 3022a. As shown, the DC link capacitor 3022a is parallel to the full bridge configuration of the switches 3002a, 3004a, 3006a, 3008a.

FIG. 30b shows an embodiment of the bridge variation block 2906 comprising two switches 3002b, 3004b arranged in a half bridge configuration with two DC-link capacitors 3022b, 3024b. The two DC-link capacitors 3022b, 3024b are connected in series, and the series combination of the two DC-link capacitors is in parallel to the half-bridge configuration of the switches 3002b, 3004b.

FIG. 30c shows an embodiment of the bridge variation block 2906 comprising a circuit analogous to NPC circuit 500. Specifically, eight switches 3002c, 3004c, 3006c, 3008c, 3010c, 3012c, 3014c, 3016c, four diodes 3042c, 3044c, 3046c, 3048c, and two DC-link capacitors 3022c, 3024c are shown. A first branch of the circuit comprises switches 3002c, 3004c, 3006c, 3008c and diodes 3042c, 3044c arranged in a neutral point clamped configuration. A second branch of the circuit comprises switches 3010c, 3012c, 3014c, 3016c and diodes 3046c, 3048c arranged in a neutral point clamped configuration. The DC-link capacitors 3022c, 3024c are connected in series, and the series combination of the DC-link capacitors 3022c, 3024c is connected in parallel to each of the first and the second branches.

FIG. 30d shows an embodiment of the bridge variation block 2906 comprising a circuit analogous to one branch of an NPC circuit 500. Specifically, four switches 3002d, 3004d, 3006d, 3008d, two diodes 3042d, 3044d, and two DC-link capacitors 3022d, 3024d are shown. Switches 3002d, 3004d, 3006d, 3008d and diodes 3042d, 3044d are arranged in a neutral point clamped configuration. The DC-link capacitors 3022d, 3024d are connected in series, and the series combination of the DC-link capacitors is connected in parallel to the neutral point clamped configuration of the four switches and the two diodes.

FIG. 30e shows an embodiment of the bridge variation block 2906 comprising a circuit analogous to an ANPC circuit 600. Specifically, twelve switches 3002e, 3004e, 3006e, 3008e, 3010e, 3011e, 3012e, 3013e, 3014e, 3016e, 3018e, 3020e and two DC-link capacitors 3022e, 3024e are shown. A first branch of the circuit comprises switches 3002e, 3004e, 3006e, 3008e, 3010e, 3011e arranged in an active neutral point clamped configuration. A second branch of the circuit comprises switches 3012e, 3013e, 3014e, 3016e, 3018e, 3020e arranged in an active neutral point clamped configuration. The DC-link capacitors 3022e, 3024e are connected in series, and the series combination of the DC-link capacitors is connected in parallel to each of the first and the second branches.

FIG. 30f shows an embodiment of the bridge variation block 2906 comprising a circuit analogous to one branch of an ANPC circuit 600. Specifically, six switches 3002f, 3004f, 3006f, 3008f, 3010f, 3012f, and two DC-link capacitors 3022f, 3024f are shown. Switches 3002f, 3004f, 3006f, 3008f, 3010f, 3012f are arranged in an active neutral point clamped configuration. DC-link capacitors 3022f, 3024f are connected in series, and the series combination of the capacitors is connected in parallel to the active neutral point clamped configuration of the six switches.

FIG. 30g shows an embodiment of the bridge variation block 2906 comprising eight switches 3002g, 3004g, 3006g, 3008g, 3010g, 3012g, 3014g, 3016g, two flying capacitors 3032g, 3034g, and one DC-link capacitor 3022g. A first branch comprises switches 3002g, 3004g, 3006g, 3008g and flying capacitor 3032g arranged in a flying capacitor configuration. A second branch comprises switches 3010g, 3012g, 3014g, 3016g and flying capacitor 3034g arranged in a flying capacitor configuration. The DC-link capacitor 3022g is connected in parallel to each of the first and the second branches.

FIG. 30h shows an embodiment of the bridge variation block 2906 comprising four switches 3002h, 3004h, 3006h, 3008h and one flying capacitor 3032h arranged in a flying capacitor configuration, and two DC-link capacitors 3022h, 3024h. The DC-link capacitors 3022h, 3024h are connected in series, and the series combination of the capacitors is connected in parallel to the flying capacitor configuration of the switches and the flying capacitor.

FIG. 30i shows an embodiment of the bridge variation block 2906 comprising four switches 3002i, 3004i, 3006i, 3008i connected in series and two DC-link capacitors 3022i, 3024i. The DC-link capacitors 3022i, 3024i are connected in series, and the series combination is connected in parallel to the switches.

Figure 31:
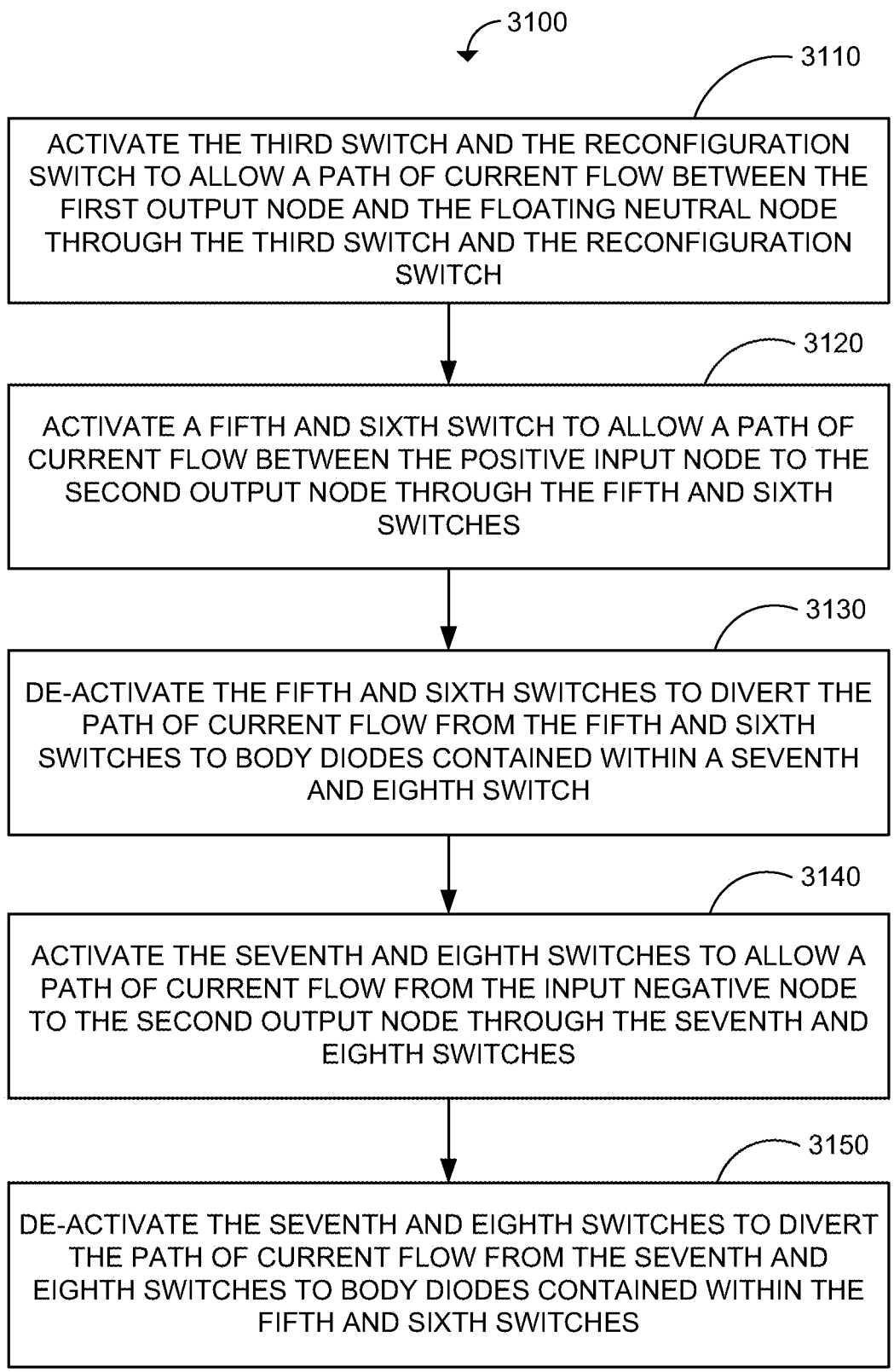
FIG. 31 is a method of operating a DC-DC converter in accordance with an embodiment.

Referring to FIG. 31, a flow diagram of a method 3100 of operating a primary circuit of a DC-DC converter in a half-bridge mode is shown. In some embodiments, the DC-DC converter may be a DAB converter 900 shown in FIG. 9.

Specifically, with reference to FIG. 9, the DAB converter 900 may comprise a primary circuit 910a coupled to a fixed or variable DC input voltage 905, a secondary circuit 910b coupled to a DC output voltage 915, and a transformer 942 isolating the primary circuit from the secondary circuit. The primary circuit 910a may be a DC-AC converter such as an RNPC circuit 700, as shown in FIG. 7. Referring back to FIG. 7, RNPC circuit 700 may comprise, in a first branch 780b, a first switch 720e, a second switch 720f, a third switch 720g, a fourth switch 720h, and a reconfiguration switch 730d. RNPC circuit 700 circuit may further comprise, in a second branch 780a, a fifth switch 720a, a sixth switch 720b, a seventh switch 720c, and an eighth switch 720d. The RNPC circuit 700 may further comprise a first DC-link capacitor 710a and a second DC-link capacitor 710b, connected in parallel with the input voltage 705 (equivalent to input voltage 905 of FIG. 9) at input positive node 770a and input negative node 770b. The switches and capacitors may define a floating neutral node 760a, a first output node 760c, and a second output node 760b.

At 3110, the method 3100 comprises activating the third switch 720g and the reconfiguration switch 730 to allow a path of current flow between the first output node 760c and the floating neutral node 760a though the third switch 720g and the reconfiguration switch 730d.

At 3120, the method 3100 further comprises activating a fifth switch 720a and sixth switch 720b to allow a path of current flow between the positive input node 770a to the second output node 760b through the fifth switch 720a and sixth switch 720b.

At 3130, the method 3100 further comprises de-activating the fifth switch 720a and sixth switch 720b to divert the path of current flow from the fifth switch 720a and sixth switch 720b to body diodes contained within the seventh switch 720c and eighth switch 720d.

At 3140, the method 3100 further comprises activating the seventh switch 720c and eighth switch 720d to allow a path of current flow from the input negative node 770b to the second output node 760b through the seventh switch 720c and eighth switch 720d.

At 3150, the method 3100 further comprises de-activating the seventh switch 720c and eighth switch 720d to divert the path of current flow from the seventh switch 720c and eighth switch 720d to body diodes contained within the fifth switch 720a and sixth switch 720b.

The foregoing embodiments and advantages are merely examples and are not to be construed as limiting the present invention. The present teaching can be readily applied to other types of manufacturing lines and sports equipment swung or held by a user (bats, racquets, video game controllers, etc.). Also, the description of the embodiments of the present invention is intended to be illustrative, and not to limit the scope of the claims, and many alternatives, modifications, and variations will be apparent to those skilled in the art.

We claim:

1. A direct current (DC)-DC power converter comprising:
a primary circuit coupled to an input voltage, the input voltage being DC type, the primary circuit operable to convert the input voltage into an AC voltage;
a secondary circuit coupled to the primary circuit, the secondary circuit operable to convert the AC voltage into an output voltage, the output voltage being DC type;
a transformer isolating the primary circuit from the secondary circuit, the transformer comprising a predetermined number of turns;
an energy transfer element interfacing the primary circuit with the transformer;
a first plurality of capacitors connected in series with each other, the first plurality of capacitors being connected in parallel with the input voltage;
the primary circuit comprising a first primary circuit branch and a second primary circuit branch; wherein:
the first primary circuit branch is connected in parallel with the input voltage and comprises a first plurality of primary switches and a first branch primary diode;
the second primary circuit branch is connected in parallel with the input voltage and comprises a second plurality of primary switches and a plurality of second branch primary diodes coupled to each other; and
wherein one of the first primary circuit branch and the secondary circuit comprises a reconfiguration switch, wherein the reconfiguration switch is operable to switch the power converter between a first mode and a second mode, and wherein the power converter operates as a full bridge circuit in the first mode and the power converter operates as a half bridge circuit in the second mode.

2. The DC-DC power converter of claim 1, further comprising a second plurality of capacitors connected in series with each other, the second plurality of capacitors being connected in parallel with the output voltage; and wherein the secondary circuit further comprises:
a first secondary circuit branch and a second secondary circuit branch;
the first secondary circuit branch being connected in parallel with the output voltage and comprising a first plurality of secondary switches and a first plurality of secondary diodes coupled to each other; and
the second secondary circuit branch being connected in parallel with the output voltage and comprising a second plurality of secondary switches and a second plurality of secondary diodes coupled to each other.

3. The DC-DC power converter of claim 2, wherein the first primary circuit branch comprises the reconfiguration switch and wherein:
the first plurality of capacitors connects to the input voltage at a positive input node and a negative input node;
the first plurality of capacitors further comprises a first and a second input DC-link capacitors, the first and the second input DC-link capacitors defining a floating neutral node at a first common connection point;
the first primary circuit branch comprises:
a first output node, a first primary junction node, and a second primary junction node, wherein:
a first switch from the first plurality of primary switches is connected between the positive input node and the first primary junction node;
a second switch from the first plurality of primary switches is connected between the first primary junction node and the first output node;
a third switch from the first plurality of primary switches is connected between the second primary junction node and the first output node;
a fourth switch from the first plurality of primary switches is connected between the second primary junction node and the negative input node;
the first branch primary diode is connected between the first primary junction node and the floating neutral node; and
the reconfiguration switch is connected between second primary junction node and the floating neutral node; and
the secondary circuit comprises a rectifying circuit.

4. The DC-DC power converter of claim 3, wherein the second primary circuit branch comprises:
a second output node, a third primary junction node, and a fourth primary junction node, wherein:
a first switch from the second plurality of primary switches is connected between the positive input node and the third primary junction node;
a second switch from the second plurality of primary switches is connected between the third primary junction node and the second output node;
a third switch from the second plurality of primary switches is connected between the fourth primary junction node and the output node;
a fourth switch from the second plurality of primary switches is connected between the fourth primary junction node and the negative input node;
a first diode from the plurality of second primary diodes is connected between the third primary junction node and the floating neutral node; and
a second diode from the plurality of second primary diodes is connected between the fourth primary junction node and the floating neutral node.

5. The DC-DC power converter of claim 4, wherein:
the second plurality of capacitors connects with the output voltage at an output positive node and an output negative node;
the second plurality of capacitors comprises at least a first and second output DC-link capacitor and the capacitors defining a floating output neutral node at a second common connection point; and
the secondary circuit comprises a first and second secondary circuit branch; and
wherein the first and second secondary circuit branches each comprise a plurality of secondary switches and a plurality of secondary diodes coupled to each other and are connected in parallel with the output voltage.

6. The DC-DC power converter of claim 5, wherein:
the first and second secondary circuit branches each comprise:
an input node, a first secondary junction node, and a second primary junction node, wherein:

a first switch from the plurality of secondary switches is connected between the output positive node and the first secondary junction node;

a second switch from the plurality of secondary switches is connected between the first secondary junction node and the input node;

a third switch from the plurality of secondary switches is connected between the second junction node and the input node;

a fourth switch from the plurality of secondary switches is connected between the second junction node and the output negative node;

a first diode from the plurality of secondary diodes is connected between the first junction node and the floating output neutral node; and a second diode from the plurality of secondary diodes is connected between second junction node and the floating output neutral node.

7. The DC-DC power converter of claim 1, wherein the energy transfer element comprises an inductor.

8. The DC-DC power converter of claim 1, wherein the energy transfer element comprises an inductor connected in series with a capacitor.

9. The DC-DC power converter of claim 1, wherein the energy transfer element comprises a first inductor, a second inductor connected to the first inductor at a common point, and a capacitor connected at the common point.

10. The DC-DC power converter of claim 1, wherein the energy transfer element comprises a first inductor connected in series with a capacitor and a second inductor connected in parallel across a primary winding of the transformer.

11. The DC-DC power converter of claim 1, wherein the secondary circuit comprises:
a first secondary switch, a second secondary switch, a third secondary switch, and a fourth secondary switch arranged in a full-bridge configuration; and
a DC-link capacitor connected in parallel across the output voltage.

12. The DC-DC power converter of claim 1, wherein the secondary circuit comprises:
a first secondary switch and a second secondary switch arranged in a half-bridge configuration; and
a first DC-link capacitor and a second DC-link capacitor connected in series with each other, and a series combination of the first DC-link capacitor and the second DC-link capacitor connected in parallel across the output voltage.

13. The DC-DC power converter of claim 1, wherein the secondary circuit comprises:
four switches and two diodes arranged in a neutral point clamped configuration; and
a series combination of a first DC-link capacitor and a second DC-link capacitor connected in parallel across the output voltage.

14. The DC-DC power converter of claim 1, wherein the secondary circuit comprises:
a first circuit branch comprising six switches arranged in an active neutral point clamped configuration;
a second circuit branch comprising six switches arranged in an active neutral point clamped configuration; and
a series combination of a first DC-link capacitor and a second DC-link capacitor connected in parallel across the output voltage.

15. The DC-DC power converter of claim 1, wherein the secondary circuit comprises:
six switches arranged in an active neutral point clamped configuration; and
a series combination of a first DC-link capacitor and a second DC-link capacitor connected in parallel across the output voltage.

16. The DC-DC power converter of claim 1, wherein the secondary circuit comprises:
a first circuit branch comprising four switches arranged in a flying capacitor configuration;
a second circuit branch comprising four switches arranged in a flying capacitor configuration; and
a DC-link capacitor connected in parallel across the output voltage.

17. The DC-DC power converter of claim 1, wherein the secondary circuit comprises:
four switches arranged in a flying capacitor configuration; and
a series combination of a first DC-link capacitor and a second DC-link capacitor connected in parallel across the output voltage.

18. The DC-DC power converter of claim 1, wherein the secondary circuit comprises:
a first switch, a second switch, a third switch and a fourth switch connected in series across the output voltage; and
a series combination of a first DC-link capacitor and a second DC-link capacitor connected in parallel across the output voltage.

19. The DC-DC power converter of claim 1, wherein when a voltage swing associated with the output voltage is greater than a voltage swing associated with the input voltage, the secondary circuit comprises the reconfiguration switch.

20. The DC-DC power converter of claim 1, wherein the secondary circuit operates in a five-level operation to produce five voltage levels at a secondary of the transformer.

21. The DC-DC power converter of claim 20, wherein the primary circuit operates in a two-level operation to produce two output voltage levels at a primary of the transformer.

22. The DC-DC power converter of claim 20, wherein the primary circuit operates in a three-level operation to produce three output voltage levels at a primary of the transformer based on operating in the first mode.

23. The DC-DC power converter of claim 20, wherein the primary circuit operates in a five-level operation to produce five output voltage levels at a primary of the transformer based on operating in the first mode.

24. The DC-DC power converter of claim 1, wherein a direction of power transfer between the input and the output voltages can be controlled by varying a phase shift in a modulation scheme.

25. The DC-DC power converter of claim 1, wherein the power converter is coupled to an AC-DC module for converting a source AC input voltage into the input voltage of the power converter.

26. A Direct Current (DC)-Alternating Current (AC) power converter circuit comprising:
an input voltage, the input voltage being DC type, the primary circuit operable to convert the input voltage into an AC voltage;
a plurality of capacitors connected in series with each other, a series combination of the plurality of capacitors being connected in parallel with the input voltage;
a first circuit branch and a second circuit branch;
the first branch, connected in parallel with the input voltage, comprising a first plurality of switches, a first diode, and a reconfiguration switch;

the second branch, connected in parallel with the input voltage, comprising a second plurality of switches and a second plurality of diodes; and wherein the reconfiguration switch is operable to switch the circuit between a first mode and a second mode, and wherein the circuit operates as a full bridge circuit in the first mode and the circuit operates as a half bridge circuit in the second mode.

27. The DC-AC converter circuit of claim 26, wherein:
the plurality of capacitors connects to the input voltage at a positive input node and a negative input node;
the plurality of capacitors further comprises a first and second input DC-link capacitor, the first and the second capacitors defining a floating neutral node at a first common connection point; and
the first circuit branch comprises:
   a first output node, a first junction node, and a second junction node, wherein:
   a first switch from the first plurality of switches is connected between the positive input node and the first junction node,
   a second switch from the first plurality of switches is connected between the first junction node and the first output node;
   a third switch from the first plurality of switches is connected between the second junction node and the first output node;
   a fourth switch from the first plurality of switches is connected between the second junction node and the negative input node;
   a first diode from the plurality of first diodes is connected between the first primary junction node and the floating neutral node; and
   the reconfiguration switch is connected between the second junction node and the floating neutral node.

28. The DC-AC converter circuit of claim 27, wherein the second circuit branch comprises:
   a second output node, a third junction node, and a fourth junction node, wherein:
   a first switch from the second plurality of switches is connected between the positive input node and the third junction node,
   a second switch from the second plurality of switches is connected between the third junction node and the second output node;
   a third switch from the second plurality of switches is connected between the fourth junction node and the second output node;
   a fourth switch from the second plurality of switches is connected between the fourth junction node and the negative input node;
   a first diode from the second plurality of diodes is connected between the third junction node and the floating neutral node; and
   the second diode from the second plurality of diodes is connected between the fourth junction node and the floating neutral node.

29. The DC-AC power converter of claim 28, wherein the power converter operates in a two-level operation to produce two output voltage levels across the first output node and the second output node.

30. The DC-AC power converter of claim 28, wherein the primary circuit operates in a three-level operation to produce three output voltage levels across the first output node and the second output node based on operating in the first mode.

31. The DC-AC power converter of claim 28, wherein the primary circuit operates in a five-level operation to produce five output voltage levels across the first output node and the second output node based on operating in the first mode.

32. A method of operating a primary circuit of a DC-DC converter in a half-bridge mode, wherein the DC-DC converter comprises:
   the primary circuit coupled to an input voltage, the input voltage being DC type, the primary circuit operable to convert the input voltage into an AC voltage;
   a secondary circuit coupled to the primary circuit, the secondary circuit operable to convert the AC voltage into an output voltage, the output voltage being DC type;
   a first and second input DC-link capacitor, the first and second capacitors connected in series with each other, a series combination of the first and second capacitors connected in parallel with the input voltage at a positive input node and a negative input node, the first and the second capacitors defining a floating neutral node at a common connection point;
   a transformer isolating the primary circuit from the secondary circuit;
   the primary circuit comprising a first primary circuit branch and a second primary circuit branch; wherein:
   the first primary circuit branch is connected in parallel with the input voltage and comprises a first, a second, a third, and a fourth primary switch, a first branch primary diode, a reconfiguration switch, and first output node; and
   the second primary circuit branch is connected in parallel with the input voltage and comprises a fifth, sixth, seventh, and eighth primary switch, a third and fourth branch primary diode coupled to each other, and a second output node;
the method comprising:
   activating the third switch and the reconfiguration switch to allow a path of current flow between the first output node and the floating neutral node though the third switch and the reconfiguration switch;
   activating a fifth and sixth switch to allow a path of current flow between the positive input node to the second output node through the fifth and sixth switches;
   de-activating the fifth and sixth switches to divert the path of current flow from the fifth and sixth switches to body diodes contained within a seventh and eighth switch;
   activating the seventh and eighth switches to allow a path of current flow from the input negative node to the second output node through the seventh and eighth switches;
   deactivating the seventh and eighth switches to divert the path of current flow from the seventh and eighth switches to body diodes contained within the fifth and sixth switches.

* * * * *